United States Patent
Madan et al.

(10) Patent No.: US 8,958,833 B2
(45) Date of Patent: Feb. 17, 2015

(54) SYSTEMS, APPARATUS AND METHODS FOR INTERFERENCE MANAGEMENT ON DOWNLINK CHANNELS IN WIRELESS COMMUNICATION SYSTEMS

(75) Inventors: Ritesh K. Madan, Jersey City, NJ (US); Ashwin Sampath, Skillman, NJ (US); Saurabh R. Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 871 days.

(21) Appl. No.: 12/774,168

(22) Filed: May 5, 2010

(65) Prior Publication Data

US 2010/0298016 A1 Nov. 25, 2010

Related U.S. Application Data

(60) Provisional application No. 61/180,800, filed on May 22, 2009.

(51) Int. Cl.
*H04Q 7/20* (2006.01)
*H04W 72/08* (2009.01)
(Continued)

(52) U.S. Cl.
CPC ........... *H04W 72/082* (2013.01); *H04B 17/007* (2013.01); *H04J 11/0053* (2013.01);
(Continued)

(58) Field of Classification Search
CPC ... H04W 28/046; H04W 28/18; H04W 28/04; H04W 52/44; H04W 52/243
USPC .......... 455/501, 500, 517, 67.11, 422.1, 403, 455/445, 550.1, 450–453, 509, 426.1, 455/426.2, 434, 423–425, 414.1, 414.2, 455/412.1, 412.2, 507, 512, 513, 514, 515, 455/516; 370/241.1, 252, 310, 328, 329, 370/343, 310.2, 338
See application file for complete search history.

(56) References Cited

U.S. PATENT DOCUMENTS 6,351,649 B1 2/2002 Watanabe et al.
8,036,151 B2 10/2011 Das et al.
(Continued)

FOREIGN PATENT DOCUMENTS

CN 101116365 A 1/2008
EP 1850612 10/2007
(Continued)

OTHER PUBLICATIONS

International Search Report and Written Opinion—PCT/US2010/033928, ISA/EPO—May 18, 2011.
(Continued)

*Primary Examiner* — Keith Ferguson
(74) *Attorney, Agent, or Firm* — Dalei Dong

(57) ABSTRACT

Systems, methods, apparatus and computer program products to facilitate determining nominal interference from one or more interfering base stations are provided. In one embodiment, the method can include computing a nominal interference. The method can also include transmitting the nominal interference to one or more interfering base stations. The nominal interference can be transmitted to at least one of the one or more interfering base stations to compute a loss in transmission rate to a user equipment in a selected cell if at least one of the one or more interfering base stations transmits over a same set of resources on which the user equipment in the selected cell receives information.

44 Claims, 36 Drawing Sheets

(51) Int. Cl.

| | | |
|---|---|---|
| *H04B 17/00* | (2006.01) | |
| *H04J 11/00* | (2006.01) | |
| *H04L 1/00* | (2006.01) | |
| *H04W 72/12* | (2009.01) | |
| *H04W 72/04* | (2009.01) | |

(52) U.S. Cl.
CPC ........... *H04J11/0059* (2013.01); *H04L 1/0002* (2013.01); *H04W 72/08* (2013.01); *H04W 72/1231* (2013.01); *H04B 2201/70702* (2013.01); *H04L 1/0026* (2013.01); *H04W 72/0413* (2013.01); *H04W 72/0426* (2013.01)
USPC ........ 455/501; 455/67.11; 455/509; 455/434; 455/513; 455/512; 370/241.1; 370/252; 370/310; 370/329; 370/343

(56) References Cited

U.S. PATENT DOCUMENTS

| | | |
|---|---|---|
| 2003/0003906 A1 | 1/2003 | Demers et al. |
| 2003/0125040 A1 | 7/2003 | Walton et al. |
| 2006/0083161 A1 | 4/2006 | Laroia et al. |
| 2006/0165032 A1 | 7/2006 | Hamalainen et al. |
| 2006/0285503 A1 | 12/2006 | Mese et al. |
| 2007/0042784 A1 | 2/2007 | Anderson |
| 2007/0105574 A1 | 5/2007 | Gupta et al. |
| 2007/0140168 A1 | 6/2007 | Laroia et al. |
| 2007/0243878 A1 | 10/2007 | Taira et al. |
| 2007/0280170 A1 | 12/2007 | Kawasaki |
| 2008/0057934 A1 | 3/2008 | Sung et al. |
| 2008/0233964 A1* | 9/2008 | McCoy et al. ................. 455/450 |
| 2008/0285477 A1* | 11/2008 | Kuroda et al. ................. 370/252 |
| 2009/0067335 A1 | 3/2009 | Pelletier et al. |
| 2009/0129333 A1 | 5/2009 | Khandekar et al. |
| 2009/0275337 A1 | 11/2009 | Maeda et al. |
| 2010/0034174 A1 | 2/2010 | Nishikawa et al. |
| 2010/0296405 A1 | 11/2010 | Madan et al. |
| 2011/0263271 A1 | 10/2011 | Hoymann et al. |
| 2012/0176995 A1 | 7/2012 | Parkvall et al. |

FOREIGN PATENT DOCUMENTS

| | | |
|---|---|---|
| EP | 1895795 | 3/2008 |
| JP | 11285062 A | 10/1999 |
| JP | 2006074468 A | 3/2006 |
| JP | 2008061250 A | 3/2008 |
| JP | 2008141313 A | 6/2008 |
| JP | 2008533924 A | 8/2008 |
| JP | 2008288932 A | 11/2008 |
| JP | 2009505595 A | 2/2009 |
| JP | 2010504026 A | 2/2010 |
| JP | 2010509815 A | 3/2010 |
| JP | 2010514375 A | 4/2010 |
| JP | 2010530710 A | 9/2010 |
| JP | H1146382 A | 9/2010 |
| WO | WO-03041300 A1 | 5/2003 |
| WO | WO-2006087797 A1 | 8/2006 |
| WO | 2006103823 A1 | 10/2006 |
| WO | WO-2007023787 A1 | 3/2007 |
| WO | WO-2007047502 A1 | 4/2007 |
| WO | WO-2008033369 A2 | 3/2008 |
| WO | 2008058551 A1 | 5/2008 |
| WO | 2008087838 | 7/2008 |
| WO | WO-2008108228 A1 | 9/2008 |
| WO | WO2008135101 | 11/2008 |
| WO | WO-2008156417 A2 | 12/2008 |
| WO | WO-2009022473 A1 | 2/2009 |
| WO | WO2009054604 | 4/2009 |

OTHER PUBLICATIONS

"Signaling for spatial coordination in DL CoMP", 3GPP TSG-RAN WG1 #56, R1-090867, Feb. 9-13, 2009, Athens, Greece, Source: Qualcomm Europe.

LG Electronics: "Consideration on CoMP in LTE-Advanced", 3GPP Draft; R1-084203 LGE_C0MP, 3rd Generation Partnership Project (3GPP), Mobile Competence Centre; 650, Route Des Lucioles; F-06921 Sophia-Antipolis Cedex; France, No. Prague, Czech Republic; Nov. 5, 2008, XP050317492 [retrieved on Nov. 5, 2008] p. 2, paragraph 2—p. 4, paragraph 3.

Partial International Search Report—PCT/US2010/033928—International Search Authority, European Patent Office Oct. 18, 2010.

Nortel: "Adaptive Fractional Frequency Reuse" 3GPP Draft; R1-062150, 3rd Generation Partnership Project (3GPP), Mobile Competence Centre; 650, Route Des Lucioles; F-06921 Sophia-Antipolis Cedex; France, vol. RAN WG1, no. Tallinn; Aug. 23, 2006, XP050102694 [retrieved on Aug. 23, 2006] p. 1, paragraph 1-p. 3, paragraph 2; figure 1; table 1.

Qualcomm Europe: "Coordinated Multi-Point downlink transmission in LTE-Advanced" 3GPP Draft; R1-084400 COMP, 3rd Generation Partnership Project (3GPP), Mobile Competence Centre; 650, Route Des Lucioles; F-06921 Sophia-Antipolis Cedex; France, no. Prague, Czech Republic; Nov. 5, 2008, XP050317663.

Qualcomm Europe: "Measurements in support of LTE-A Techniques", 3GPP Draft; R1-092071 Measurements in Support of LTE-A Techniques, 3rd Generation Partnership Project (3GPP), Mobile Competence Centre; 650, Route Des Lucioles; F-06921 Sophia-Antipolis Cedex; France, no. San Francisco, USA; XP050339525, [retrieved on Apr. 28, 2009].

Lin C I., et al., Load and Interference Based Demand Assignment (LIDA) for Integrated Services in CDMA Wireless Systems, Proceedings of IEEE Globe com, Nov. 18, 1996, vol. 1, pp. 235-241.

Taiwan Search Report—TW099116535—TIPO—May 15, 2014.

* cited by examiner

SYSTEMS, APPARATUS AND METHODS FOR INTERFERENCE MANAGEMENT ON DOWNLINK CHANNELS IN WIRELESS COMMUNICATION SYSTEMS

CROSS-REFERENCE TO RELATED APPLICATIONS

This application claims the benefit of U.S. Provisional Patent Application Ser. No. 61/180,800 titled "DISTRIBUTED INTERFERENCE MANAGEMENT: SOFT CONTROL OF INTERFERING TRANSMITTER BEHAVIOR VIA SPECIFICATION OF NOMINAL SINR," which was filed May 22, 2009 and the entire contents of which are incorporated herein by reference.

BACKGROUND

I. Field

The following description relates to wireless communications, in general, and to facilitating interference management in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more access nodes (ANs) via transmissions on forward and reverse links. The forward link (or downlink (DL)) refers to the communication link from BSs to UEs, and the reverse link (or uplink (UL)) refers to the communication link from UEs to ANs.

In wireless communication systems that are unplanned and/or interference-limited, such as Femto networks and peer-to-peer networks, distributed interference management is desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating interference management in wireless communication systems.

In one aspect, a method for facilitating interference management in a system with one or more interfering BSs is provided. The method can include computing a nominal interference. The method can also include transmitting the nominal interference to one or more interfering BSs. At least one of the one or more interfering BSs uses the nominal interference to compute a loss in transmission rate to an out-of-cell UE if the at least one of the one or more interfering BSs transmits over a same set of resources on which the out-of-cell UE receives information.

In another embodiment, a computer program product having a computer-readable medium is provided. The computer program product includes a first set of codes for causing a computer to compute a nominal interference. The computer program product also includes a second set of codes for causing the computer to transmit the nominal interference to one or more interfering BSs for at least one of the one or more interfering BSs to compute a loss in transmission rate to an out-of-cell UE if the at least one of the one or more interfering BSs transmits over a same set of resources on which the out-of-cell UE receives information.

In another embodiment, an apparatus is provided. The apparatus can include means for computing a nominal interference. The apparatus can also include means for transmitting the nominal interference to one or more interfering BSs for at least one of the one or more interfering BSs to compute a loss in transmission rate to an out-of-cell UE if the at least one of the one or more interfering BSs transmits over a same set of resources on which the out-of-cell UE receives information.

In another embodiment, another apparatus is provided. The apparatus can include an interference management component. The interference management component can be configured to compute a nominal interference. The interference management component can also be configured to transmit the nominal interference to one or more interfering BSs for at least one of the one or more interfering BSs to compute a loss in transmission rate to an out-of-cell UE if the at least one of the one or more interfering BSs transmits over a same set of resources on which the out-of-cell UE receives information.

In another aspect, a method for facilitating interference management in a system with one or more interfering BSs is provided. The method can include: receiving one or more pilot signals, wherein the one or more pilot signals are received from the one or more interfering BSs and a user equipment receives the one or more pilot signals; computing interference for the one or more interfering BSs; and transmitting a measurement report, and wherein the measurement report includes the interference, wherein the measurement report is transmitted to a serving BS.

In another aspect, another computer program product having a computer-readable medium is provided. The computer-readable medium can include: a first set of codes for causing a computer to receive one or more pilot signals, wherein the one or more pilot signals are received from the one or more interfering BSs and a user equipment receives the one or more pilot signals; a second set of codes for causing the computer to compute interference for the one or more interfering BSs; and a third set of codes for causing the computer to transmit a measurement report, wherein the measurement report includes the interference, and wherein the measurement report is transmitted to a serving BS.

In another aspect, another apparatus is provided. The apparatus can include: means for receiving one or more pilot signals, wherein the one or more pilot signals are received from the one or more interfering BSs and a user equipment receives the one or more pilot signals; means for computing interference for the one or more interfering BSs; and means for transmitting a measurement report, and wherein the measurement report includes the interference, wherein the measurement report is transmitted to a serving BS.

In another aspect, another apparatus is provided. The apparatus can include: a transceiver configured to receive one or more pilot signals, wherein the one or more pilot signals are received from the one or more interfering BSs and a user equipment receives the one or more pilot signals; and an interference management module configured to compute interference for the one or more interfering BSs, wherein the transceiver is further configured to transmit a measurement report to a serving BS, and wherein the measurement report includes the interference.

In another embodiment, a method for facilitating interference management on a downlink is provided. The method can include: receiving information indicative of buffer state associated with a user equipment, wherein the information is received at a user equipment; receiving interference information from one or more interfering BSs; setting a nominal interference, wherein the nominal interference is based on the interference information; transmitting the nominal interference and priority information for traffic associated with the user equipment, wherein the nominal interference and the priority information is transmitted to the one or more interfering BSs; receiving scheduling information from the one or more interfering BSs, wherein the scheduling information is received in response to the transmitting the nominal interference and priority information for traffic associated with the user equipment; and receiving scheduling information from a serving BS, wherein the scheduling information is based on the scheduling information from the one or more interfering BSs.

In another aspect, another computer program product having a computer-readable medium is provided. The computer-readable medium can include: a first set of codes for causing a computer to receive information indicative of buffer state associated with a user equipment, wherein the information is received at a user equipment; a second set of codes for causing the computer to receive interference information from one or more interfering BSs; a third set of codes for causing the computer to set a nominal interference, wherein the nominal interference is based on the interference information; a fourth set of codes for causing the computer to transmit the nominal interference and priority information for traffic associated with the user equipment, wherein the nominal interference and the priority information is transmitted to the one or more interfering BSs; a fifth set of codes for causing the computer to receive scheduling information from the one or more interfering BSs, wherein the scheduling information is received in response to the transmitting the nominal interference and priority information for traffic associated with the user equipment; and a sixth set of codes for causing the computer to receive scheduling information from a serving BS, wherein the scheduling information is based on the scheduling information from the one or more interfering BSs.

In another aspect, another apparatus is provided. The apparatus can include: means for receiving information indicative of buffer state associated with a user equipment, wherein the information is received at a user equipment; means for receiving interference information from one or more interfering BSs; means for setting a nominal interference, wherein the nominal interference is based on the interference information; means for transmitting the nominal interference and priority information for traffic associated with the user equipment, wherein the nominal interference and the priority information is transmitted to the one or more interfering BSs; means for receiving scheduling information from the one or more interfering BSs, wherein the scheduling information is received in response to the transmitting the nominal interference and priority information for traffic associated with the user equipment; and means for receiving scheduling information from a serving BS, wherein the scheduling information is based on the scheduling information from the one or more interfering BSs.

In another aspect, another apparatus is provided. The apparatus can include: a transceiver configured to: receive information indicative of buffer state associated with a user equipment, wherein the information is received at a user equipment; receive interference information from one or more interfering BSs; and an interference management module configured to set a nominal interference, wherein the nominal interference is based on the interference information. The transceiver can be further configured to: transmit the nominal interference and priority information for traffic associated with the user equipment, wherein the nominal interference and the priority information is transmitted to the one or more interfering BSs; receive scheduling information from the one or more interfering BSs, wherein the scheduling information is received in response to the transmitting the nominal interference and priority information for traffic associated with the user equipment; and receive scheduling information from a serving BS, wherein the scheduling information is based on the scheduling information from the one or more interfering BSs.

In another aspect, another method is provided. The method can include: transmitting one or more pilot signals, wherein the one or more pilot signals are transmitted from one or more interfering BSs and a user equipment receives the one or more pilot signals, and wherein the one or more pilot signals are measured to compute interference for the one or more interfering BSs.

In another aspect, another computer program product having a computer-readable medium is provided. The computer-readable medium can include: a first set of codes for causing a computer to transmit one or more pilot signals, wherein the one or more pilot signals are transmitted from one or more interfering BSs and a user equipment receives the one or more pilot signals, and wherein the one or more pilot signals are measured to compute interference for the one or more interfering BSs.

In another aspect, another apparatus is provided. The apparatus can include: means for transmitting one or more pilot signals, wherein the one or more pilot signals are transmitted from one or more interfering BSs and a user equipment receives the one or more pilot signals, and wherein the one or more pilot signals are measured to compute interference for the one or more interfering BSs.

In another aspect, a method for facilitating interference management on a downlink is provided. The method can include: receiving interference information for one or more interfering BSs, wherein the receiving interference information for the one or more interfering BSs is received from a user equipment; receiving a nominal interference and priority information for traffic associated with the user equipment, the priority information for traffic associated with the user equipment corresponding to information indicative of buffer state associated with the user equipment; and transmitting scheduling information to the user equipment, wherein the scheduling information is transmitted in response to the receiving the nominal interference and the priority information for traffic associated with the user equipment, and wherein the scheduling information to the user equipment is employed to generate scheduling information for the user equipment from a serving BS.

In another aspect, another computer program product having a computer-readable medium is provided. The computer-readable medium can include: a first set of codes for causing a computer to receive interference information for one or more interfering BSs, wherein the interference information is received from a user equipment; a second set of codes for causing the computer to receive a nominal interference and priority information for traffic associated with the user equipment, the priority information for traffic associated with the user equipment corresponding to information indicative of buffer state associated with the user equipment; and a third set of codes for causing a computer to transmit scheduling information to the user equipment, wherein the scheduling information is transmitted in response to receiving the nominal interference and the priority information for traffic associated with the user equipment, and wherein the scheduling information to the user equipment is employed to generate scheduling information for the user equipment from a serving base station.

In another aspect, another apparatus is provided. The apparatus can include: means for receiving interference information for one or more interfering BSs, wherein the interference information for the one or more interfering BSs is received from a user equipment; means for receiving a nominal interference and priority information for traffic associated with the user equipment, the priority information for traffic associated with the user equipment corresponding to information indicative of buffer state associated with the user equipment; and means for transmitting scheduling information to the user equipment, wherein the scheduling information is transmitted in response to the receiving the nominal interference and the priority information for traffic associated with the user equipment, and wherein the scheduling information to the user equipment is employed to generate scheduling information for the user equipment from a serving BS.

In another aspect, another apparatus is provided. The apparatus can include: a transceiver configured to: receive interference information for one or more interfering BSs, wherein the interference information for the one or more interfering BSs is received from a user equipment; receive a nominal interference and priority information for traffic associated with the user equipment, the priority information for traffic associated with the user equipment corresponding to information indicative of buffer state associated with the user equipment; and transmit scheduling information to the user equipment, wherein the scheduling information is transmitted in response to the receiving the nominal interference and the priority information for traffic associated with the user equipment, and wherein the scheduling information to the user equipment is employed to generate scheduling information for the user equipment from a serving BS.

In another aspect, a method for facilitating interference management on an uplink in a wireless communication system is provided. The method can include: determining channel gain information measured on a downlink, wherein the determining is performed by a BS; determining interference from one or more interfering user equipment based on the channel gain information for the uplink; and calculating a nominal interference based on the interference from the one or more interfering user equipment.

In another aspect, another computer program product having a computer-readable medium is provided. The computer-readable medium can include: a first set of codes for causing a computer to determine channel gain information measured on a downlink, wherein the determining is performed by a BS; a second set of codes for causing the computer to determine interference from one or more interfering user equipment based on the channel gain information for the uplink; and a third set of codes for causing the computer to calculate a nominal interference based on the interference from the one or more interfering user equipment.

In another aspect, another apparatus is provided. The apparatus can include: means for determining channel gain information measured on a downlink; means for determining interference from one or more interfering user equipment based on the channel gain information for the uplink; and means for calculating a nominal interference based on the interference from the one or more interfering user equipment.

In another aspect, another apparatus is provided. The apparatus can include: an interference management module configured to: determine channel gain information measured on a downlink; determine interference from one or more interfering user equipment based on the channel gain information for the uplink; and calculate a nominal interference based on the interference from the one or more interfering user equipment.

In another aspect, a method for facilitating interference management on an uplink of a communication system is provided. The method can include: receiving information on the uplink, wherein the information on the uplink is received from a user equipment; receiving one or more parameters for decoding the information on the uplink; decoding the information on the uplink; evaluating interference from the user equipment; and calculating a nominal interference for the user equipment.

In another aspect, another computer program product having a computer-readable medium is provided. The computer-readable medium can include: a first set of codes for causing a computer to receive information on the uplink, wherein the information on the uplink is received from a user equipment; a second set of codes for causing the computer to receive one or more parameters for decoding the information on the uplink; a third set of codes for causing the computer to decode the information on the uplink; a fourth set of codes for causing the computer to evaluate interference from the user equipment; and a fifth set of codes for causing the computer to calculate a nominal interference for the user equipment.

In another aspect, another apparatus is provided. The apparatus can include: means for receiving information on the uplink, wherein the information on the uplink is received from a user equipment; means for receiving one or more parameters for decoding the information on the uplink; means for decoding the information on the uplink; means for evaluating interference from the user equipment; and means for calculating a nominal interference for the user equipment.

In another aspect, another apparatus is provided. The apparatus can include: a transceiver configured to: receive information on the uplink, wherein the information on the uplink is received from a user equipment; receive one or more parameters for decoding the information on the uplink; and a decoder configured to decode the information on the uplink. The apparatus can also include an interference management module configured to: evaluate interference from the user equipment; and calculate a nominal interference for the user equipment.

In another aspect, a method for facilitating interference management on an uplink of a communication system is provided. The method can include: receiving one or more uplink resource utilization messages, wherein the one or more uplink utilization messages are received by a BS in a first cell from one or more user equipment in one or more cells other than the first cell; measuring a power of the uplink resource utilization messages; determining whether an identity of a user equipment of the one or more user equipment in the one or more cells other than the first cell is known; and determining interference from the user equipment of the one or more user equipment in the one or more cells other than the first cell in response to determining that the identity of the user equipment of the one or more user equipment in the one or more cells other than the first cell is known. The interference can correspond to the power of an uplink resource utilization message from the user equipment of the one or more user equipment in the one or more cells other than the first cell.

In another aspect, another computer program product having a computer-readable medium is provided. The computer-readable medium can include: a first set of codes for causing a computer to receive one or more uplink resource utilization messages, wherein the one or more uplink utilization messages are received by a BS in a first cell from one or more user equipment in one or more cells other than the first cell; a second set of codes for causing the computer to measure a power of the uplink resource utilization messages; a third set of codes for causing the computer to determine whether an identity of a user equipment of the one or more user equipment in the one or more cells other than the first cell is known; and a fourth set of codes for causing the computer to determine interference from the user equipment of the one or more user equipment in the one or more cells other than the first cell in response to determining that the identity of the user equipment of the one or more user equipment in the one or more cells other than the first cell is known, wherein the interference corresponds to the power of an uplink resource utilization message from the user equipment of the one or more user equipment in the one or more cells other than the first cell.

In another aspect, another apparatus is provided. The apparatus can include: means for receiving one or more uplink resource utilization messages, wherein the one or more uplink utilization messages are received by a BS in a first cell from one or more user equipment in one or more cells other than the first cell; means for measuring a power of the uplink resource utilization messages; means for determining whether an identity of a user equipment of the one or more user equipment in the one or more cells other than the first cell is known; and means for determining interference from the user equipment of the one or more user equipment in the one or more cells other than the first cell in response to determining that the identity of the user equipment of the one or more user equipment in the one or more cells other than the first cell is known, wherein the interference corresponds to the power of an uplink resource utilization message from the user equipment of the one or more user equipment in the one or more cells other than the first cell.

In another aspect, another apparatus is provided. The apparatus can include: a transceiver configured to: receive one or more uplink resource utilization messages, wherein the one or more uplink utilization messages are received by a BS in a first cell from one or more user equipment in one or more cells other than the first cell. The apparatus can also include an interference management module configured to: measure a power of the uplink resource utilization messages; determine whether an identity of a user equipment of the one or more user equipment in the one or more cells other than the first cell is known; and determine interference from the user equipment of the one or more user equipment in the one or more cells other than the first cell in response to determining that the identity of the user equipment of the one or more user equipment in the one or more cells other than the first cell is known, wherein the interference corresponds to the power of an uplink resource utilization message from the user equipment of the one or more user equipment in the one or more cells other than the first cell.

In another aspect, a method for facilitating interference management on an uplink is provided. The method can include: computing channel gain information, wherein the channel gain information is computed by a BS and is indicative of a channel between the BS and one or more interfering user equipment; setting a nominal interference between the BS and at least one of the one or more interfering user equipment; determining a priority of traffic to be received by the BS from one or more user equipment served by the BS; and transmitting a resource utilization message to the one or more interfering user equipment, wherein the resource utilization message comprises the priority of traffic to be received by the BS from one or more user equipment served by the BS, and the nominal interference between the BS and the one or more interfering user equipment.

In another aspect, another computer program product having a computer-readable medium is provided. The computer-readable medium can include: a first set of codes for causing a computer to compute channel gain information, wherein the channel gain information is computed by a BS and is indicative of a channel between the BS and one or more interfering user equipment; a second set of codes for causing the computer to set a nominal interference between the BS and at least one of the one or more interfering user equipment; a third set of codes for causing the computer to determine a priority of traffic to be received by the BS from one or more user equipment served by the BS; and a fourth set of codes for causing the computer to transmit a resource utilization message to the one or more interfering user equipment, wherein the resource utilization message comprises the priority of traffic to be received by the BS from one or more user equipment served by the BS, and the nominal interference between the BS and the one or more interfering user equipment.

In another aspect, an apparatus is provided. The apparatus can include: means for computing channel gain information, wherein the channel gain information is computed by a BS and is indicative of a channel between the BS and one or more interfering user equipment; means for setting a nominal interference between the base station and at least one of the one or more interfering user equipment; means for determining a priority of traffic to be received by the BS from one or more user equipment served by the BS; and means for transmitting a resource utilization message to the one or more interfering user equipment, wherein the resource utilization message comprises the priority of traffic to be received by the BS from one or more user equipment served by the BS, and the nominal interference between the BS and the one or more interfering user equipment.

In another aspect, another apparatus is provided. The apparatus can include: an interference management module configured to: compute channel gain information, wherein the channel gain information is computed by a BS and is indicative of a channel between the BS and one or more interfering user equipment; set a nominal interference between the BS and at least one of the one or more interfering user equipment; determine a priority of traffic to be received by the BS from one or more user equipment served by the BS; and transmit a resource utilization message to the one or more interfering user equipment, wherein the resource utilization message comprises the priority of traffic to be received by the BS from one or more user equipment served by the BS, and the nominal interference between the BS and the one or more interfering user equipment.

In another aspect, another method is provided. The method can include: transmitting information for determining channel gain information at a BS, wherein the transmitting information for determining channel gain information at a BS is performed by a user equipment. The method can also include receiving a resource utilization message, wherein the resource utilization message comprises: a priority of traffic to be received by the BS from user equipment served by the BS; and a value of nominal interference between the BS and the user equipment, wherein the value of the nominal interference is based on the channel gain information. The method can also include transmitting information indicative of intended scheduling, wherein the information indicative of intended scheduling is based on the value of the nominal interference and the priority of the traffic to be received by the BS from user equipment served by the BS, and wherein the information indicative of intended scheduling is employed to determine an assignment to the user equipment served by the BS.

In another aspect, another computer program product having a computer-readable medium is provided. The computer-readable medium can include: a first set of codes for causing a computer to transmit information for determining channel gain information at a BS, wherein the transmitting information for determining channel gain information at a BS is performed by a user equipment. The computer-readable medium can also include a second set of codes for causing the computer to receive a resource utilization message, wherein the resource utilization message comprises: a priority of traffic to be received by the BS from user equipment served by the BS; and a value of nominal interference between the BS and the user equipment, wherein the value of the nominal interference is based on the channel gain information. The computer-readable medium can also include: a third set of codes for causing the computer to transmit information indicative of intended scheduling, wherein the information indicative of intended scheduling is based on the value of the nominal interference and the priority of the traffic to be received by the BS from user equipment served by the BS, and wherein the information indicative of intended scheduling is employed to determine an assignment to the user equipment served by the BS.

In another aspect, another apparatus is provided. The apparatus can include: means for transmitting information for determining channel gain information at a BS, wherein the transmitting information for determining channel gain information at a BS is performed by a user equipment. The apparatus can also include means for receiving a resource utilization message, wherein the resource utilization message comprises: a priority of traffic to be received by the BS from user equipment served by the BS; and a value of nominal interference between the BS and the user equipment, wherein the value of the nominal interference is based on the channel gain information. The apparatus can also include means for transmitting information indicative of intended scheduling, wherein the information indicative of intended scheduling is based on the value of the nominal interference and the priority of the traffic to be received by the BS from user equipment served by the BS, and wherein the information indicative of intended scheduling is employed to determine an assignment to the user equipment served by the BS.

In another aspect, another apparatus is provided. The apparatus can include: a transceiver configured to: transmit information for determining channel gain information at a BS, wherein the transmitting information for determining channel gain information at a BS is performed by a user equipment; and receive a resource utilization message, wherein the resource utilization message comprises: a priority of traffic to be received by the BS from user equipment served by the BS; and a value of nominal interference between the BS and the user equipment, wherein the value of the nominal interference is based on the channel gain information. The transceiver can also be configured to transmit information indicative of intended scheduling, wherein the information indicative of intended scheduling is based on the value of the nominal interference and the priority of the traffic to be received by the BS from user equipment served by the BS, and wherein the information indicative of intended scheduling is employed to determine an assignment to the user equipment served by the BS.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
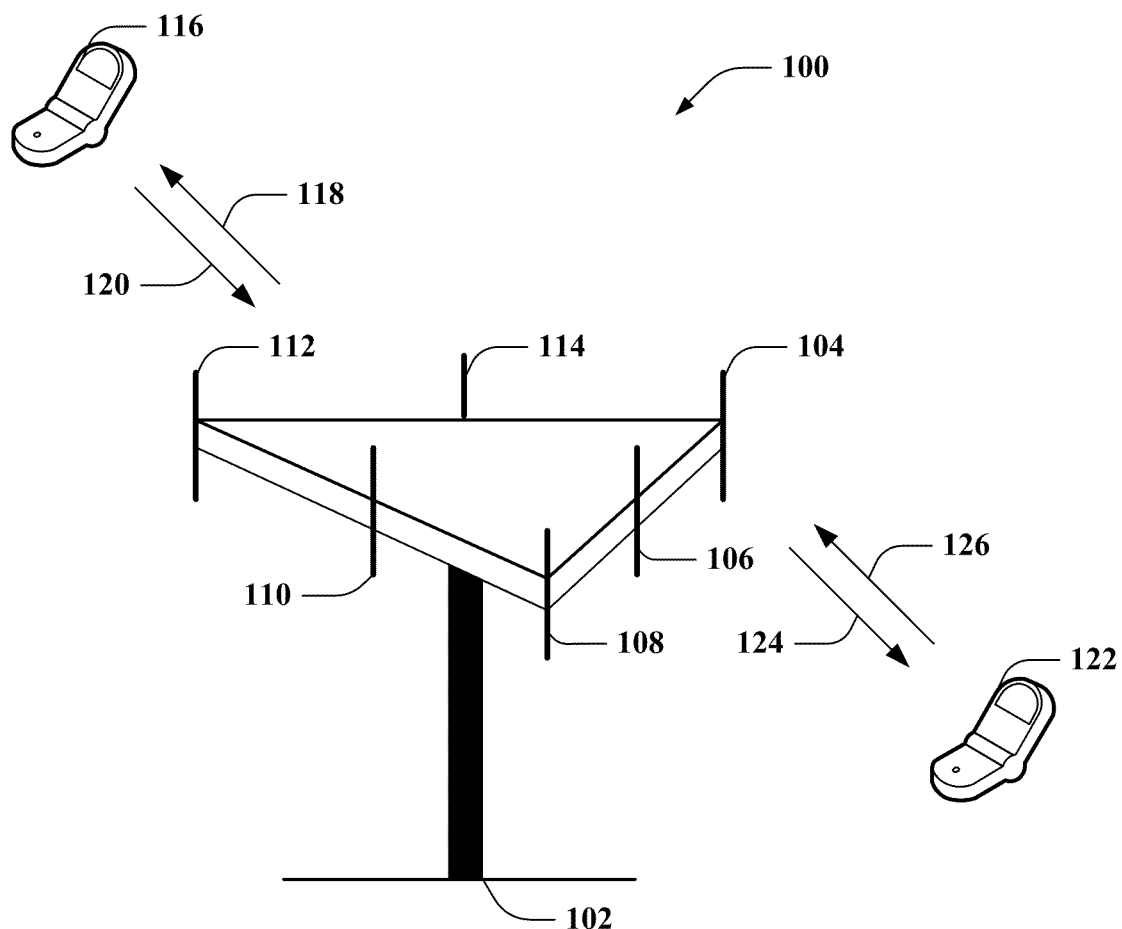
FIG. 1 is an illustration of an example wireless communication system for facilitating interference management in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with user equipment (UE). A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station (BS) or an AN. A BS can be utilized for communicating with UEs and can also be referred to as an access point, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, an AN, access point, eNodeB, macro cell, and so on. Also, a Femto node may be configured or referred to as a Home NodeB, Home eNodeB, access point access node, Femto cell, and so on.

FIG. 1 is an illustration of an example wireless communication system for facilitating interference management in accordance with various aspects set forth herein. In wireless communication system 100, interference caused by transmissions on the UL can be managed by the BS 102 while interference caused by transmissions on the DL can be managed by the UEs 116, 122.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs. Further, the BS 102 and UEs 116, 122 can be configured for facilitating interference management as described herein.

Figure 2:
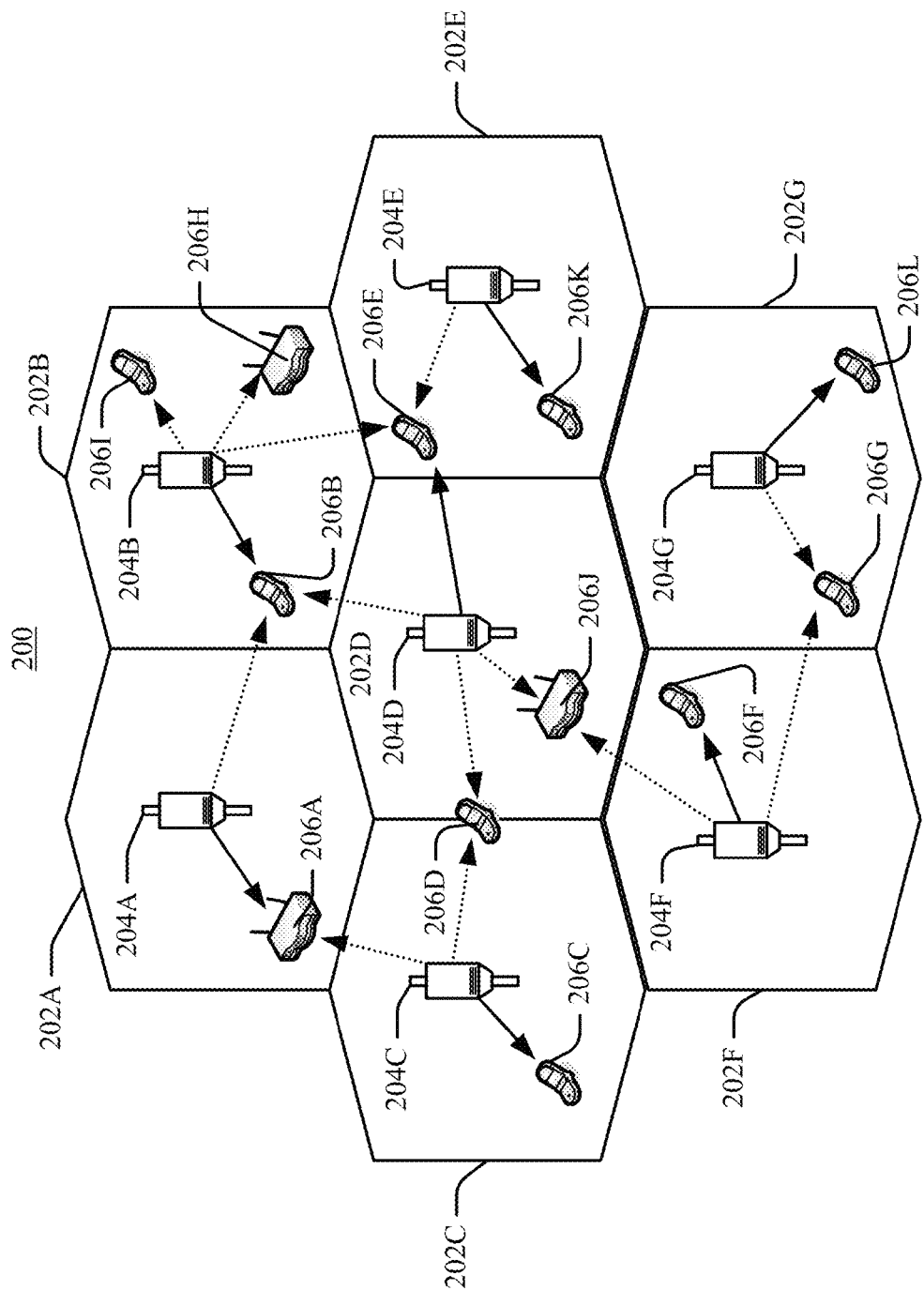
FIG. 2 is an illustration of an example wireless communication system for facilitating interference management for a number of users in accordance with various aspects set forth herein.

FIG. 2 is an illustration of another example wireless communication system for facilitating interference management for a number of users in accordance with various aspects set forth herein. The system 200 provides communication for multiple cells 202, such as, for example, macro cells 202A-202G, with each cell being serviced by a corresponding BS 204 (e.g., BS 204A-204G). As shown in FIG. 2, UE 206 (e.g., UEs 206A-206L) can be dispersed at various locations throughout the system over time. Each UE 206 can communicate with one or more BS 204 on a DL or a UL at a given moment, depending upon whether the UE 206 is active and whether it is in soft handoff, for example. The system 200 may provide service over a large geographic region. For example, macro cells 202A-202G may cover a few blocks in a neighborhood.

Figure 3:
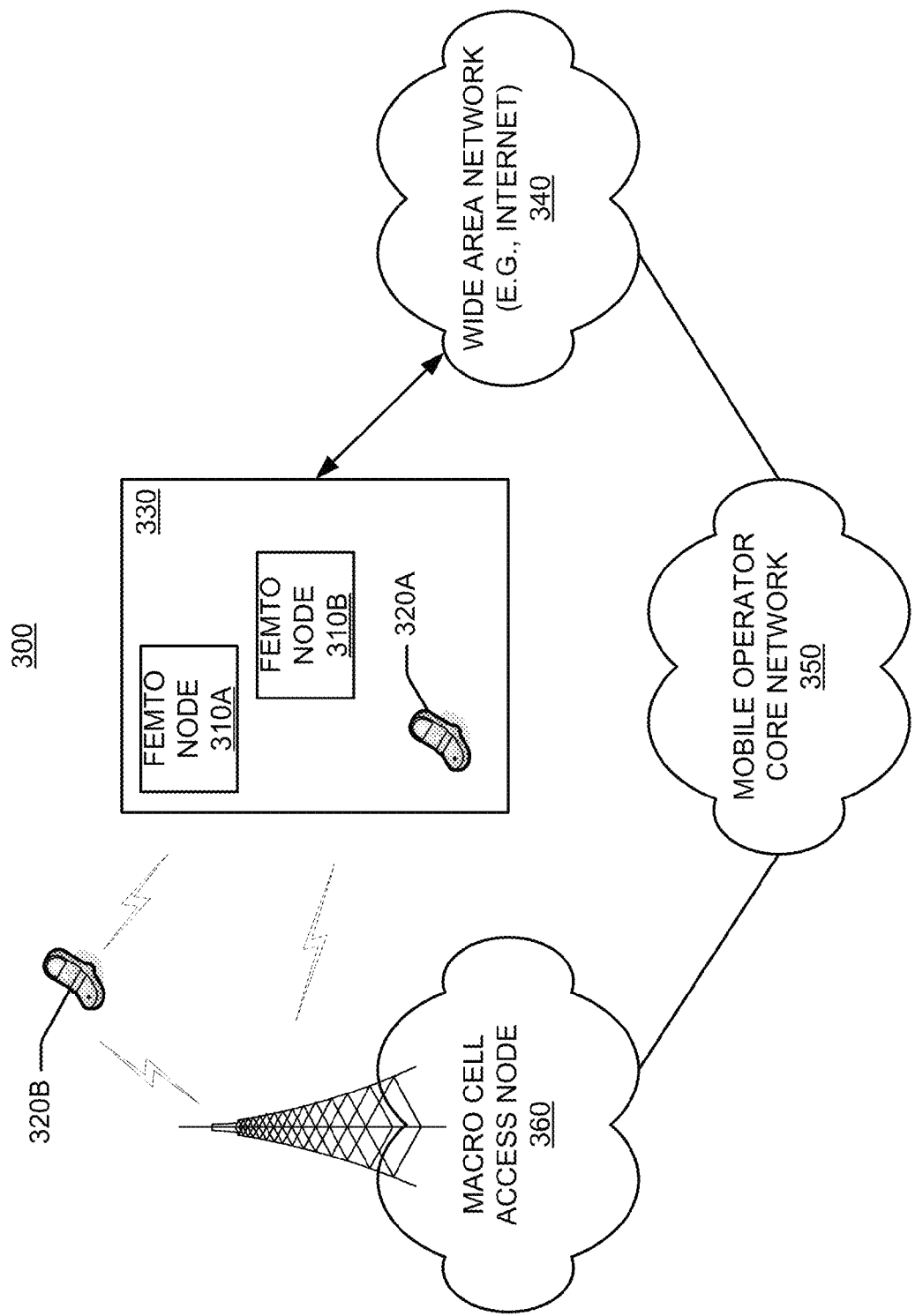
FIG. 3 is an illustration of an example wireless communication system where one or more Femto nodes are deployed for facilitating interference management in accordance with various aspects set forth herein.

FIG. 3 is an illustration of an example wireless communication system where one or more Femto nodes are deployed for facilitating interference management in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B. In embodiments, interference management can be facilitated in the system 300 as described herein.

Figure 4:
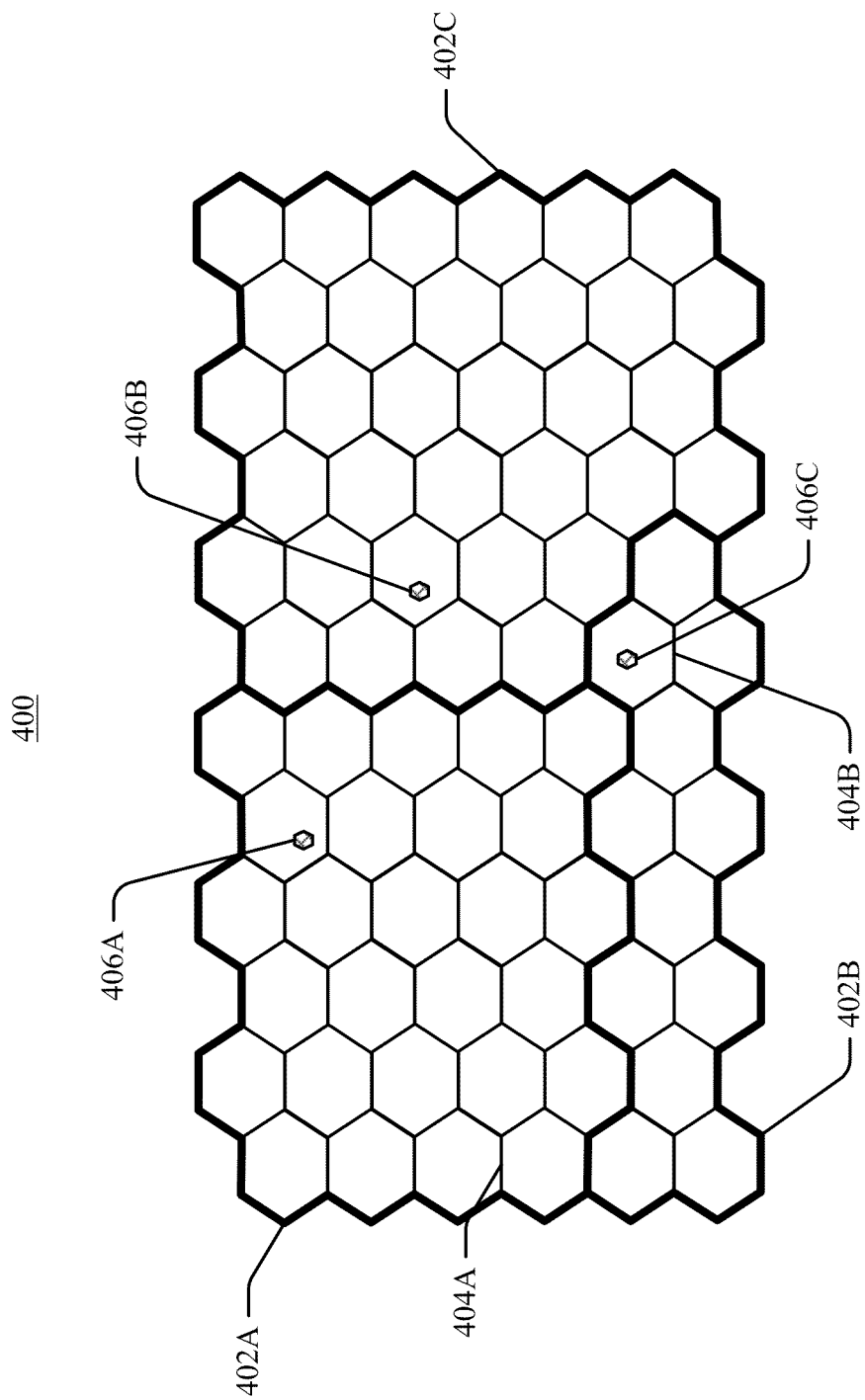
FIG. 4 is an illustration of an example coverage map in a wireless communication system for facilitating interference management in accordance with various aspects set forth herein.

FIG. 4 is an illustration of an example coverage map in a wireless communication system for facilitating interference management in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro access node (e.g., access node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., access node 360).

In some aspects, a UE 320 can be configured to connect to a preferred Femto node (e.g., the home Femto node of the UE 320) whenever such connectivity is possible. For example, whenever the UE 320 is within the user's residence 330, it may be desired that the UE 320 communicate only with the home Femto node 310.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group Home NodeB) is one that provides service to a restricted provisioned set of UEs. This set may be temporarily or permanently extended as necessary. In some aspects, a Closed Subscriber Group (CSG) may be defined as the set of BSs (e.g., Femto nodes) that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

A wireless multiple-access communication system can simultaneously support communication for multiple wireless UEs. As mentioned above, each UE can communicate with one or more BSs via transmissions on the DL or the UL. These communication links (i.e., DL and UL) may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system can support TDD and FDD. In a TDD system, the DL and UL transmissions can be on the same frequency region so that the reciprocity principle allows the estimation of the DL channel from the UL. This enables the BS to transmit beam-forming gain on the DL when multiple antennas are available at the AN. In some embodiments, the channel conditions of the UL channel can be estimated from the DL channel, for interference management, as described herein.

Figure 5A:
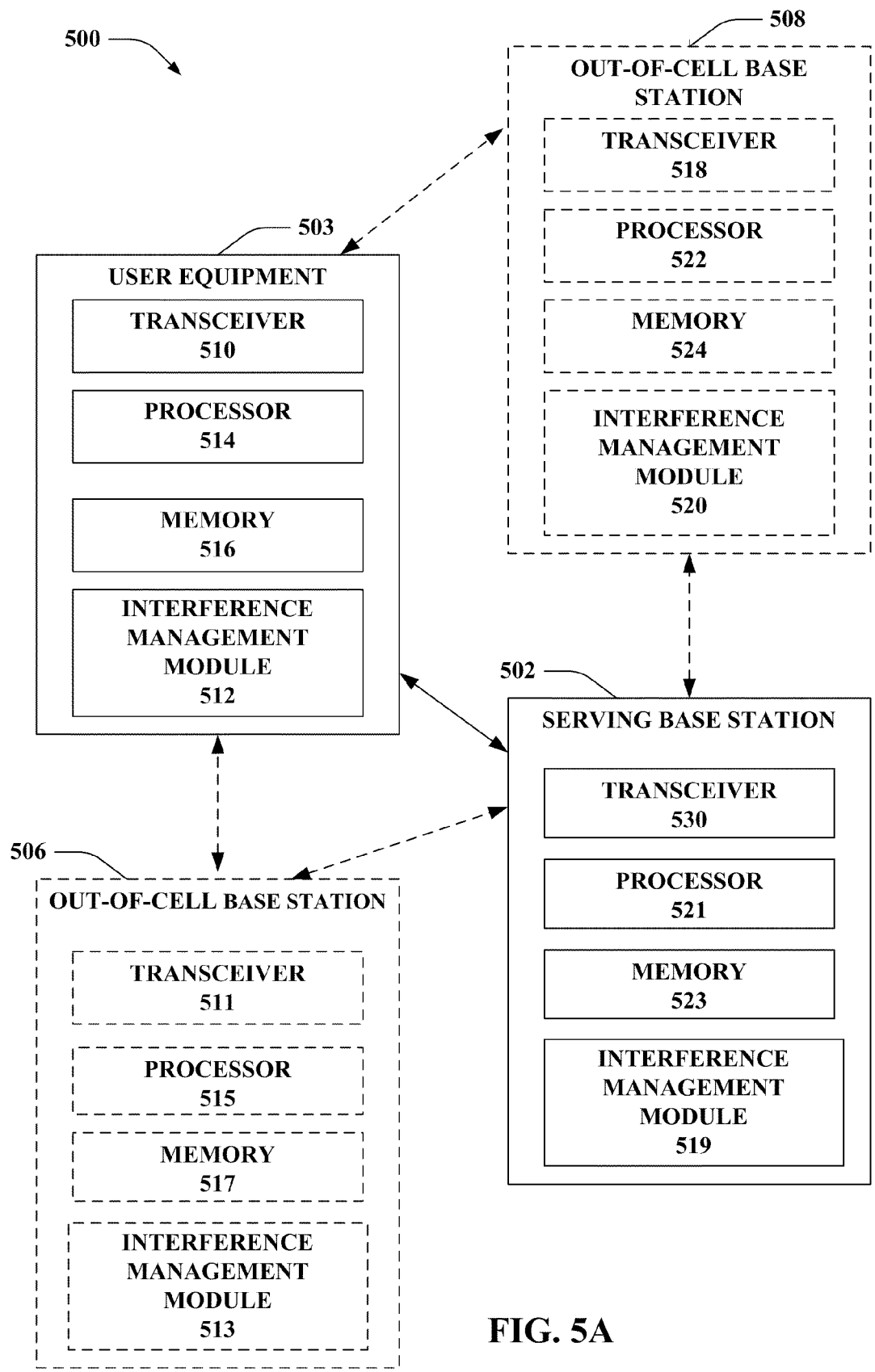
FIG. 5A is an illustration of an example block diagram of a wireless communication system for facilitating interference management on the DL.

FIG. 5A illustrates an example block diagram of a wireless communication system for facilitating interference management on the DL. The system 500 can manage (e.g., control and/or reduce) interference between BSs and a UE on the DL. In various embodiments, system 500 can be an LTE system, an LTE-A system or any type of system in which the described operations can be performed.

The system 500 can include one or more BSs 502, 506, 508, and at least one UE 503. The system 500 can include BSs 502, 506, 508, and at least one UE 503. In some embodiments, the BSs 502, 506, 508 can be BSs transmitting information over wireless communication channels in the wireless communication system. The receiver 503 can be a receiver able to receive or detect the information transmitted by the BSs 502, 506, 508. By way of example, the UE 503 can be a UE able to receive or detect information transmitted on the DL, and the BSs 502, 506, 508 can be BSs able to transmit information on the DL.

In some embodiments, BS 502 is served by receiver 503 and can transmit without causing interference to receiver 503. In some embodiments, BSs 506, 508 are interfering BSs that do not serve the receiver 503. The BSs 506, 508 can transmit and cause interference to the receiver 503 when the receiver 503 receives or detects the transmission by the BSs 506, 508. The receiver 503 and/or the BSs 502, 506, 508 can be configured to provide interference management in the system 500 for managing and/or controlling the interference at the receiver 503.

In various embodiments, a serving communication link can be indicated by a solid line between the BS 502 and the UE 503 while a cross communication link can be indicated by a dotted line between the BSs 506, 508 and the UE 503. The serving communication link can indicate a non-interfering link and a cross communication link can indicate an interfering link.

The BSs 502, 506, 508 can include transceivers 530, 511, 518, respectively, and the UE 503 can include a transceiver 510, configured to transmit and/or receive information. The information transmitted and/or received, can include, but is not limited to, data, control channel information, pilot signals and/or any information that can be transmitted or received over a wireless communication channel.

The BSs 502, 506, 508 can include interference management modules 519, 513, 520, respectively, and the UE 503 can include an interference management module 512. Interference management module 519, 513, 520 can differ in structure and/or functionality from interference management module 512. Similarly, interference management modules 519, 513, 520 can differ according to the functionality with which the BS is configured.

In some embodiments, the interference management modules 519, 513, 520, 512 can be configured to perform one or more of the functions for interference management described herein with reference to the systems, methods, apparatus and/or computer program products. By way of example, but not limitation, the functions for interference management can include computing and/or determining and/or setting a value for nominal interference, interference, nominal signal-to-interference and noise ratio, intended transmit powers, and transmit powers, priority of traffic, channel gain, channel gain information and/or buffer state information. The channel gain can be the receiving signal power relative to a nominal transmit power. The channel gain can be expressed as a log value comparing, a fraction comparing or a difference between, the received signal power relative to a nominal transmit power. In some embodiments, the nominal transmit power is known to the UE or the BS computing the channel gain. Channel gain information can include the channel gain.

By way of other examples, but not limitation, the functions for interference management can include scheduling transmissions. By way of other examples, but not limitation, the functions for interference management can include comparing, for an intended transmission by a BS in a first cell, the benefit to the BS to transmit as compared to the degradation to a UE in another cell. The degradation can be due to the transmission by the BS.

The BSs 502, 506, 508 can include processors 521, 515, 522, respectively. The UE 503 can include a processor 514. Processors 521, 515, 522, 514 can be configured to perform one or more of the functions described herein with reference to any of the systems, methods, apparatus and/or computer program products.

The BSs 502, 506, 508 can include memory 523, 517, 524, respectively, and the UE 503 can include a memory 516. The memory 523, 517, 524, 516 can be for storing computer-executable instructions and/or information for performing the functions described herein with reference to any of the systems, methods, apparatus and/or computer program products.

In the embodiment shown, which illustrates an interference relationship on the downlink, the BSs 502, 506, 508 can be BSs and the UE 503 can be a UE. The BSs 506, 508 can be interfering BSs that are located in cells other than the cell in which the UE 503 is located. The transmissions by the BSs 506, 506 can create interference at the UE 503. The BS 502 can be a serving BS located in the cell with the UE 503 and serving the UE 503. Accordingly, the transmissions by the BS 502 can be non-interfering transmissions in various embodiments.

Figure 5B:
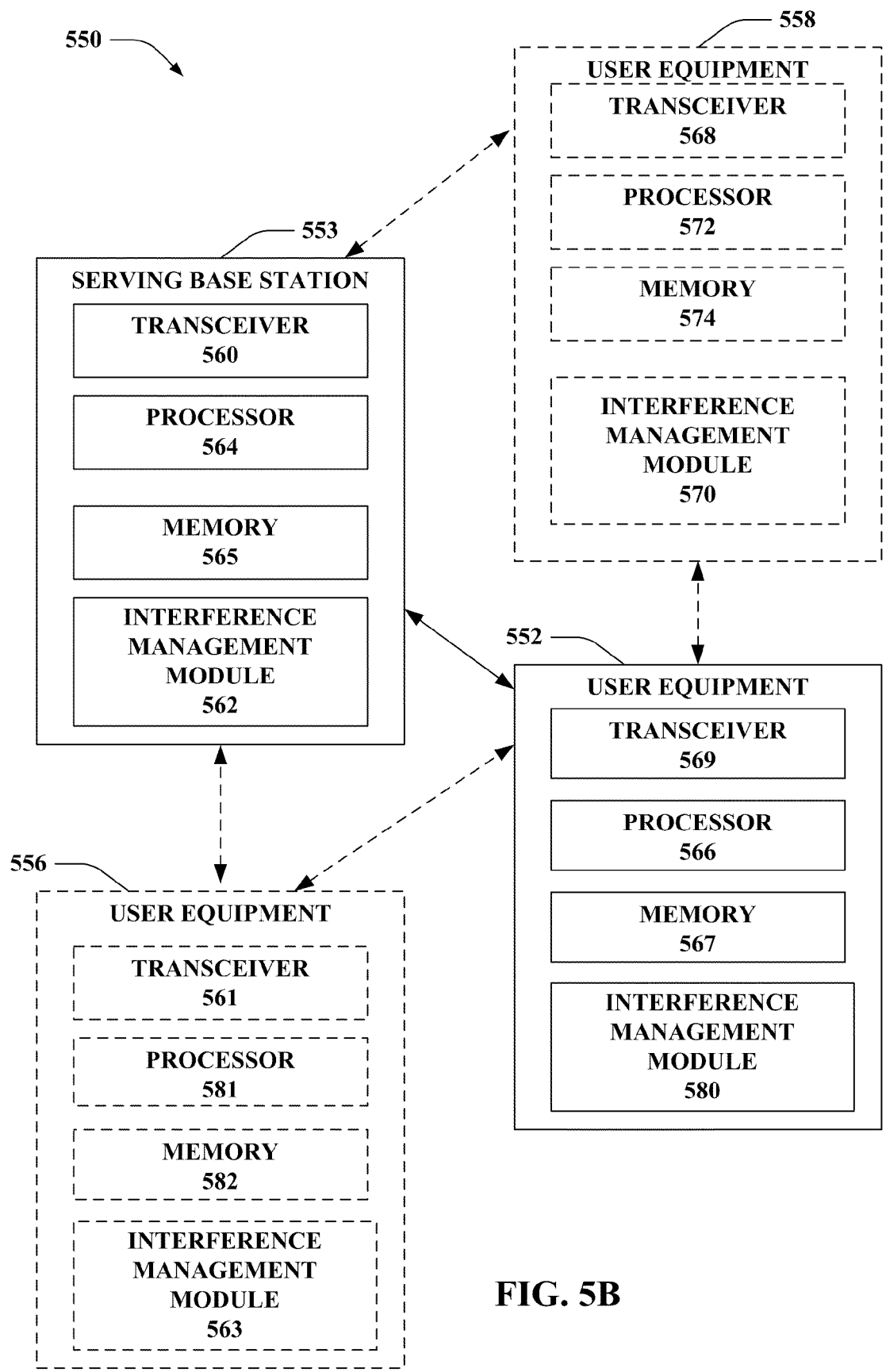
FIG. 5B is an illustration of an example block diagram of a wireless communication system for facilitating interference management on the UL.

FIG. 5B illustrates an example block diagram of a wireless communication system for facilitating interference management on the UL. The system 550 can manage (e.g., control and/or reduce) interference between UEs and a BS on the UL. In various embodiments, system 550 can be an LTE system, an LTE-A system or any type of system in which the described operations can be performed.

The system 550 can include UEs 552, 556, 558, and at least one BS 553. In some embodiments, the UEs 552, 556, 558 can be UEs transmitting information over wireless communication channels in the wireless communication system. The BS 553 can be a receiver able to receive or detect the information transmitted by the UEs. By way of example, the BS 553 can be a BS able to receive or detect information transmitted on the UL, and the UEs 552, 556, 558 can be UEs able to transmit information on the UL.

In some embodiments, UE 552 is served by BS 553 and can transmit without causing interference to BS 553. In some embodiments, UEs 556, 558 are interfering UEs that are not served by the receiver 553. The UEs 556, 558 can transmit and cause interference to the BS 553 when the BS 553 receives or detects the transmission by the UEs 556, 558. The BS 553 and/or the UEs 552, 556, 558 can be configured to provide interference management in the system 550 for managing and/or controlling the interference at the receiver 553.

In various embodiments, a serving communication link can be indicated by a solid line between the UE 552 and the BS 553 while a cross communication link can be indicated by a dotted line between the UEs 556, 558 and the BS 553. The serving communication link can indicate a non-interfering link and a cross communication link can indicate an interfering link.

The UEs 552, 556, 558 can include transceivers 569, 561, 568, respectively, and the BS 553 can include a transceiver 560, configured to transmit and/or receive information. The information transmitted and/or received, can include, but is not limited to, data, control channel information, pilot signals and/or any information that can be transmitted or received over a wireless communication channel.

The UEs 552, 556, 558 can include interference management modules 580, 563, 570, respectively, and the BS 553 can include an interference management module 562, configured to performing one or more of the functions for interference management described herein with reference to any of the systems, methods, apparatus and/or computer program products. Interference management modules 580, 563, 570 can differ in structure and/or functionality from interference management module 563. Similarly, interference management modules 580, 563, 570 can differ according to the functionality with which the UE is configured.

In some embodiments, the interference management modules 580, 563, 570, 562 can be configured to perform one or more of the functions for interference management described herein with reference to the systems, methods, apparatus and/or computer program products. By way of example, but not limitation, the functions for interference management can include computing and/or determining and/or setting a value for nominal interference, interference, nominal signal-to-interference and noise ratio, intended transmit powers, and transmit powers, priority of traffic, channel gain information and/or buffer state information. By way of other examples, but not limitation, the functions for interference management can include scheduling transmissions. By way of other examples, but not limitation, the functions for interference management can include comparing, for an intended transmission by a UE in a first cell, the benefit to the UE to transmit as compared to the degradation to a BS in another cell. The degradation can be due to the transmission by the UE.

The UEs 552, 556, 558 can include processors 566, 581, 572, respectively. The BS 553 can include a processor 564. Processors 566, 581, 572, 564 can be configured to perform one or more of the functions described herein with reference to any of the systems, methods, apparatus and/or computer program products.

The UEs 552, 556, 558 can include memory 567, 582, 574, respectively, and the BS 553 can include a memory 565. The memory 567, 582, 574, 565 can be for storing computer-executable instructions and/or information for performing the functions described herein with reference to any of the systems, methods, apparatus and/or computer program products.

In the embodiment shown, which illustrates an interference relationship on the UL, the UEs 552, 556, 558 can be UEs and the BS 553 can be a BS. In some embodiments, the BS 553 can be a serving BS for UE 552. The UEs 556, 588 can be interfering UEs that are located in cells other than the cell in which the BS 553 is located. The transmissions by the UEs 556, 558 can create interference at the BS 553. The BS 553 can be a serving BS located in the cell with the UE 552. Accordingly, the transmissions by the UE 552 can be non-interfering transmissions in various embodiments.

Figure 6A:
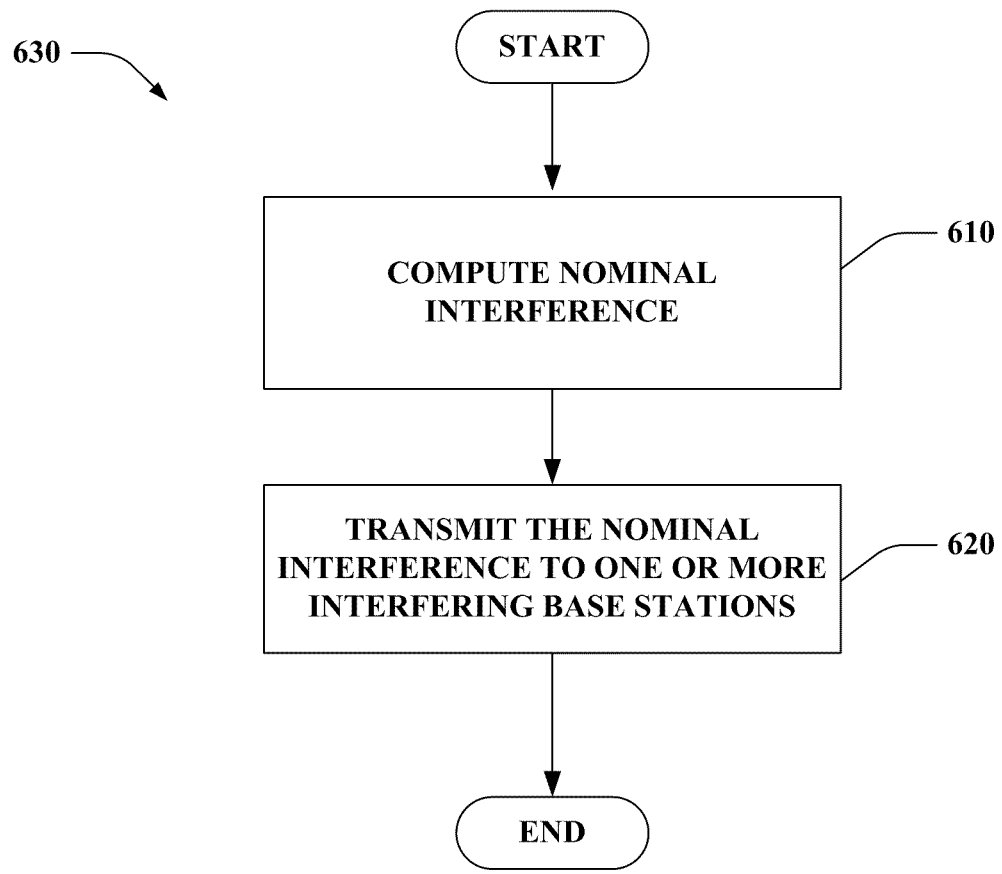
FIG. 6A is an illustration of an example of a method for facilitating interference management in accordance with various aspects set forth herein.

FIG. 6A illustrates a flow chart of an example method for facilitating interference management in a system with one or more interfering BSs. At 610, method 600 can include computing a nominal interference. In some embodiments, the nominal interference is computed using one or more of: channel gain information for the one or more interfering BSs, average traffic loading for the one or more interfering BSs, instantaneous traffic loading for the one or more interfering base stations, traffic loading or priority in one or more cells, buffer state information indicative of traffic loading or priority in one or more cells.

In some embodiments, computing the nominal interference can include: determining interference from the one or more interfering BSs; computing a transmission rate for the one or more interfering BSs; determining a number of the one or more interfering BSs that maximizes a transmission rate at the out-of-cell UE; and computing a nominal interference corresponding to the number of the one or more interfering BSs that maximizes the transmission rate at the out-of-cell UE.

At 620, method 600 can include transmitting the nominal interference to one or more interfering BSs. The nominal interference can be transmitted to at least one of the one or more interfering BSs to compute a loss in transmission rate to an out-of-cell UE if the at least one of the one or more interfering BSs transmits over a same set of resources on which the out-of-cell UE receives information.

Figure 6B:
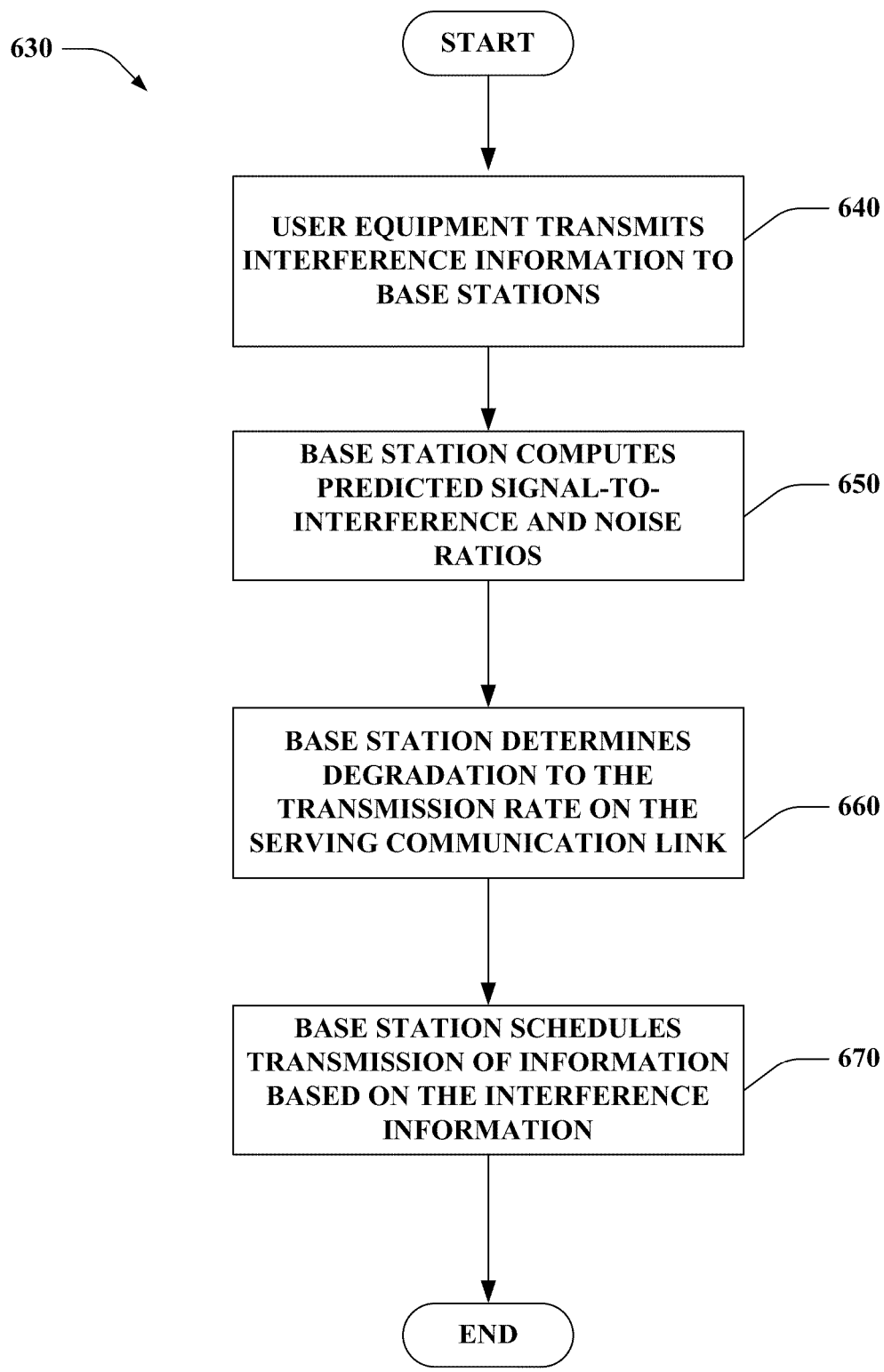
FIG. 6B illustrates is an illustration of an example of a method of scheduling for facilitating interference management in accordance with various aspects set forth herein.

FIG. 6B illustrates a flow chart of an example method of scheduling for facilitating interference management in accordance with various aspects set forth herein. At 640 of method 630, a UE can transmit interference information to BSs. Interference information can include, but is not limited to, a link priority on a serving communication link for the UE, and/or a transmission rate that the UE would like to achieve on the serving communication link. In some embodiments, the link priority can be the priority of traffic that the UE intends to transmit over the serving communication link. For example, the link priority can be indicative of a Quality of Service (QoS) of traffic that the UE intends to transmit to a BS served by the UE. The link priority can be included in buffer state information transmitted by the UE.

The UE can transmit the link priority and/or the transmission rate by broadcast or unicast methods. The transmission rate can correspond to a nominal signal-to-interference and noise ratio (SINR) that the UE would like to experience on the serving communication link. For example, the higher the transmission rate desired, the higher the SINR that can be requested by the UE. The signal portion of the SINR can be transmitted on the serving communication link while the interference portion of the SINR can be transmitted on the cross communication link.

In some embodiments, the UE can compute the transmission rate by performing step 720 of method 700 discussed below.

In some embodiments, the interference information can also include channel gain information. The channel gain information, which can include a channel gain indicative of degradation in the communication link between a UE and a BS, can also be transmitted from the UE to the BS. The channel gain information can be computed based on instantaneous and/or average traffic conditions on the communication link between the UE and a selected BS. Accordingly, in embodiments, the channel gain information may differ as between one or more of the BSs.

Referring back to FIG. 6, at 650, the BSs can compute predicted SINRs based on transmission or backoff and therefore do not transmit. In particular, BSs can compute predicted SINRs likely to result when the BSs transmit and SINRs likely to result from when the BSs do not transmit and/or transmit at a selected power level that is lower than a full power level.

At 660, the BSs can determine the degradation to the transmission rate on the serving communication link if the BS transmits. The determination can be based on a comparison of the predicted SINR when the BS transmits and when the BS performs a backoff or transmits at a selected power level that is less than full power.

At 670, the BSs can schedule transmission of information from the BSs (or backoff) based on the parameters included in the interference information and the predicted SINRs determined by the BSs. The BSs can schedule the transmission or backoff such that the parameters included in the interference information will be satisfied at the receiving link.

In some embodiments, the BSs can also determine transmit power levels if transmission is scheduled. The transmit power levels can be determined such that a serving communication link that has a high priority experiences the requested SINR.

In some embodiments, the BSs can schedule transmission of information from the BSs (or backoff) based on the parameters included in the interference information, the predicted SINRs determined by the BSs and/or a predicted benefit to the BS to transmit compared to a predicted degradation to the serving communication link for the BS to transmit. The BS can perform a tradeoff analysis and transmit, or transmit at a selected power level, if the benefit to BS is greater than the degradation to the UE. In some embodiments, the BSs can transmit at low transmission levels if the benefit to the BS to transmit is less than the degradation to the UE.

In some embodiments, a nominal interference can be calculated by the BSs upon receiving any number of different types of information from the UE. In some embodiments, when a first BS in a system is computing nominal interference, the nominal interference can be the interference contribution from one or more other BSs, besides the BS performing the computation, in the system.

By way of example, but not limitation, the nominal interference can be calculated by BSs that receive channel gain information for all BSs. The BS can map the channel gain information to a nominal interference that will result from the BS transmitting.

By way of another example, the nominal interference can be calculated by a BS that receives average loading information for all BSs. The BS can map the average loading information to nominal interference according to a function that increases the nominal interference with increased loading. In some embodiments, the channel gain information and average loading can be jointly considered to estimate nominal interference that will result from the BS transmitting.

By way of another example, the nominal interference can be calculated by a BS that receives information about an amount of a selected level of traffic to be transmitted from the UE. The BS can map the amount of the level of traffic to nominal interference. For example, if a significant amount of traffic is of a low level, the nominal interference calculated will be greater than if a significant amount of traffic is of a high level.

Figure 7:
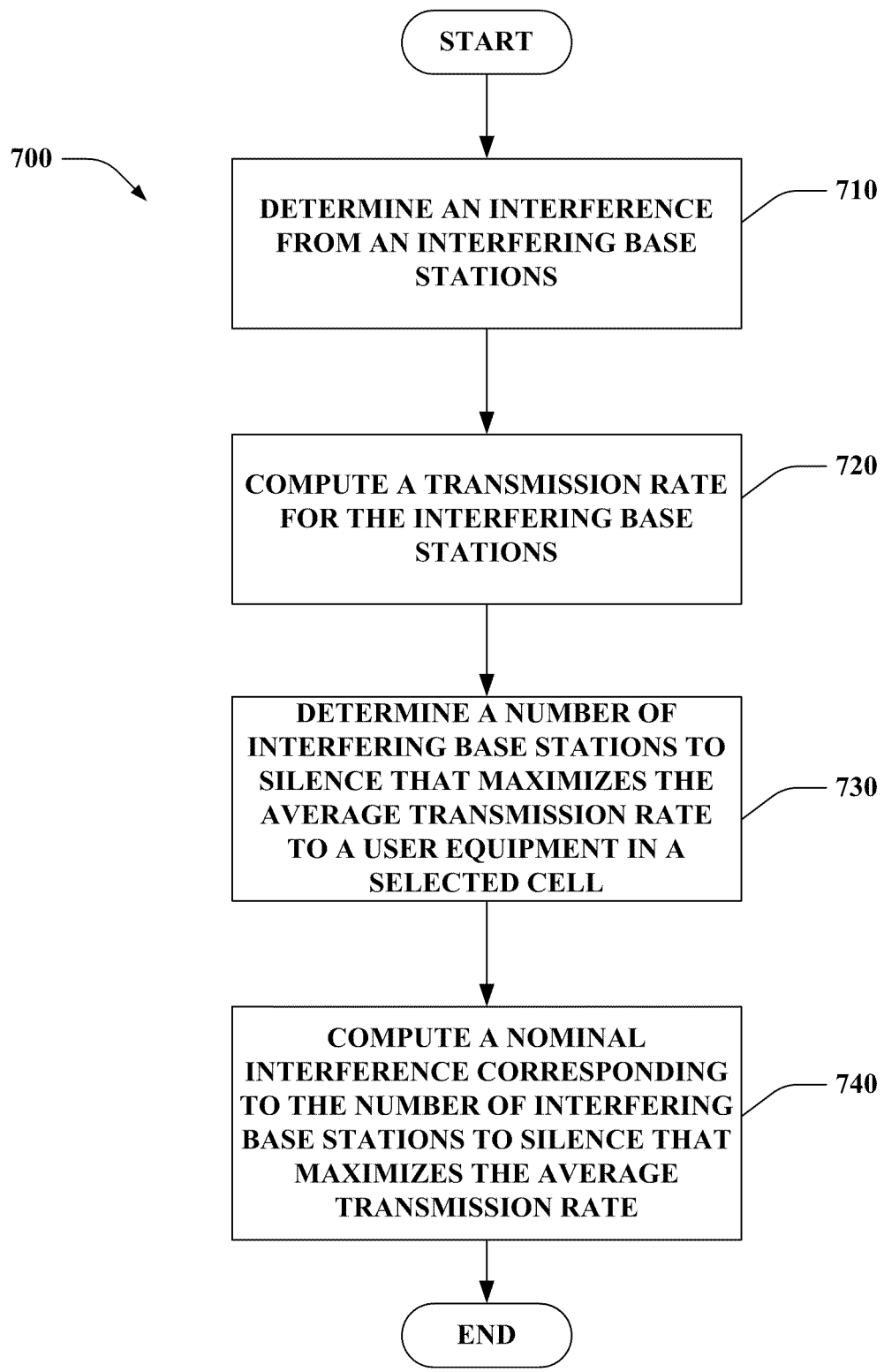
FIG. 7 is an illustration of an example of a method of calculating a nominal interference to obtain selected backoff of dominant interfering BSs.

In some embodiments, the UE can also include nominal interference in the interference information transmitted to the BSs. The nominal interference can be calculated to obtain backoff of selected interfering BSs, based on the level of interference from the interfering BSs. FIG. 7 is a flowchart of an example method of calculating a nominal interference to obtain selected backoff of dominant interfering BSs.

At 710, the method 700 can include determining interference from one or more interfering BSs. The interference can be determined for the system in which the UE operates. In various embodiments, the interference can be computed according to the method described with reference to FIG. 8.

At 720, the method 700 can include computing transmission rates for the interfering BSs. Each computed transmission rate can be a function of the channel gain on the serving communication link, the BS power experienced at the UE, the noise power in the system, and/or the interference caused by interfering BS. In one embodiment, the transmission rate for an interfering BS can be computed as shown in equation one:

$$\text{rate}(n) = \frac{1}{n} C\left(\frac{GP}{N_0 + \sum_{k=n+1}^{N} I_k}\right) \quad (1)$$

where N is the number of interfering BSs in the system, G is the channel gain for the serving communication link, P is the BS power experienced at the UE, $N_0$ is the noise power in the system, and $I_k$ is the interference caused by the kth most dominant interfering BS. C( ) can be C(SINR) in some embodiments, and can be a capacity function.

At 730, the method 700 can include determining a number of interfering BSs, $n^{opt}$, to silence that maximizes the average transmission rate for the UE.

At 740, the method 700 can include computing a nominal interference corresponding to $n^{opt}$ interfering BSs. In one embodiment, the nominal interference can be computed as shown in equation two:

$$I_{nom} = \frac{C^{-1}(\text{rate}(n^{opt}))}{GP} - N_0 \quad (2)$$

Accordingly, the UE can set a value of nominal interference that maximizes the transmission rate for the UE. The nominal interference can be included in the interference information transmitted to the BSs from the UE as discussed above with regard to FIG. 6.

In various embodiments, instead of step 730, the method 700 can include selecting a number of interfering BSs other than the number that maximizes the transmission rate for the UE.

For example, method 700 can be modified such that the number of interfering BSs is the number of active interfering BSs in the system. Accordingly, N can represent the number of active interfering BSs in the system. In these embodiments, an interferer can be considered an active interferer if the interferer has transmitted data during a selected number of past subframes. The number of past subframes can be determined by the UE.

As another example, method 700 can be modified such that the number of interfering BSs is the number of active interfering BSs in an active set in the system. The active set can be as defined in UMB and/or in CDMA systems, such as UMTS). Accordingly, N can represent the number of interfering BSs in the active set in the system.

As another example, method 700 can be modified such that the number of interfering BSs is the number of interfering BSs in a configured list of neighbor cells. Accordingly, N can represent the number of interfering BSs in the configured list of neighbor cells.

In other embodiments, instead of calculating the transmission rate from the capacity function of equation one, method 700 can be modified to utilize a look-up table mapping SINR values to transmission rates. Accordingly, the C(SINR) function of equation one can be replaced with the look-up table value. The look-up table value can then be utilized in equation one to compute the nominal interference. In some embodiments, the method 700 can be further modified to specify coding rates, coding methods and/or block sizes.

In some embodiments, the method 700 can be modified to include setting a nominal interference to achieve any number of results.

For example, the UE can set the nominal interference such that a selected number of the most dominant interfering BSs perform a backoff and do not transmit. First, the UE can set the transmission rate to correspond to a value that results when the selected number of the most dominant interfering BSs do not transmit. Second, the UE can set the nominal interference to a value corresponding to the computed transmission rate. Accordingly, the selected number of the most dominant interfering BSs that receive the nominal interference and/or the transmission rate as part of the interference information (as described with reference to FIG. 6B) will backoff.

As another example, the UE can set the nominal interference such that if the UE is in low geometry, more interfering BSs will backoff than for a UE in high geometry.

Figure 8:
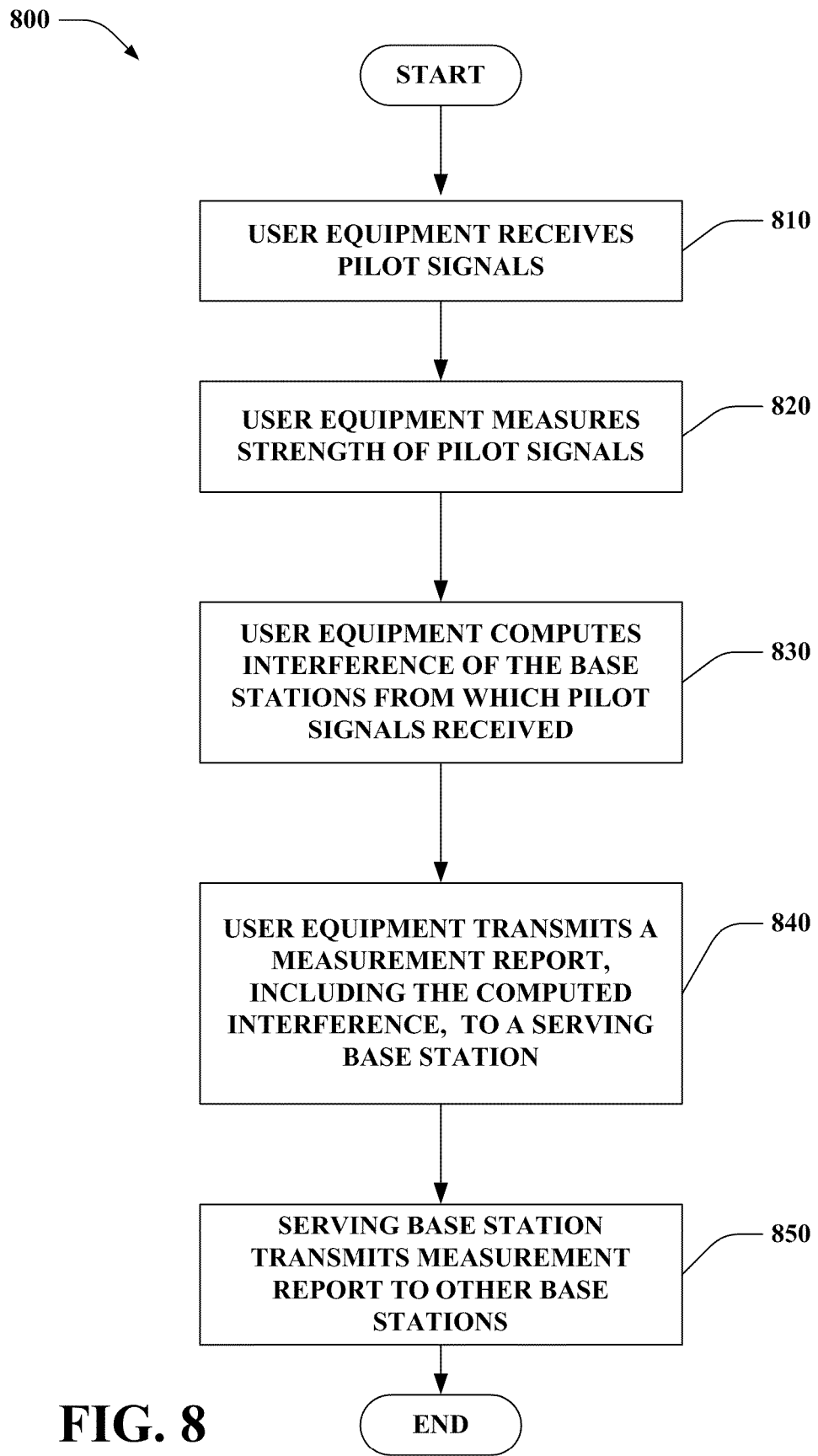
FIG. 8 is an illustration of an example of a method of determining interference from BSs on a DL of a system in accordance with various aspects described herein.

In some embodiments, step 710 of method 700 can be performed as described with reference to FIG. 8. FIG. 8 is an illustration of an example of a method of determining interference from BSs on a DL of a system in accordance with various aspects described herein. The system can be an LTE system in some embodiments.

At 810, method 800 can include a UE receiving pilot signals. The pilot signals can be received from BSs outside of the cell in which the UE is located. At 820, method 800 can include computing interference for each of the BSs. The interference computed can be based on the measured signal strength from the pilot signals.

At 830, method 800 can include transmitting a measurement report to a serving base station. The UE can transmit the measurement report. The measurement report can include the computed interference for BSs for which pilot signals were received. In some embodiments, the measurement report can include channel gain information between the UE and a BS. The measurement report can be transmitted over the backhaul or as an over-the-air (OTA) message.

In embodiments wherein the UE is a UE and thus requires a UL grant to transmit to a serving AN, the method can also include a scheduling request (SR) being sent from the UE to the serving AN. The serving BS can be configured to be able to decode the SR. The method can also include the serving BS clearing interference on the UL, and transmitting a UL grant to the UE. Clearing the interference and transmitting a UL grant can be performed in response to receiving and decoding the SR. The UE can then transmit the measurement report to the serving AN.

Upon receiving the measurement report, the serving BS can transmit the measurement report, or information included in the measurement report, to one or more other BSs in cells outside of the cell in which the serving BS is located. Accordingly, BSs in different cells in the system can receive information indicative of the interference from the other BSs. The information indicative of the interference can be used to perform the method of FIG. 6B. The interference computed at the UE that is sent to the serving BS can be used to perform the method of FIG. 7.

Figure 9:
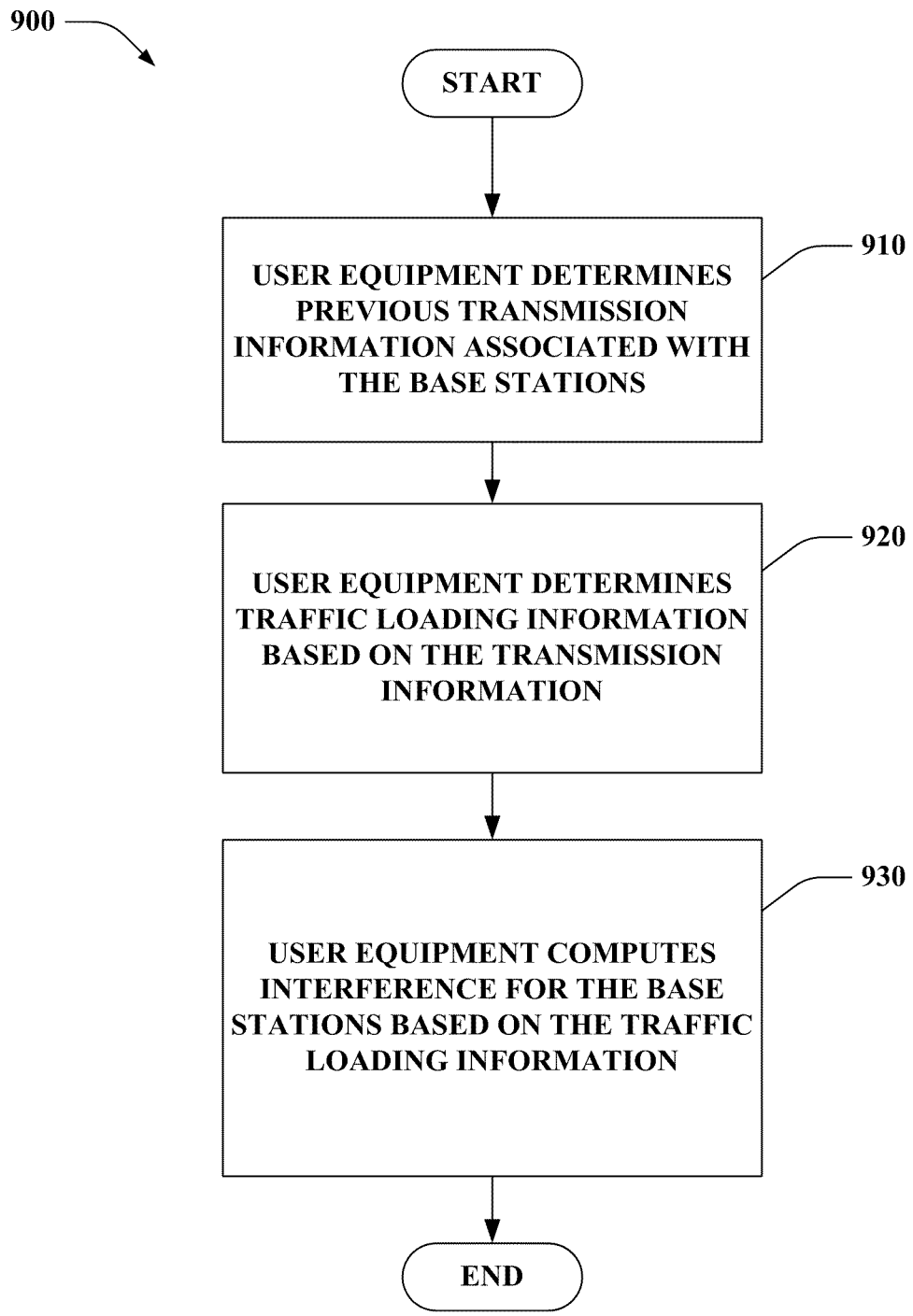
FIG. 9 is an illustration of an example of another method of determining interference from BSs on a DL of a system in accordance with various aspects described herein.

FIG. 9 is an illustration of an example of another method of determining interference from BSs on a DL of a system in accordance with various aspects described herein. At 910, method 900 can include the UE determining previous transmission information associated with the BSs. The transmission information can be for any selected number of past time intervals and/or past subframes. In various embodiments, the previous transmission information can include whether there was a transmission in the previous interval by the BS and/or the priority of traffic transmitted by the BS in the previous interval.

At 920, method 900 can include the UE determining traffic loading information based on the transmission information. At 930, method 900 can include the UE computing interference for the BSs based on the traffic loading information.

Figure 10:
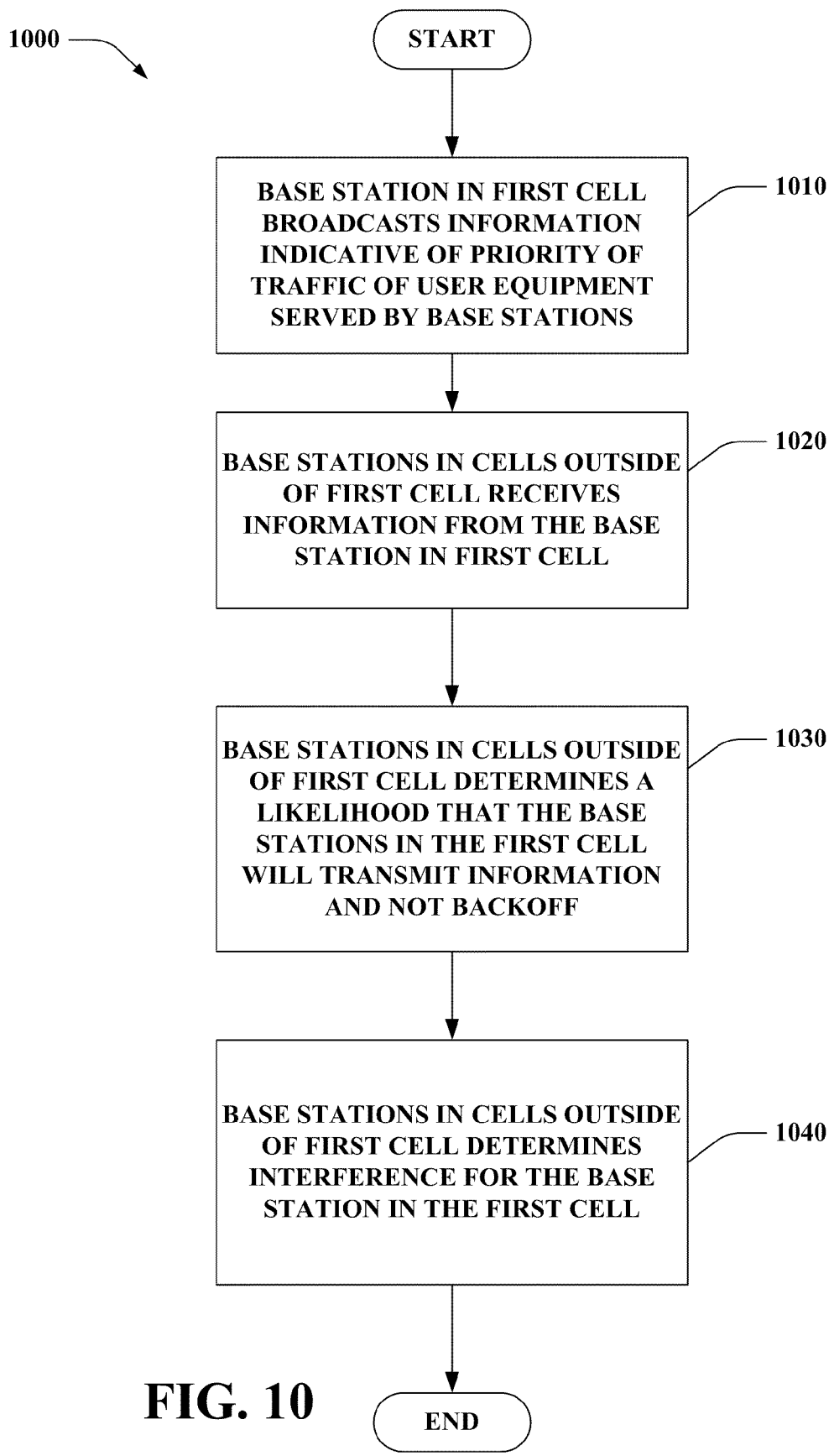
FIG. 10 is an illustration of an example of another method of determining interference from BSs on a DL of a system in accordance with various aspects described herein.

FIG. 10 is an illustration of an example of another method of determining interference from BSs on a DL of a system in accordance with various aspects described herein. At 1010, method 1000 can include the BSs in a first cell broadcasting information indicative of the priority of the traffic of UEs served by the BSs. The information can be broadcast to BSs in other cells. For example, the BS can be a BS in a first cell and that serves UEs in the first cell. The BS in the first cell can broadcast information indicative of the priority of the traffic that the BS intends to transmit to the UE. The information can be transmitted to BSs in cells outside of the first cell.

At 1020, method 1000 can include BSs in cells outside of the first cell receiving the information from the BS in the first cell. At 1030, method 1000 can include the BSs in cells outsides of the first cell determining whether there is data to transmit in the first cell (and, in some case, determining the priority of the data to transmit in the first cell).

At 1030, method 1000 can include the BSs in the cells outside of the first cell determining a likelihood that the BS in the first cell will transmit the information and not backoff. The determination can be made based on the information indicative of the data to transmit and the priority of the data.

At 1040, method 1000 can include the BSs in the cells outside of the first cell determining an interference for the BS in the first cell. The interference can be based on the determination of the likelihood that the BS in the first cell will transmit the data and the priority of the data.

Figure 11:
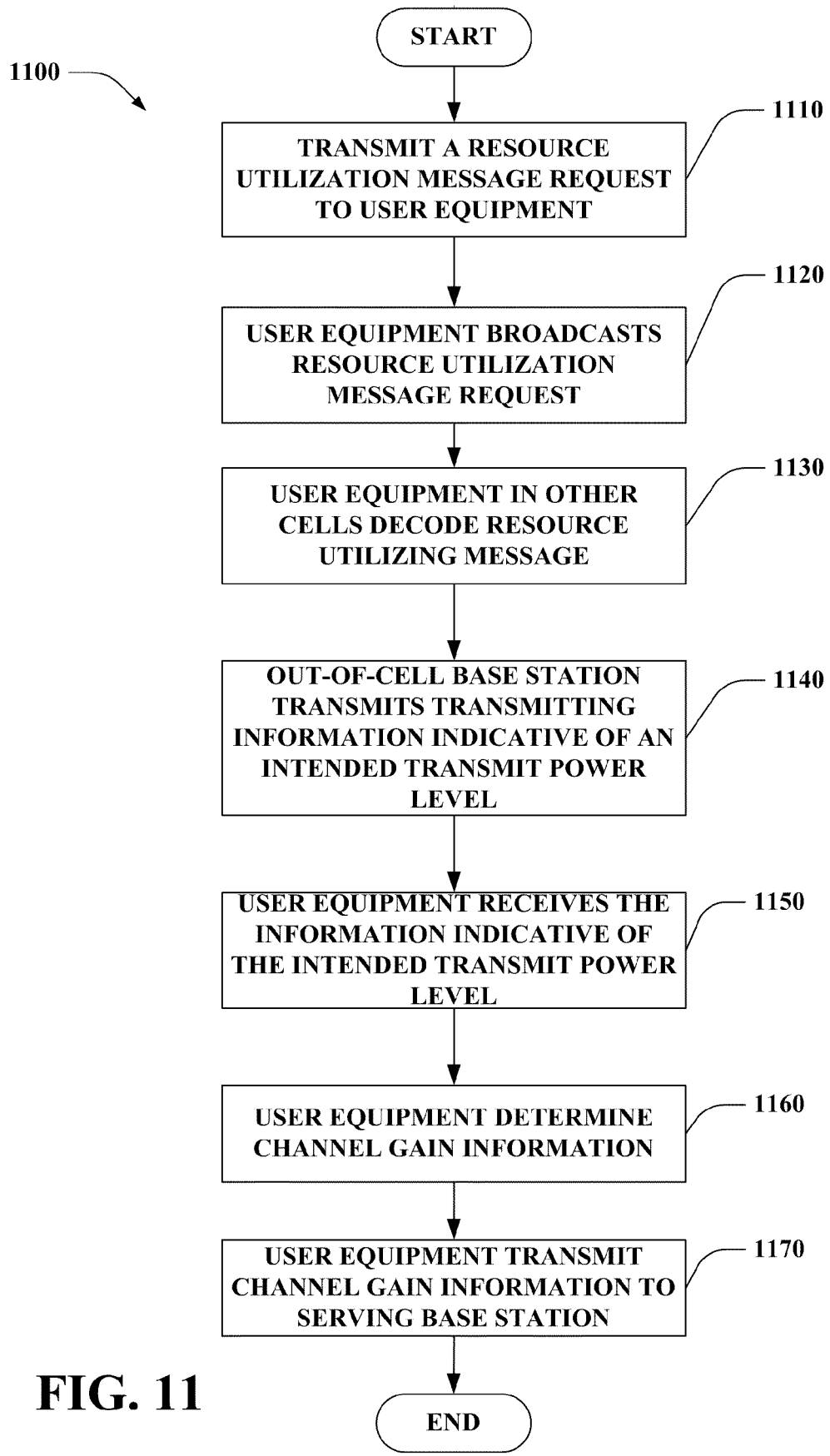
FIG. 11 is an illustration of an example of another method of determining interference from BSs on a DL of a system in accordance with various aspects described herein.

FIG. 11 is an illustration of an example of another method of determining interference from BSs on a DL of a system in accordance with various aspects described herein. The system can be an LTE-A system in some embodiments. Interference can be measured for BSs over the OTA.

At 1110, method 1100 can include transmitting a resource utilization message (RUM) request to a UE. The RUM request can be transmitted from a serving BS. At 1120, the UE can broadcast the RUM request. At 1130, UEs in other cells can decode the RUM request.

In various embodiments, a RUM can include information indicative of resources selected by a UE for reception of information. A UE can transmit a RUM to request a selected level of SINR or nominal interference on a selected resource, such as a particular channel on which the UE would like to receive information on in a subsequent time interval.

At 1130, method 1100 can include an out-of-cell BS decoding the RUM request. At 1140, method 1100 can include the out-of-cell BS transmitting information indicative of an intended transmit power level. The information indicative of an intended transmit power level can be transmitted via pilot signals from the BS.

At 1150, method 1100 can include the UE receiving the information indicative of an intended transmit power level. At 1160, the method 1100 can include the UE determining the channel gain information for the cross communication link between the UE and the out-of-cell BS. In some embodiments, the channel gain information can include a channel quality indicator. At 1170, the UE can transmit the channel gain information to the serving BS. The serving BS can perform rate prediction based on the channel gain information.

Figure 12A:
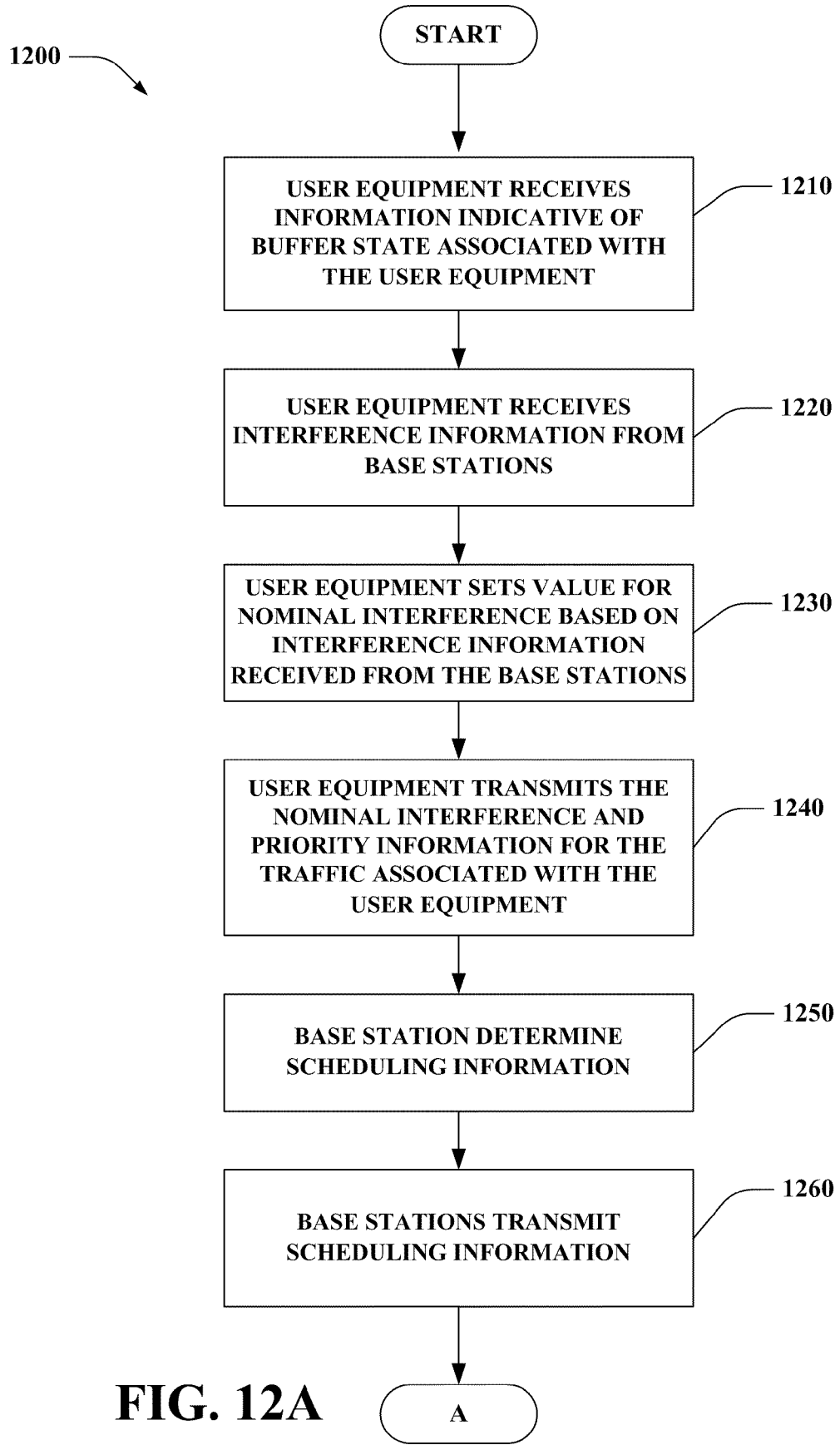
FIGS. 12A and 12B are illustrations of partial views of methods of facilitating interference management on a DL of a system employing over the air (OTA) communication in accordance with various aspects described herein.
Figure 12B:
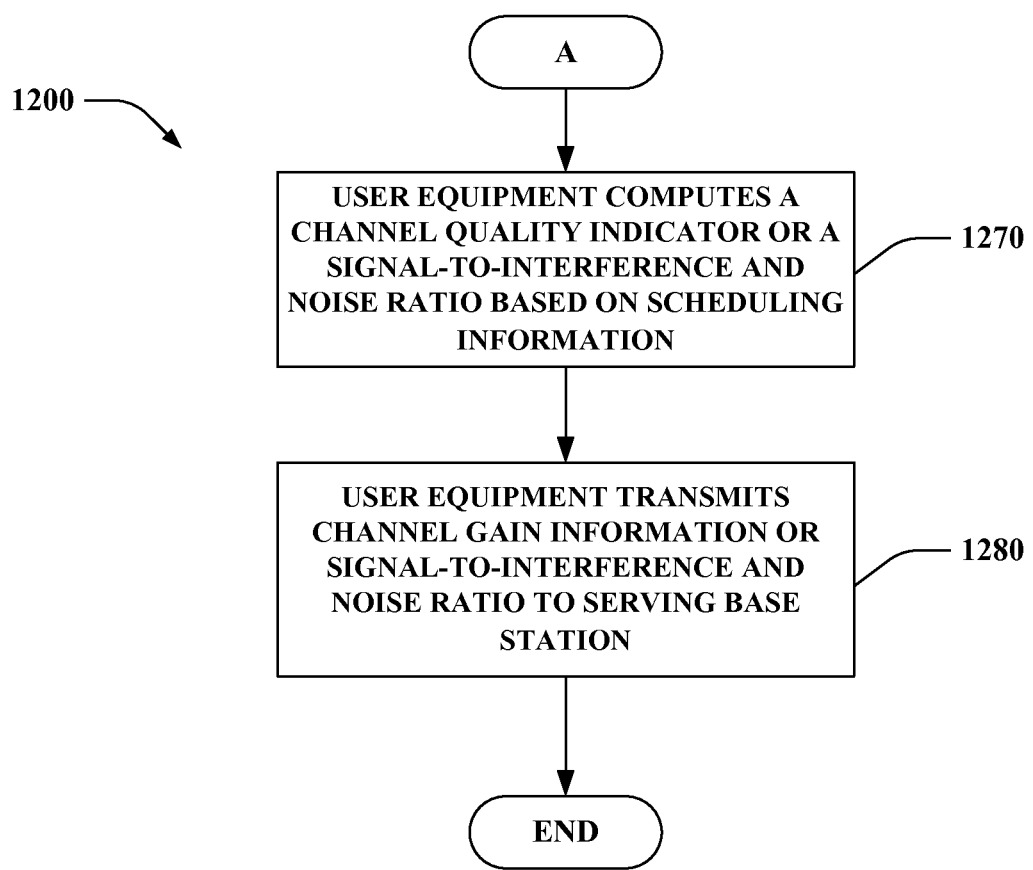

FIGS. 12A and 12B are illustrations of partial views of methods of facilitating interference management on a DL of a system employing OTA communication in accordance with various aspects described herein.

At 1210, method 1200 can include a UE receiving information indicative of a buffer state associated with the UE. In embodiments wherein the UE is a UE, the information indicative of the buffer state associated for the UE can be received from the serving BS for the UE. The serving BS can maintain buffer state information for the UE. Buffer state information can include, but is not limited to, a priority of traffic that the UE will be served by the serving BS.

At 1220, method 1200 can include the UE receiving interference information from BSs. The interference information can include, but is not limited to, information indicative of the priority of traffic that the BSs intend to transmit and/or transmit power levels on pilot signals. In some embodiments, the BSs can transmit the interference information after receiving the buffer state information that was transmitted from the serving BS and intended for the UE, as the BSs may be able to receive such information.

At 1230, method 1200 can include the UE setting a value for nominal interference based on the interference information received from the BSs. The nominal interference can be set by employing the method 700 described above with regard to FIG. 7 or by employing any of the modifications to method 700 discussed herein.

In some embodiments, the UE can generate a measurement report. The measurement report can include the nominal interference and/or interference information received from the BSs. The UE can transmit the measurement report to the serving BS.

Referring back to FIGS. 12A and 12B, at 1240, method 1200 can include the UE transmitting the nominal interference, and the priority information for the traffic associated with the UE. In some embodiments, the channel gain information can also be transmitted. In other embodiments, the channel gain information is not transmitted as the BSs can determine the channel gain information on the cross communication link between the BS and the UE by measuring the strength of the transmissions from the UE.

At 1250, method 1200 can include the UE receiving scheduling information from one or more interfering BSs. The scheduling information can be received in response to transmitting the nominal interference, and the priority information (and, in some embodiments, the channel gain information) associated with the UE. The scheduling information can be indicative of a plan to transmit at selected transmit power levels (or to backoff and not transmit). At 1260, method 1200 can include the UE receiving scheduling information from a serving BS based on the scheduling information from the one or more interfering BSs.

In some embodiments, at 1270, method 1200 can include the UE computing a channel quality indicator (CQI) or an SINR based on the scheduling information. At 1280, method 1200 can include the UE transmitting the channel gain information and/or the SINR to the serving BS based on the scheduling information received and/or based on the pilot signals received from the BSs.

Figure 13A:
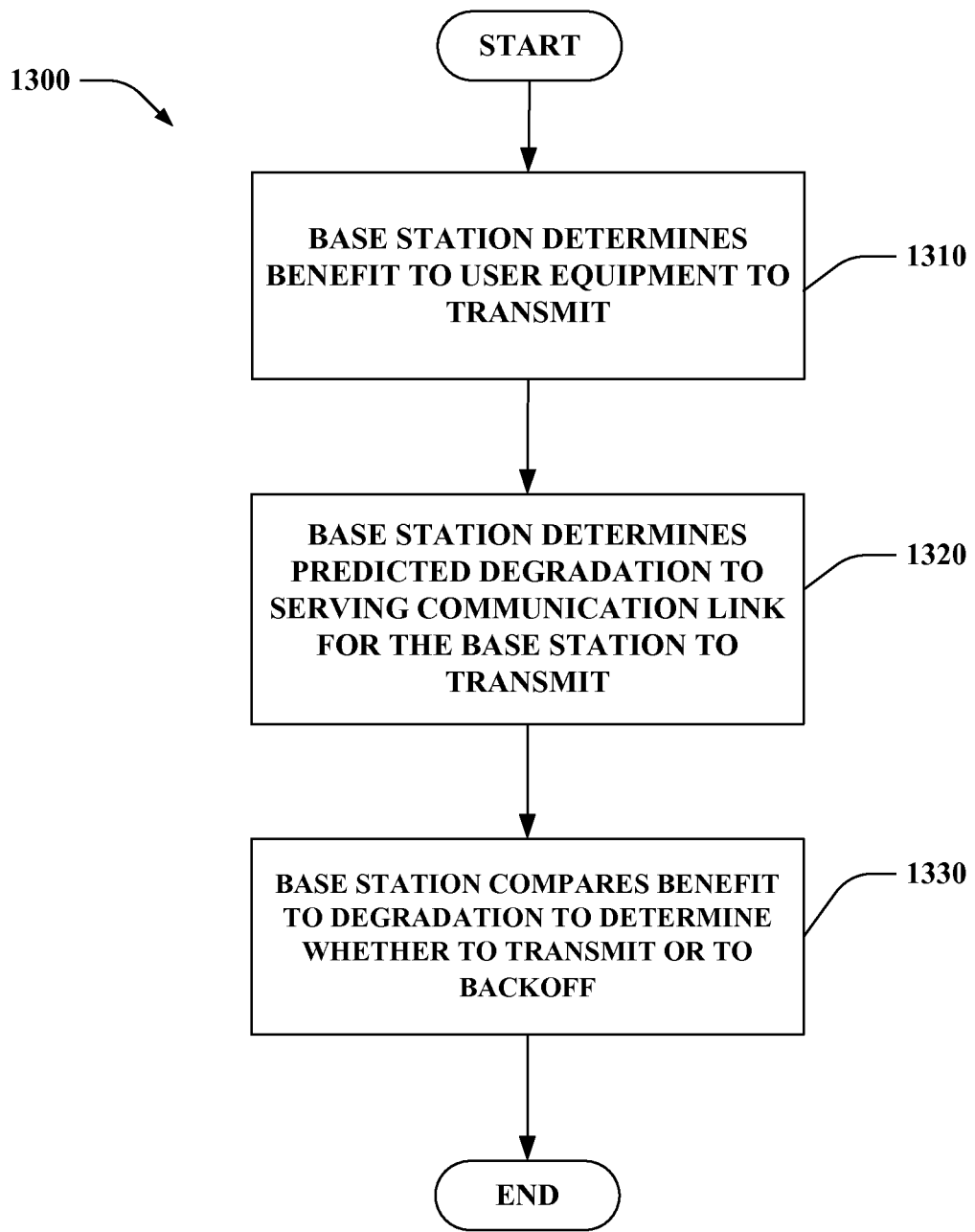
FIGS. 13A, 13B and 13C are illustrations of examples of methods of scheduling on a DL of a system in accordance with various aspects described herein.

FIG. 13A is an illustration of an example of a method of scheduling on a DL of a system in accordance with various aspects described herein. At 1310, method 1300 can include a BS determining a benefit to a UE to transmit. At 1320, method 1300 can include the BS determining a predicted degradation to the serving communication link for the BS to transmit. At 1330, method 1300 can include the BS comparing the benefit to the BS and the degradation to the serving communication link to determine whether to transmit or to backoff and forego transmission (and/or to transmit at a power level lower than a full power level).

In various embodiments disclosed herein, methods can be performed for interference management on the UL. In embodiments for interference management on the UL, the BSs can be UEs and the UE can be a BS.

Figure 13B:
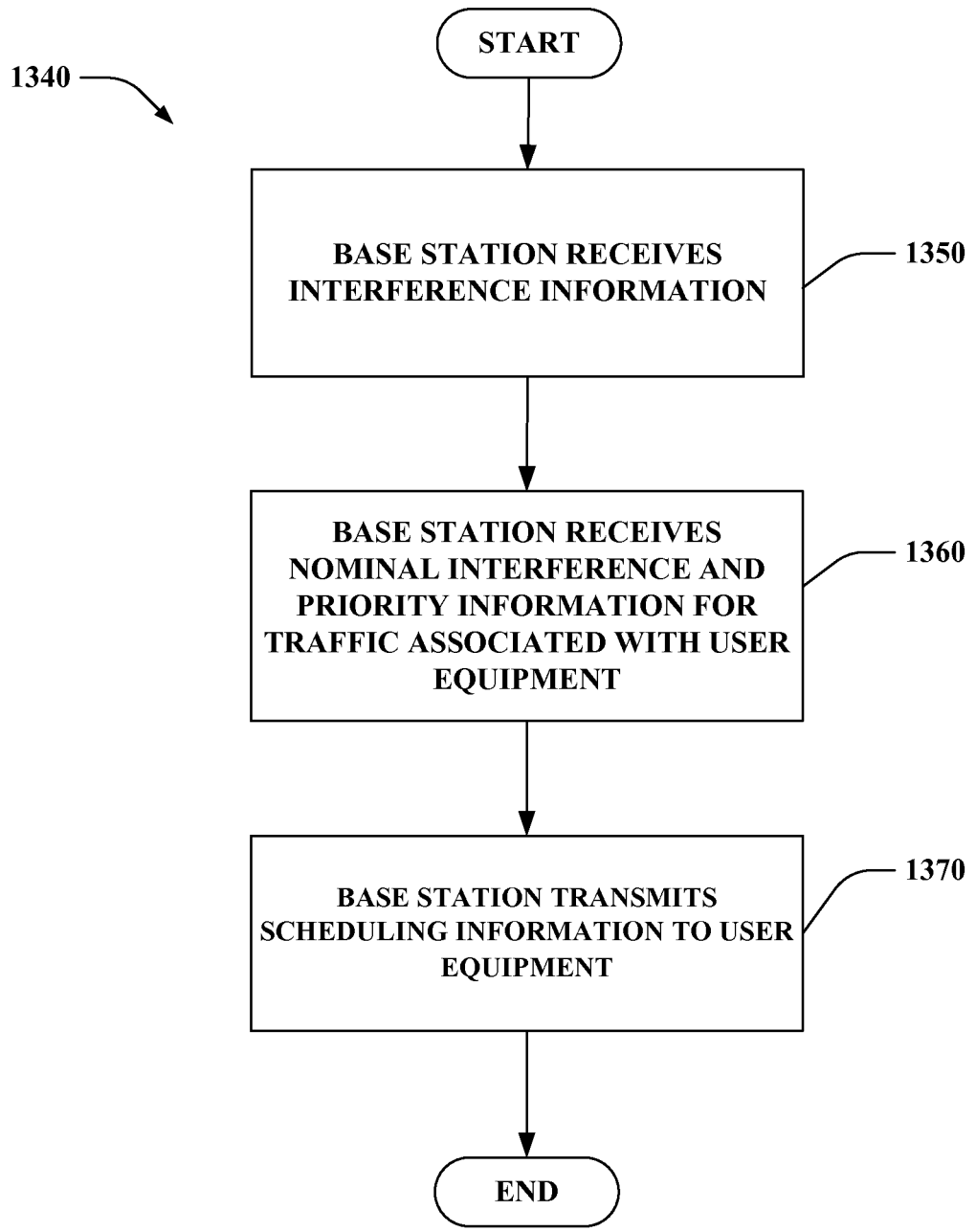

FIG. 13B is an illustration of an example of a method of scheduling on a DL of a system in accordance with various aspects described herein. At 1350, method 1340 can include receiving interference information for one or more interfering BS. The interference information for the one or more interfering BS can be received from a UE.

At 1360, method 1340 can include receiving a nominal interference and priority information for traffic associated with the UE. The priority information for traffic associated with the UE can correspond to information indicative of buffer state associated with the UE.

At 1370, method 1340 can include transmitting scheduling information to the user equipment. The scheduling information can be transmitted in response to receiving the nominal interference and the priority information for traffic associated with the UE. In some embodiments, the scheduling information to the UE can include a channel quality indicator or a SINR computed based on the scheduling information transmitted from the one or more interfering BSs. In some embodiments, the scheduling information from the one or more interfering BSs can be indicative of at least one of the one or more interfering BSs scheduling a backoff.

Figure 13C:
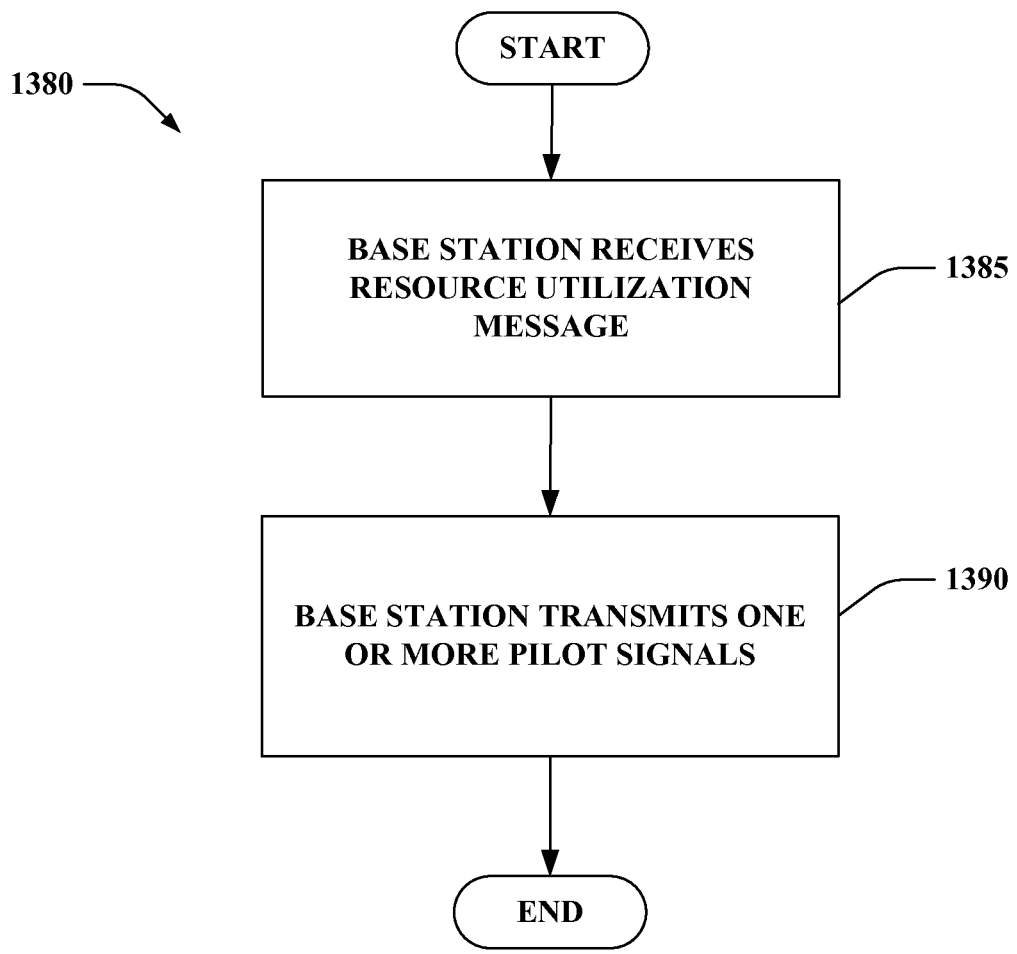

FIG. 13C is an illustration of an example of a method of scheduling on a DL of a system in accordance with various aspects described herein. At 1385, method 1380 can include receiving a RUM.

At 1390, method 1380 can include transmitting one or more pilot signals in response to receiving the RUM. The one or more pilot signals can be transmitted from one or more interfering BSs in response to receiving the RUM. The one or more pilot signals can be measured by a UE to compute interference for the one or more interfering BSs.

Figure 14:
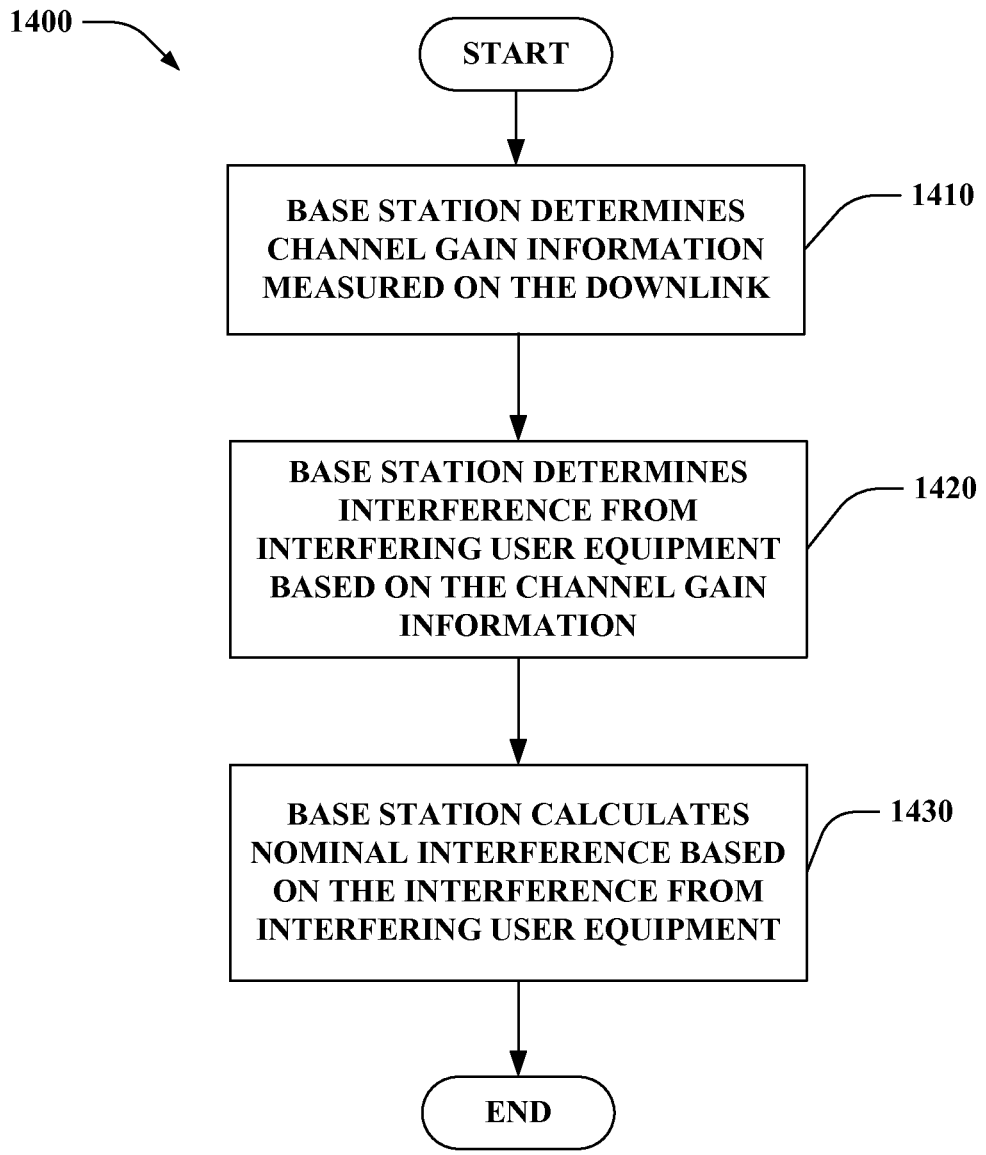
FIG. 14 is an illustration of an example of a method of determining nominal interference from user equipment on an UL of a system in accordance with various aspects described herein.

FIG. 14 is an illustration of an example of a method of determining nominal interference from user equipment on an UL of a system in accordance with various aspects described herein. At 1410, method 1400 can include the BS determining channel gain information measured on the DL. The channel gain information measured on the DL can be for a channel between a UE served by the BS and out-of-cell BSs. In some embodiments, the channel gain information can be received from the UE in a measurement report such as that described with reference to method 800.

At 1420, method 1400 can include determining the interference from interfering UEs based on the channel gain information. At 1430, method 1400 can include the BS calculating a nominal interference based on the interference determined for the interfering UEs. In some embodiments, method 1400 can also include the BS assigning the channel gain information measured on the DL to the UL.

Figure 15:
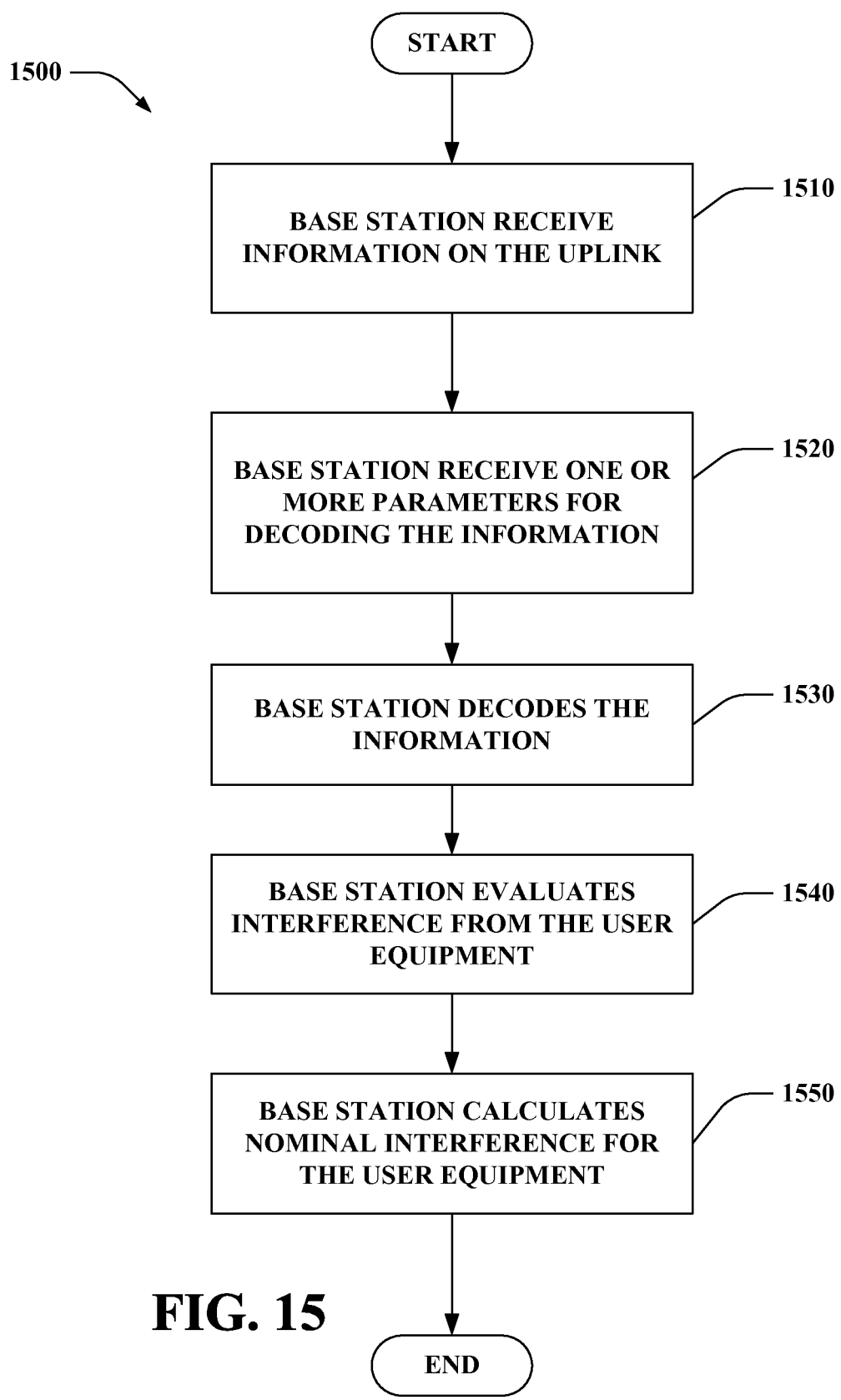
FIG. 15 is an illustration of an example of another method of determining nominal interference from user equipment on an UL of a system in accordance with various aspects described herein.

FIG. 15 is an illustration of an example of another method of determining nominal interference from user equipment on an UL of a system in accordance with various aspects described herein. In some embodiments, the system can be an LTE system.

At 1510, method 1500 can include a BS receiving information on the UL In some embodiments, the information on the UL can be a sounding reference signal (SRS) on the UL. In one embodiment, the SRS can be a channel from a UE to the BS in an LTE system. The UE can periodically transmit the SRS in some embodiments.

At 1520, method 1500 can include the out-of-cell BS receiving one or more parameters for decoding the information on the uplink. When the SRS is the information on the UL, the information for decoding the SRS can include, but is not limited to, information and/or parameters indicative of the configuration of the SRS.

The information and/or parameters can be transmitted to out-of-cell BSs. In various embodiments, the information can be transmitted over the backhaul, through the X2 or S1 interfaces and/or through a handover message for an incomplete handoff.

At 1530, method 1500 can include the out-of-cell BS decoding the information on the UL. At 1540, method 1500 can include the BS evaluating interference from the UE. At 1550, method 1500 can include the BS calculating a nominal interference for the UE.

In some embodiments, the BS that serves the UE can also transmit power headroom measurements to out-of-cell BSs to enable the out-of-cell BSs to estimate the interference caused by the UE when the UE transmits at full power. In some embodiments, method 1500 can be modified such that the SRS can be periodically transmitted at full power, or a known power. The out-of-cell BSs can then evaluate the interference caused by the UEs based on the strength of the SRS received without any knowledge of the power headroom report. The power headroom report then need not be transmitted by the serving BS.

Figure 16A:
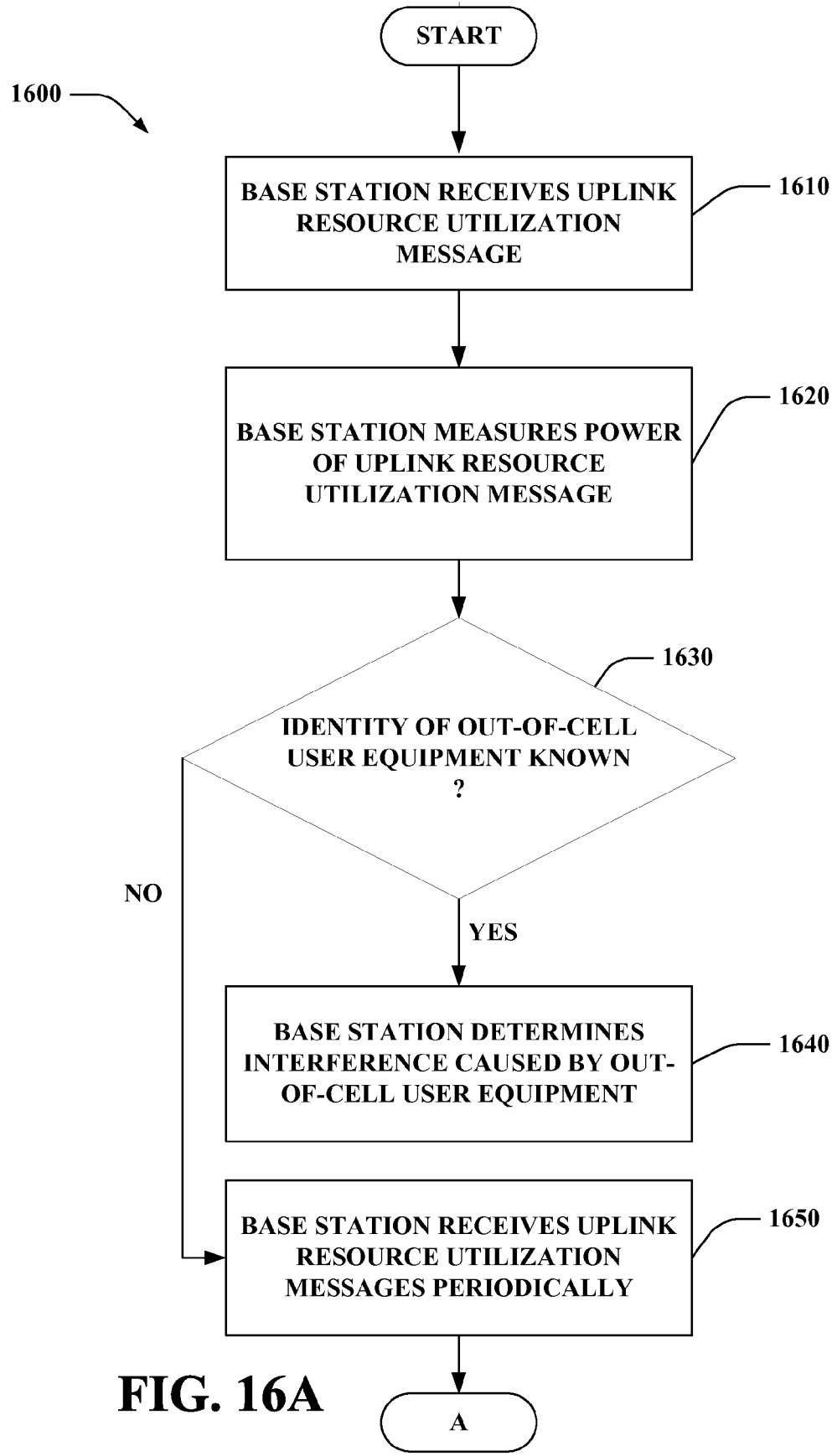
FIGS. 16A and 16B are illustrations of partial views of examples of another method of determining nominal interference from user equipment on an UL of a system in accordance with various aspects described herein.
Figure 16B:
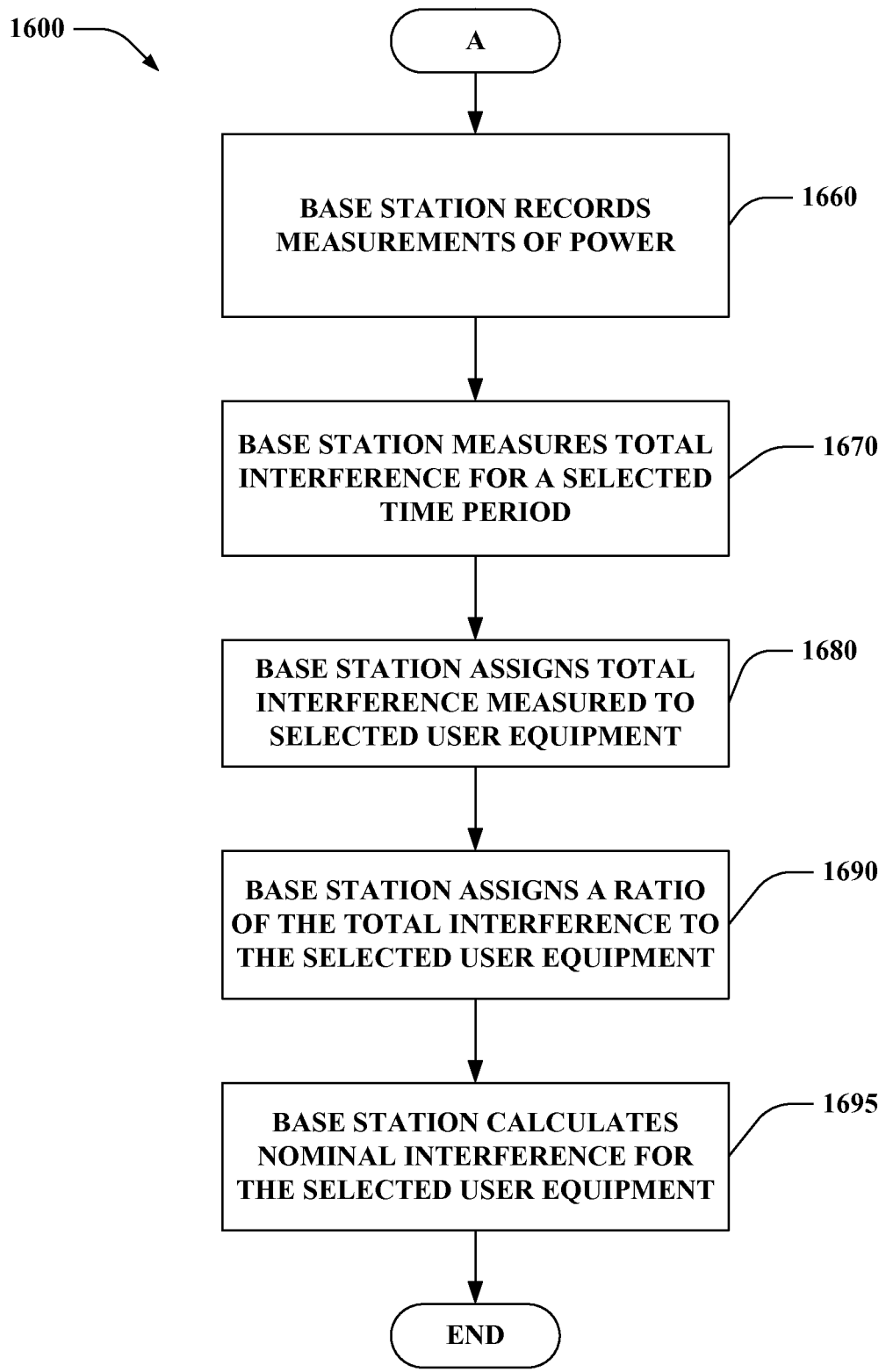

FIGS. 16A and 16B are illustrations of partial views of an example of another method of determining interference from user equipment on an UL of a system in accordance with various aspects described herein. At 1610, method 1600 can include a BS receiving one or more UL resource utilization messages (URUMs).

The URUM can be a control channel between the BS and the UE in some embodiments wherein the BS is a serving BS and the UE is a UE served by the BS. In some embodiments, the URUM can include information indicative of resources selected by a UE for transmission of information. A UE can transmit a URUM to request a selected level of SINR or nominal interference on a selected resource, such as a particular channel on which the BS would like to receive information on in a subsequent time interval. In some embodiments, the URUMs can include information indicative of a priority of traffic to be transmitted from the UEs. In some embodiments, the UE can request a resource on which the UE would like to transmit during a subsequent time interval. Accordingly, upon the BS receiving the URUM, the BS can clear or reduce interference on the DL.

In some embodiments, a convention could be used to indicate that a particular URUM is to be used only for interference measurements. By way of example, but not limitation, setting the set of resources over which the URUM is used to clear interference on the DL to be the null set (instead of indicating channel resources) can indicate that the URUM is to be used for interference measurements.

At 1620, method 1600 can include the BS measuring the power of the URUMs.

At 1630, method 1600 includes determining if the identity of the out-of-cell UE that transmitted the URUM is known to the BS. At 1640, if the identity is known, method 1600 can include the BS determining the interference caused to the BS by the out-of-cell UE by measuring a power of the URUM and/or by evaluating the contents of the URUM.

At 1650, if the identity is not known, method 1600 can include the BS receiving URUMs from out-of-cell UEs at periodic intervals. At 1660, method 1600 can include the BS recording the measurements of the power and/or the contents of the URUMs over a selected time period.

At 1670, method 1600 can include the BS measuring a total interference for the selected time period. At 1680, method 1600 can include the BS assigning the total interference measured to the out-of-cell UEs whose URUMs the BS can decode. At 1690, method 1600 can include the BS assigning a ratio of the total interference to the out-of-cell UEs whose URUMs the BS can decode. The ratio assigned to a particular out-of-cell UE can be the ratio of the power for the URUMs received from the out-of-cell UE.

At 1695, method 1600 can include the BS calculating a nominal interference for the out-of-cell UEs based on the interference assigned to each of the out-of-cell UEs.

Figure 17A:
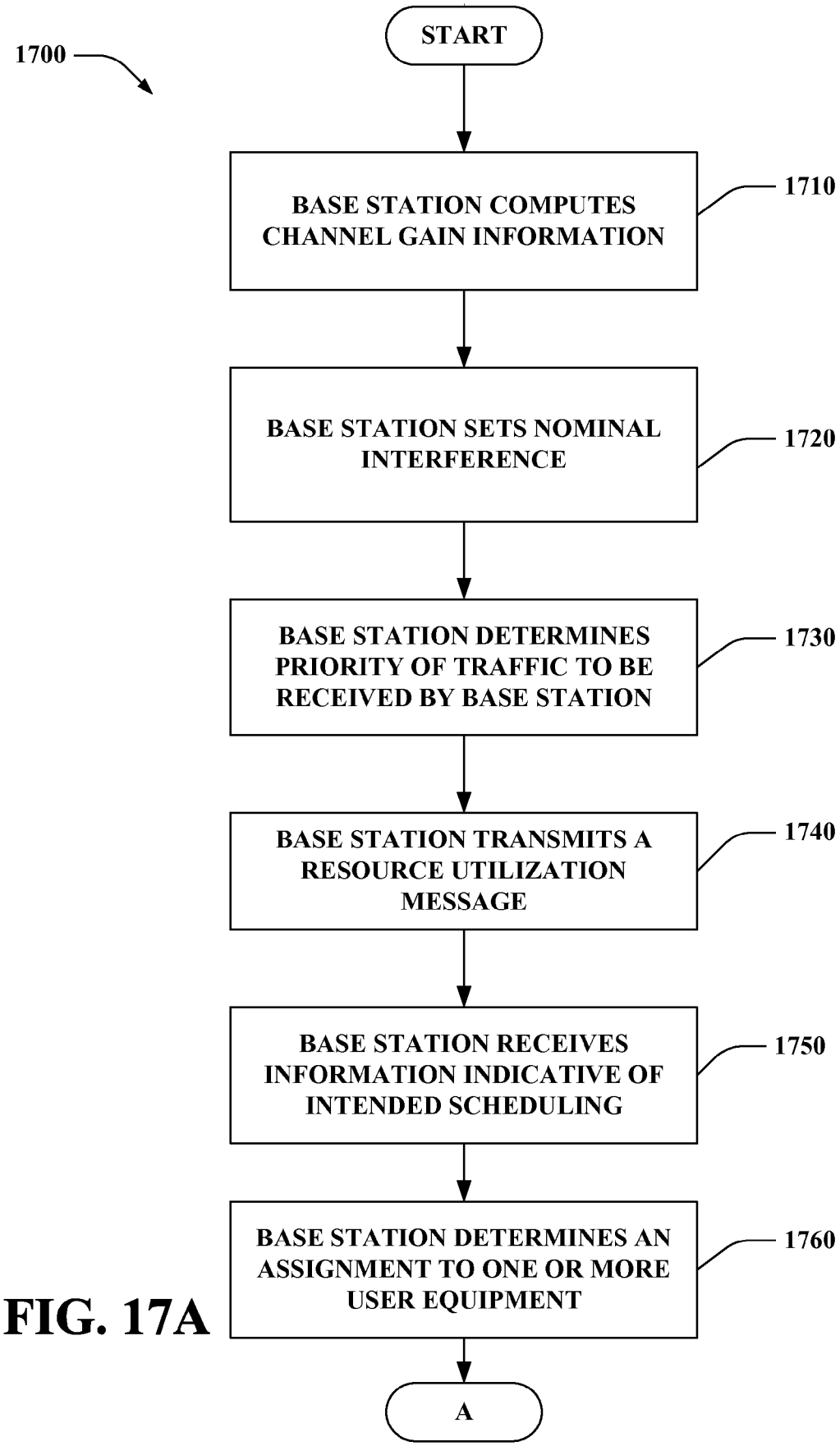
FIGS. 17A and 17B are illustrations of partial views of examples of a method of scheduling for facilitating interference management on an UL in accordance with aspects described herein.
Figure 17B:
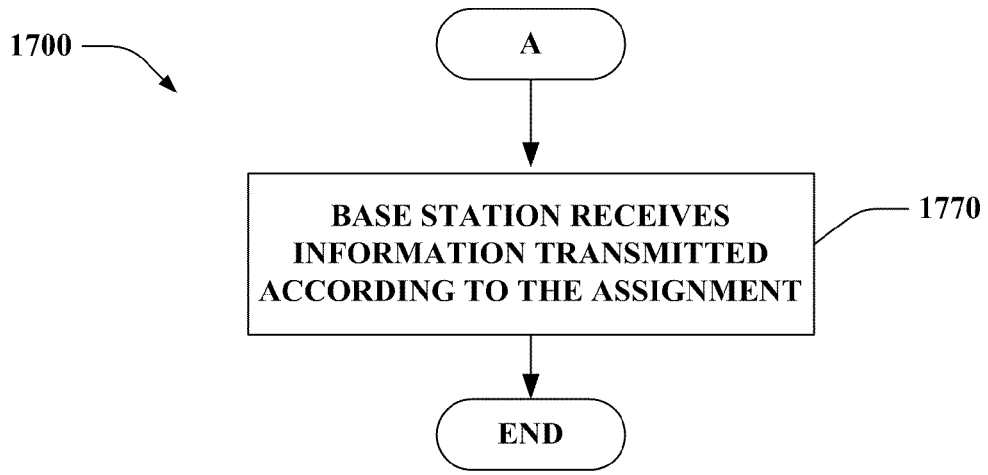

FIGS. 17A and 17B are flowcharts of partial views of an example of a method of scheduling for facilitating interference management on an UL in accordance with aspects described herein. At 1710, method 1700 can include a BS computing channel gain information. The channel gain information can be indicative of a channel between the BS and one or more interfering UE. In some embodiments, computing channel gain information can include at least one of: computing the channel gain information based on a measurement report and power information indicative of channel conditions on a downlink over a frequency band that corresponds to a frequency band of the UL; or measuring a power level of a SRS received at the BS from the one or more interfering UE.

At 1720, method 1700 can include a BS setting a nominal interference between the BS and at least one of the one or more interfering UE. In some embodiments, the setting the nominal interference can include assigning a value to the nominal interference such that a backoff is performed by a selected number of most dominant ones of the one or more interfering UE.

At 1730, method 1700 can include the BS determining a priority of traffic to be received by the BS from one or more UE served by the BS. At 1740, method 1700 can include the BS transmitting a resource utilization message (RUM) to the one or more interfering UE. The RUM can include the priority of traffic to be received by the BS from one or more UE served by the BS, and the nominal interference between the BS and the one or more interfering UE.

At 1750, method 1700 can include the BS receiving information indicative of intended scheduling from the one or more interfering UE. The information indicative of the intended scheduling can be based on the nominal interference and the priority of the traffic in the RUM. At 1760, method 170 can include the BS determining an assignment to the one or more UE served by the BS. The assignment can be based on the information indicative of the intended scheduling from the one or more interfering UE. In some embodiments, the assignment includes at least one of a data rate or a bandwidth allocation at which the one or more UE served by the BS will transmit data on the UL to the BS.

At 1770, method 1700 can include the BS receiving information transmitted according to the assignment.

At 1710, method 1700 can include a BS computing channel gain information for cross communication links between the BS and interfering UEs. The BS can compute the channel gain information from any number of methods, including those described above with reference to FIGS. 14-16.

Referring back to FIGS. 17A and 17B, at 1720, method 1700 can include the BS computing a desired nominal interference, and computing a priority of traffic intended for the BS from the UE served by the BS. The desired nominal interference can be a function of the channel gain information.

In various embodiments, the nominal interference can be set by the BS to a selected value such that one or more dominant UEs backoff and/or transmit at transmit power levels below a selected value.

At 1730, method 1700 can include the BS transmitting a RUM to out-of-cell UEs. The RUM can be transmitted over the backhaul or OTA. In various embodiments, the RUM can include a priority of the traffic to be received from a UE served by the BS and/or the set value of the nominal interference between the BS and the UE.

In some embodiments, the RUM can also include channel gain information. However, in various embodiments, the channel gain information is not transmitting and can be inferred by the UEs. The UEs can infer the channel gain information by determining the strength of the pilot signal transmitted by the BS.

At 1740, method 1700 can include determining an intended transmit power level of a transmission in a cell in which the UE operates. The intended transmit power level can be based on the nominal interference set by the BS and/or the priority of the traffic transmitted by the BS. In various embodiments, the intended transmit power level can be indicative of a backoff in transmission.

At 1750, method 1700 can include the UE transmitting to the BS, information indicative of intended scheduling. In some embodiments, the information indicative of the intended scheduling can include the intended transmit power level. The intended transmit power level can be transmitted over pilot signals. At 1760, method 1700 can include the BS making an assignment to a UE served by the BS based on the information indicative of intended scheduling (e.g., intended transmit power level and corresponding amount of backoff). The assignment can include, but is not limited to, the data rate, bandwidth and other transmission parameters for the UE served by the BS.

At 1770, method 1700 can include the BS receiving information transmitted according to the assignment. The information can be received from the UE served by the BS.

While, in some embodiments, step 1740 can be performed by a UE in a cell outside of the cell in which the BS is located, for a more centralized control of scheduling, the method 1700 can be modified as follows. The UEs can provide feedback of the RUM to the BSs that serve the UEs. The BS can then schedule intended transmit power levels (and/or backoff behavior) to the UEs. The method 1700 can then resume at 1750 with the UE transmitting to the BS, the intended transmit power level.

Figure 17C:
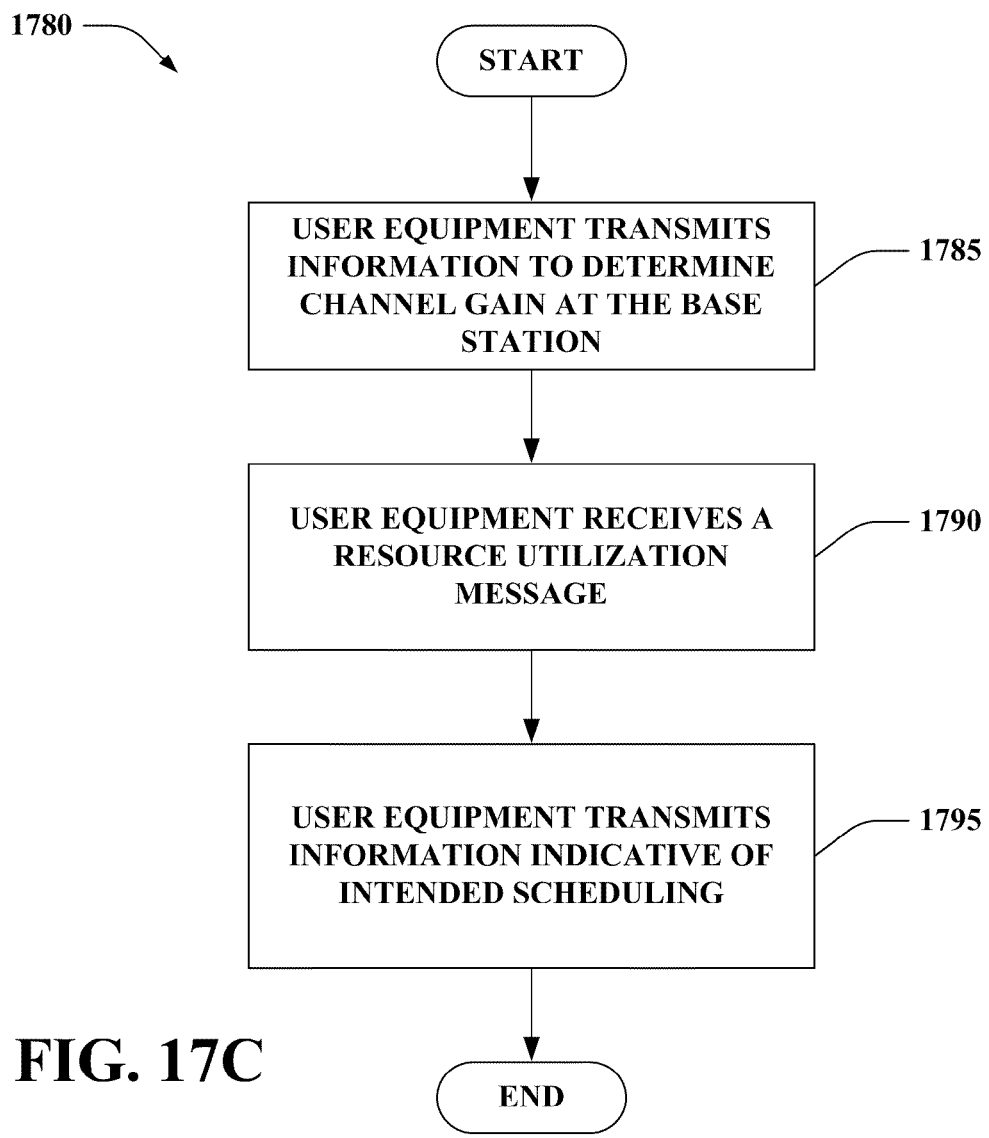
FIG. 17C is an illustration of an example of another method of scheduling for facilitating interference management on an UL in accordance with aspects described herein.

FIG. 17C is a flowchart of an example method of scheduling for facilitating interference management on an UL in accordance with aspects described herein.

At 1785, method 1780 can include the UE transmitting information for determining channel gain information at a BS. At 1790, method 1780 can include receiving a RUM, by the UE.

The RUM can include: a priority of traffic to be received by the BS on serving links from UE served by the BS; and a value of nominal interference between the BS and the UE, wherein the value of the nominal interference is based on the channel gain information. At 1795, method 1780 can include transmitting information indicative of intended scheduling, wherein the transmitting is performed by the UE, and wherein the information indicative of intended scheduling is based on the value of the nominal interference for the UE served by the BS, the priority of the traffic to be received on serving links, the channel gain information on the serving links, the nominal interference for UE not served by the BS, the priority of the traffic to be received on interfering links or the channel gain information on the interfering links.

In some embodiments, the channel gain information on the serving links is based on at least one of: a measurement report and power information indicative of channel conditions on a downlink over a frequency band that corresponds to a frequency band of the uplink; or a power level of a sounding reference signal received at the BS from the UE.

In some embodiments, the assignment includes at least one of a data rate or a bandwidth allocation at which the user equipment served by the BS can transmit data on the UL to the BS.

Figure 18:
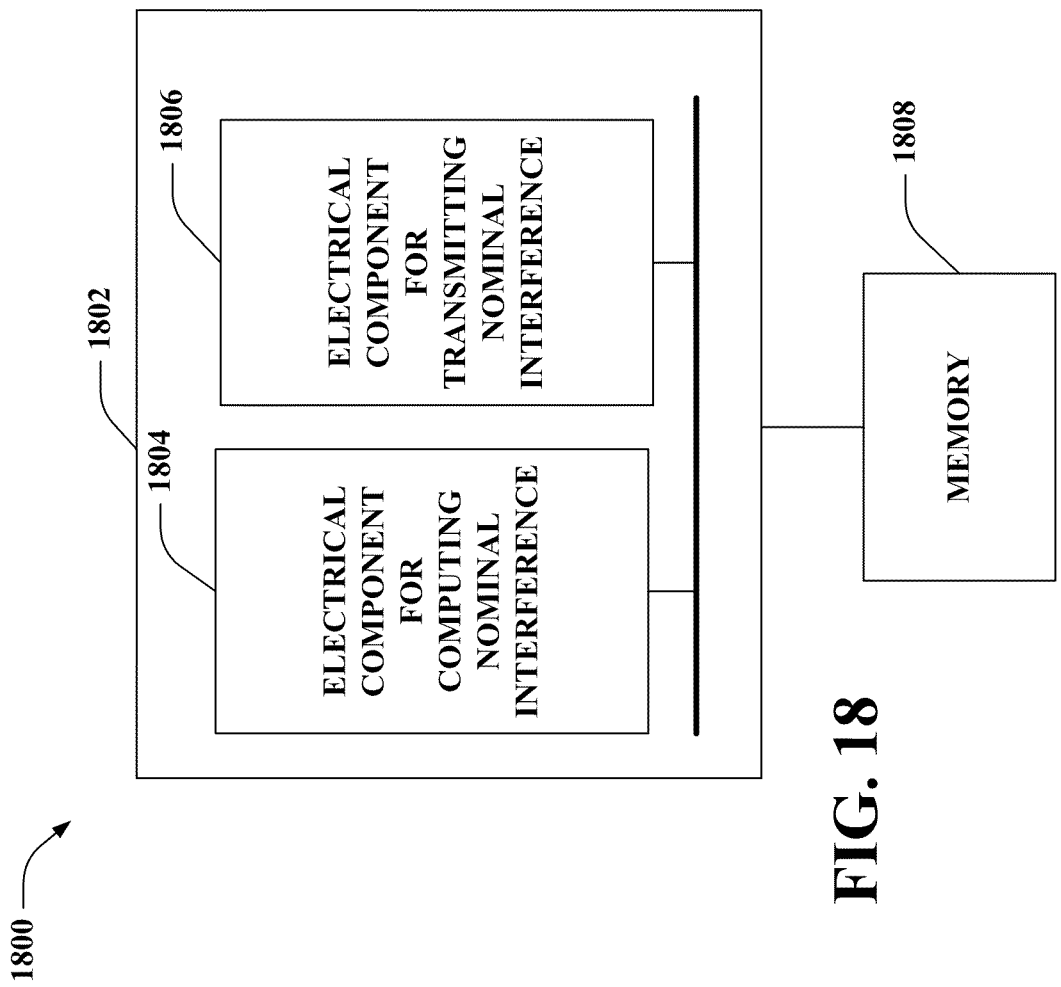
FIGS. 18-28 are illustrations of block diagrams of example systems for facilitating interference management in accordance with various aspects set forth herein.

FIG. 18 is an illustration of a block diagram of an example system for facilitating interference management in accordance with various aspects set forth herein. It is to be appreciated that system 1800 is represented as including functional blocks, which can be functional blocks that represent functions implemented by a processor, hardware, software, firmware, or combination thereof. System 1800 can include a logical or physical grouping 1802 of electrical components for facilitating interference management.

The electrical components can act in conjunction. For instance, the logical or physical grouping 1802 can include an electrical component 1804 for computing nominal interference. In some embodiments, the nominal interference is computed using one or more of: channel gain information for the one or more interfering BSs, average traffic loading for the one or more interfering BSs, instantaneous traffic loading for the one or more interfering BSs, traffic loading or priority in one or more cells, buffer state information indicative of traffic loading or priority in one or more cells.

In some embodiments, computing the nominal interference can include: determining interference from the one or more interfering BSs; computing a transmission rate for the one or more interfering BSs; determining a number of the one or more interfering BSs that maximizes a transmission rate at the out-of-cell UE; and computing a nominal interference corresponding to the number of the one or more interfering BSs that maximizes the transmission rate at the out-of-cell UE.

The logical or physical grouping 1802 can also include an electrical component 1806 for transmitting the nominal interference to one or more interfering BSs. The nominal interference can be transmitted to at least one of the one or more interfering BSs to compute a loss in transmission rate to an out-of-cell UE if the at least one of the one or more interfering BSs transmits over a same set of resources on which the out-of-cell UE receives information.

The logical or physical grouping 1802 can also include an electrical component 1808 for storing. The electrical component 1808 for storing can be configured to store nominal interference and/or information for computing nominal interference.

In various embodiments, the one or more interfering BSs can be at least one of: one or more interfering BSs for which the interference is greater than a selected threshold or one or more interfering BSs that have transmitted information during a selected number of past subframes.

Figure 19:
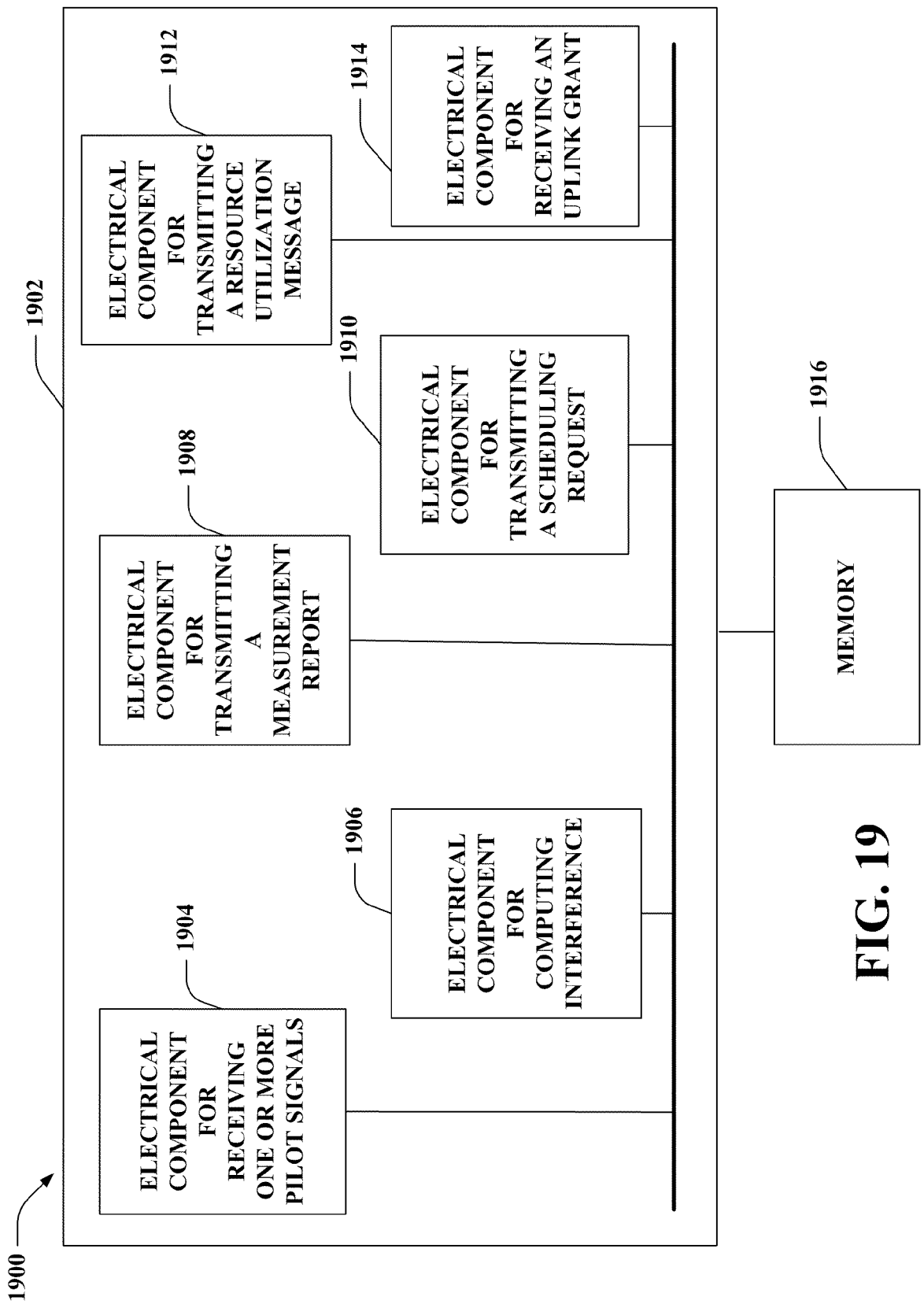

FIG. 19 is an illustration of a block diagram of another example system for facilitating interference management in accordance with various aspects set forth herein. It is to be appreciated that system 1900 is represented as including functional blocks, which can be functional blocks that represent functions implemented by a processor, hardware, software, firmware, or combination thereof. System 1900 can include a logical or physical grouping 1902 of electrical components for facilitating interference management.

The electrical components can act in conjunction. For instance, the logical or physical grouping 1902 can include an electrical component 1904 for receiving one or more pilot signals. The one or more pilot signals can be received from the one or more interfering BSs and a UE can receive the one or more pilot signals. The logical or physical grouping 1902 can also include an electrical component 1906 for computing interference for the one or more interfering BSs. The electrical component 1906 for computing interference for the one or more interfering BSs can include an electrical component for determining a signal strength of the one or more pilot signals.

The logical or physical grouping 1902 can also include an electrical component 1908 for transmitting a measurement report. The measurement report can include the interference. The measurement report can be transmitted to a serving BS.

The logical or physical grouping 1902 can also include an electrical component 1910 for storing. The electrical component 1910 for storing can be configured to store measurement reports, uplink grants, scheduling requests, interference information and/or resource utilization messages or information for generating resource utilization messages, scheduling requests, measurement reports and/or interference information.

Figure 20:
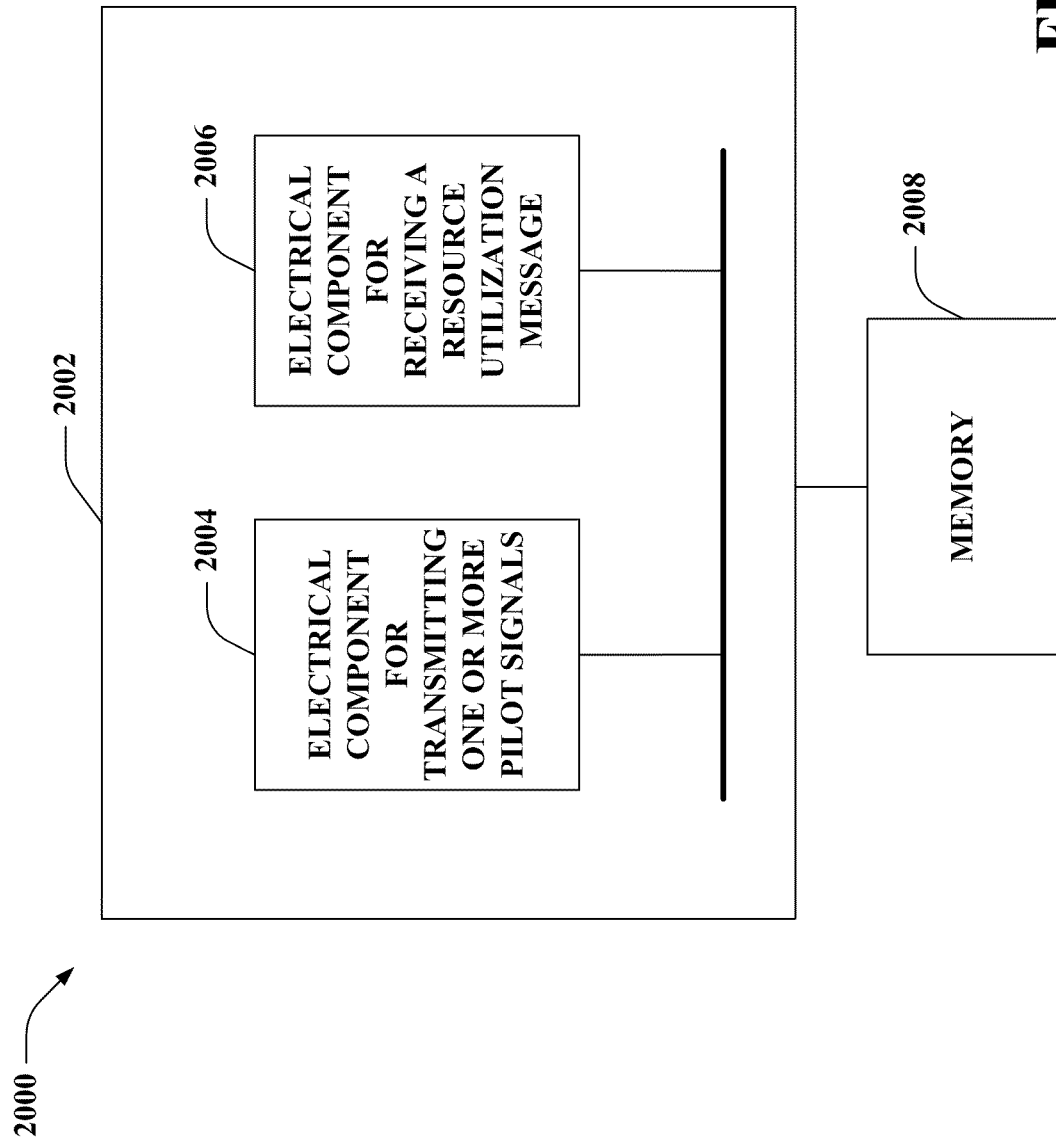

FIG. 20 is an illustration of a block diagram of another example system for facilitating interference management in accordance with various aspects set forth herein. It is to be appreciated that system 2000 is represented as including functional blocks, which can be functional blocks that represent functions implemented by a processor, hardware, software, firmware, or combination thereof. System 2000 can include a logical or physical grouping 2002 of electrical components for facilitating interference management.

The electrical components can act in conjunction. For instance, the logical or physical grouping 2002 can include an electrical component 2004 for transmitting one or more pilot signals. The one or more pilot signals can be transmitted from one or more interfering BSs and a UE can receive the one or more pilot signals. The one or more pilot signals can be measured to compute interference for the one or more interfering BSs. Computing the interference for the one or more interfering BSs can include determining a signal strength of the one or more pilot signals.

The logical or physical grouping 2002 can also include an electrical component 2006 for receiving a RUM. The electrical component 2004 for transmitting one or more pilot signals can transmit the one or more pilot signals in response to the electrical component 2006 for receiving a resource utilization message receiving the RUM.

The logical or physical grouping 2002 can also include an electrical component 2008 for storing. The electrical component 2008 for storing can be configured to store resource utilization messages or information for generating resource utilization messages, pilot signals, and/or interference information.

Figure 21:
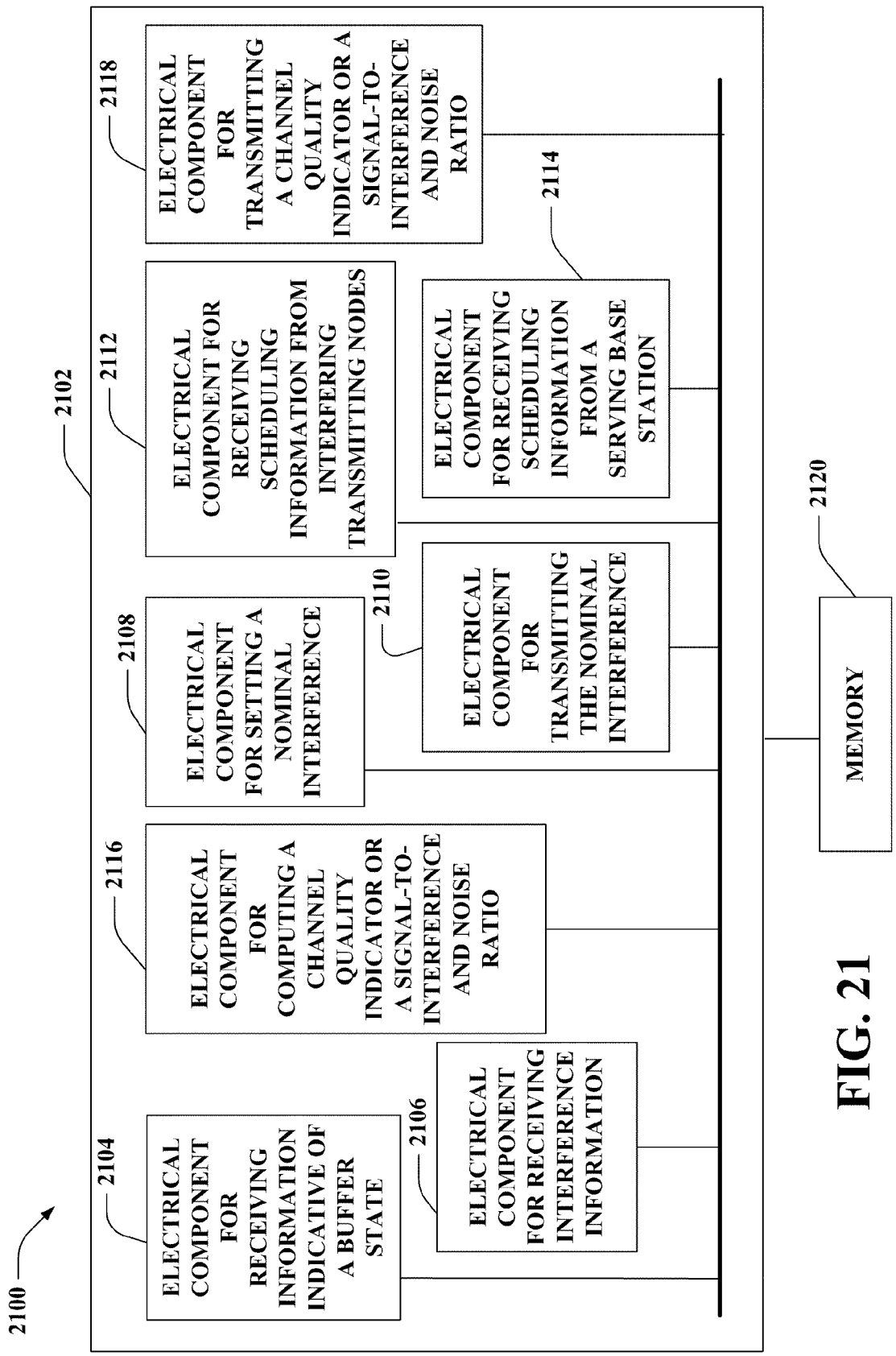

FIG. 21 is an illustration of a block diagram of another example system for facilitating interference management in accordance with various aspects set forth herein. It is to be appreciated that system 2100 is represented as including functional blocks, which can be functional blocks that represent functions implemented by a processor, hardware, software, firmware, or combination thereof. System 2100 can include a logical or physical grouping 2102 of electrical components for facilitating interference management.

The electrical components can act in conjunction. For instance, the logical or physical grouping 2102 can include an electrical component 2104 for receiving information indicative of buffer state associated with a UE. The information can be received at a UE. The information indicative of the buffer state can include a priority of traffic that the UE will be served by the serving BS.

The logical or physical grouping 2102 can also include an electrical component 2106 for receiving interference information from one or more interfering BSs.

The logical or physical grouping 2102 can also include an electrical component 2108 for setting a nominal interference. The nominal interference can be based on the interference information. The logical or physical grouping 2102 can also include an electrical component 2110 for transmitting the nominal interference and priority information for traffic associated with the UE. The nominal interference and the priority information can be transmitted to the one or more interfering BSs.

The logical or physical grouping 2102 can also include an electrical component 2112 for receiving scheduling information from the one or more interfering BSs. The scheduling information can be received in response to transmitting the nominal interference and priority information for traffic associated with the UE. The scheduling information from the one or more interfering BSs can be indicative of at least one of the one or more interfering BSs scheduling a backoff The logical or physical grouping 2102 can also include an electrical component 2114 for receiving scheduling information from a serving BS. The scheduling information can be based on the scheduling information from the one or more interfering BSs.

The logical or physical grouping 2102 can also include an electrical component 2116 for computing a channel quality indicator or a signal-to-interference and noise ratio based on the scheduling information from the one or more interfering BSs. The logical or physical grouping 2102 can also include an electrical component 2118 for transmitting the channel quality indicator or the signal-to-interference and noise ratio to the serving BS, wherein receiving scheduling information from the serving BS is performed in response to computing the channel quality indicator or the signal-to-interference and noise ratio and the transmitting the channel quality indicator or the signal-to-interference and noise ratio.

The logical or physical grouping 2102 can also include an electrical component 2120 for storing. The electrical component 2120 for storing can be configured to store nominal interference, interference information, buffer state information, signal-to-interference and noise ratio information, channel quality indicator information and/or scheduling information.

Figure 22:
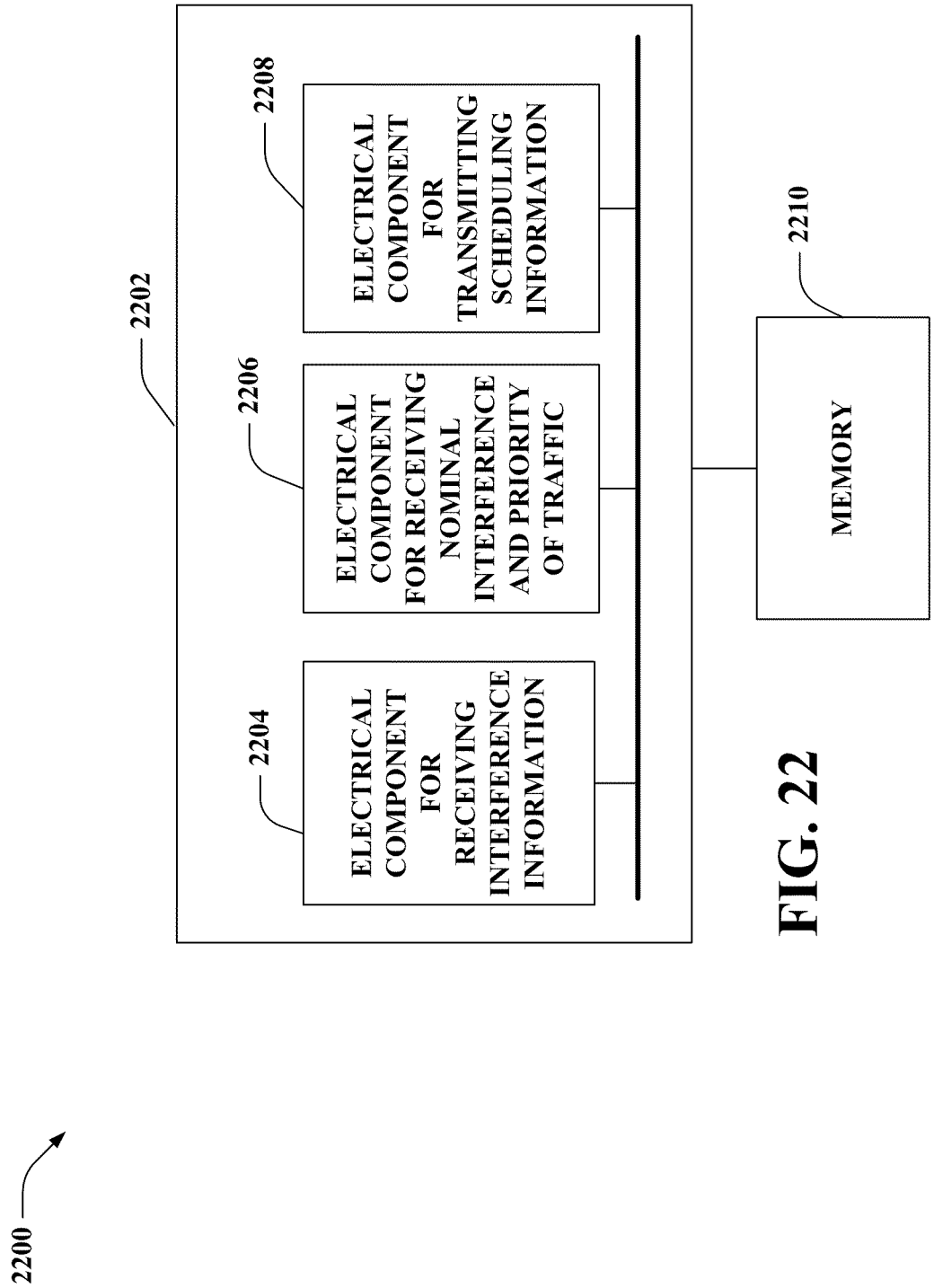

FIG. 22 is an illustration of a block diagram of another example system for facilitating interference management in accordance with various aspects set forth herein. It is to be appreciated that system 2200 is represented as including functional blocks, which can be functional blocks that represent functions implemented by a processor, hardware, software, firmware, or combination thereof. System 2200 can include a logical or physical grouping 2202 of electrical components for facilitating interference management.

The electrical components can act in conjunction. For instance, the logical or physical grouping 2202 can include an electrical component 2204 for receiving interference information for one or more interfering BSs. The interference information for the one or more interfering BSs can be received from a UE.

The logical or physical grouping 2202 can also include an electrical component 2206 for receiving a nominal interference and priority information for traffic associated with the UE. The priority information for traffic associated with the UE can correspond to information indicative of buffer state associated with the UE. The information indicative of the buffer state can include a priority of traffic that the UE will be served by the serving BS.

The logical or physical grouping 2202 can also include an electrical component 2208 for transmitting scheduling information to the UE. The scheduling information can be transmitted in response to receiving the nominal interference and the priority information for traffic associated with the UE. The scheduling information to the UE can be employed to generate scheduling information for the UE from a serving BS.

The scheduling information to the UE can include a channel quality indicator or a signal-to-interference and noise ratio computed based on the scheduling information transmitted from the one or more interfering BSs. The scheduling information from the one or more interfering BSs can be indicative of at least one of the one or more interfering BSs scheduling a backoff.

Figure 23:
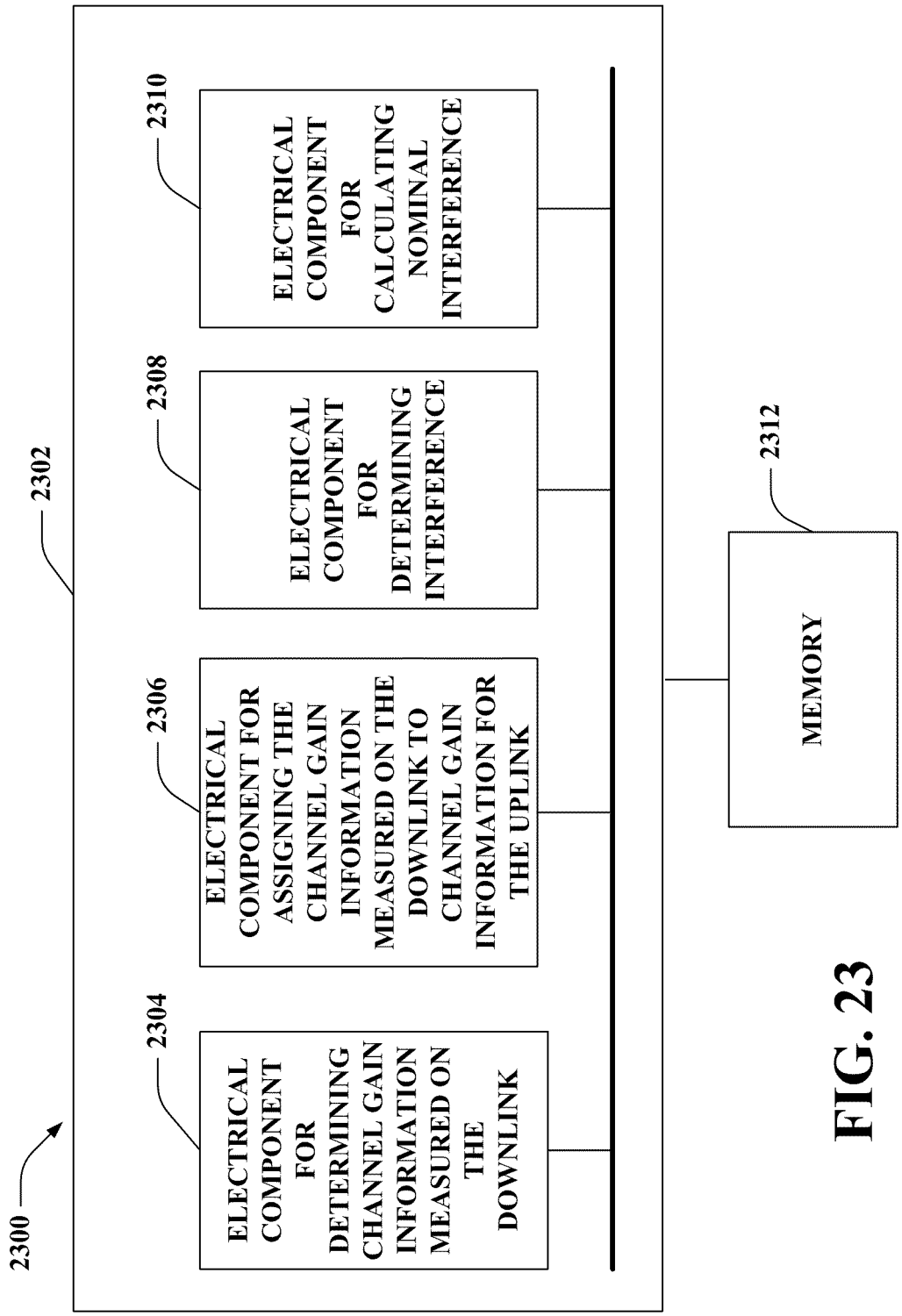

FIG. 23 is an illustration of a block diagram of another example system for facilitating interference management in accordance with various aspects set forth herein. It is to be appreciated that system 2300 is represented as including functional blocks, which can be functional blocks that represent functions implemented by a processor, hardware, software, firmware, or combination thereof. System 2300 can include a logical or physical grouping 2302 of electrical components for facilitating interference management.

The electrical components can act in conjunction. For instance, the logical or physical grouping 2302 can include an electrical component 2304 for determining channel gain information measured on a downlink. In some embodiments, the logical or physical grouping 2302 can also include an electrical component 2306 for determining interference from one or more interfering UEs based on the channel gain information for the uplink. The logical or physical grouping 2302 can also include an electrical component 2308 for calculating a nominal interference based on the interference from the one or more interfering UEs.

The logical or physical grouping 2302 can also include an electrical component 2310 for storing. The electrical component 2310 for storing can be configured to store nominal interference, interference information and/or channel gain information.

The downlink and the uplink channels can be in a wireless communication system, wherein the wireless communication system is a time division duplex system. The system can be a BS. The BS can be a BS in a first cell, and the one or more interfering UEs can be user equipment in a second cell. The first cell can be different from the second cell. The interference can be indicative of a transmit power level at which the one or more interfering UEs transmit.

Figure 24:
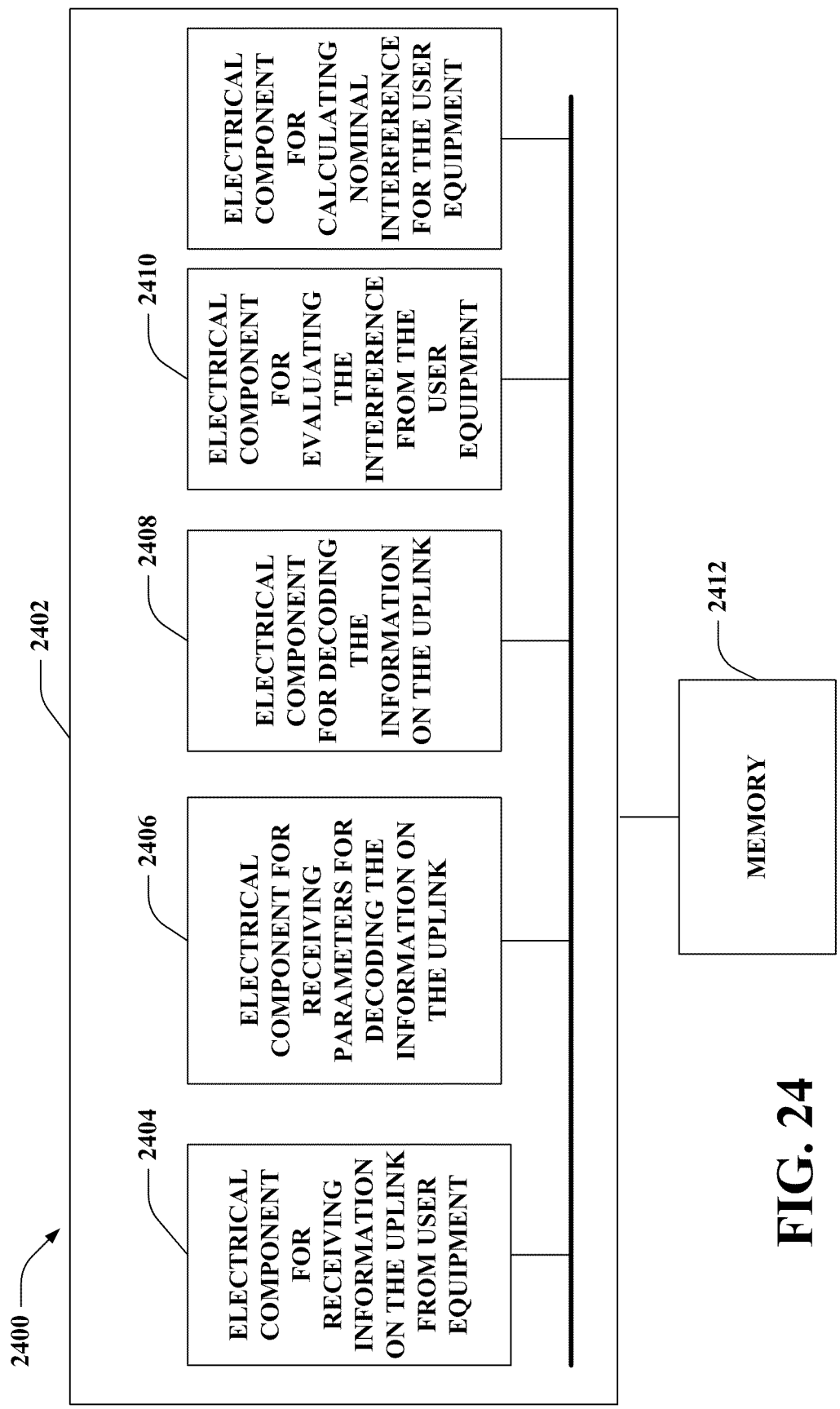

FIG. 24 is an illustration of a block diagram of another example system for facilitating interference management in accordance with various aspects set forth herein. It is to be appreciated that system 2400 is represented as including functional blocks, which can be functional blocks that represent functions implemented by a processor, hardware, software, firmware, or combination thereof. System 2400 can include a logical or physical grouping 2402 of electrical components for facilitating interference management.

The electrical components can act in conjunction. For instance, the logical or physical grouping 2402 can include an electrical component 2404 for receiving information on the uplink, wherein the information on the uplink is received from a UE. The logical or physical grouping 2402 can also include an electrical component 2406 for receiving one or more parameters for decoding the information on the uplink.

The logical or physical grouping 2402 can also include an electrical component 2408 for decoding the information on the uplink. The logical or physical grouping 2402 can also include an electrical component 2410 for evaluating interference from the UE. The logical or physical grouping 2402 can also include an electrical component 2412 for calculating a nominal interference for the UE.

The logical or physical grouping 2402 can also include an electrical component 2412 for storing. The electrical component 2412 for storing can be configured to store information on the uplink, parameters for decoding information on the uplink, nominal interference, interference information and/or channel gain information.

Evaluating the interference can include determining a signal strength of the information on the uplink. The information can be at least one of a sounding reference signal or an uplink resource utilization message. In some embodiments, the information can be the sounding reference signal, and the one or more parameters for decoding the information on the uplink can be received over a backhaul of the communication system.

Figure 25:
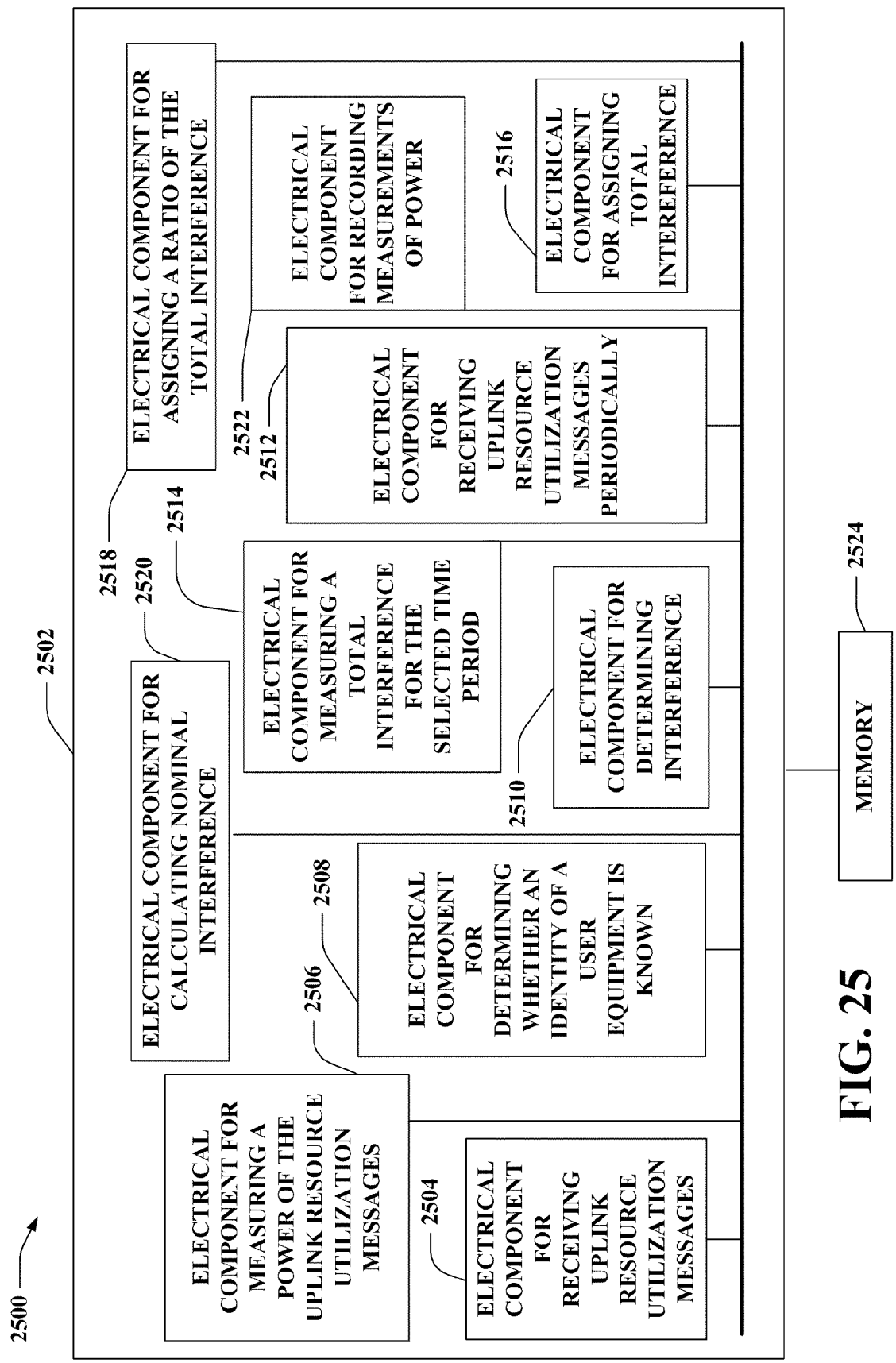

FIG. 25 is an illustration of a block diagram of another example system for facilitating interference management in accordance with various aspects set forth herein. It is to be appreciated that system 2500 is represented as including functional blocks, which can be functional blocks that represent functions implemented by a processor, hardware, software, firmware, or combination thereof. System 2500 can include a logical or physical grouping 2502 of electrical components for facilitating interference management.

The electrical components can act in conjunction. For instance, the logical or physical grouping 2502 can include an electrical component 2504 for receiving one or more uplink resource utilization messages, wherein the one or more uplink utilization messages are received by a BS in a first cell from one or more UEs in one or more cells other than the first cell. The logical or physical grouping 2502 can also include an electrical component 2506 measuring a power of the more uplink resource utilization messages. The logical or physical grouping 2502 can also include an electrical component 2508 for determining whether an identity of a UE is known.

The logical or physical grouping 2502 can also include an electrical component 2510 for determining interference from the UE of the one or more UEs in the one or more cells other than the first cell in response to determining that the identity of the UE of the one or more UEs in the one or more cells other than the first cell is known, wherein the interference corresponds to the power of an uplink resource utilization message from the UE of the one or more UEs in the one or more cells other than the first cell.

The logical or physical grouping 2502 can also include an electrical component 2512 for receiving the uplink resource utilization messages periodically. The logical or physical grouping 2502 can also include an electrical component 2522 for recording measurements of power of the uplink resource utilization messages. The logical or physical grouping 2502 can also include an electrical component 2514 for measuring a total interference for a selected time period. The logical or physical grouping 2502 can also include an electrical component 2516 for assigning the total interference to selected ones of the one or more UEs.

The logical or physical grouping 2502 can also include an electrical component 2518 for assigning a ratio of the total interference to the selected ones of the one or more UEs. The logical or physical grouping 2502 can also include an electrical component 2520 for calculating nominal interference for the selected ones of the one or more UEs.

The logical or physical grouping 2502 can also include an electrical component 2524 for storing. The electrical component 2524 for storing can be configured to store uplink resource utilization messages, total interference, ratio information, identities of UEs, and/or measurements of power.

Receiving the uplink resource utilization messages periodically, recording measurements of power of the uplink resource utilization messages, measuring a total interference for a selected time period, assigning the total interference to selected ones of the one or more UEs, and assigning a ratio of the total interference to the selected ones of the one or more UEs can be performed in response to determining that the identity of the UE of the one or more UEs in the one or more cells other than the first cell is not known.

Figure 26:
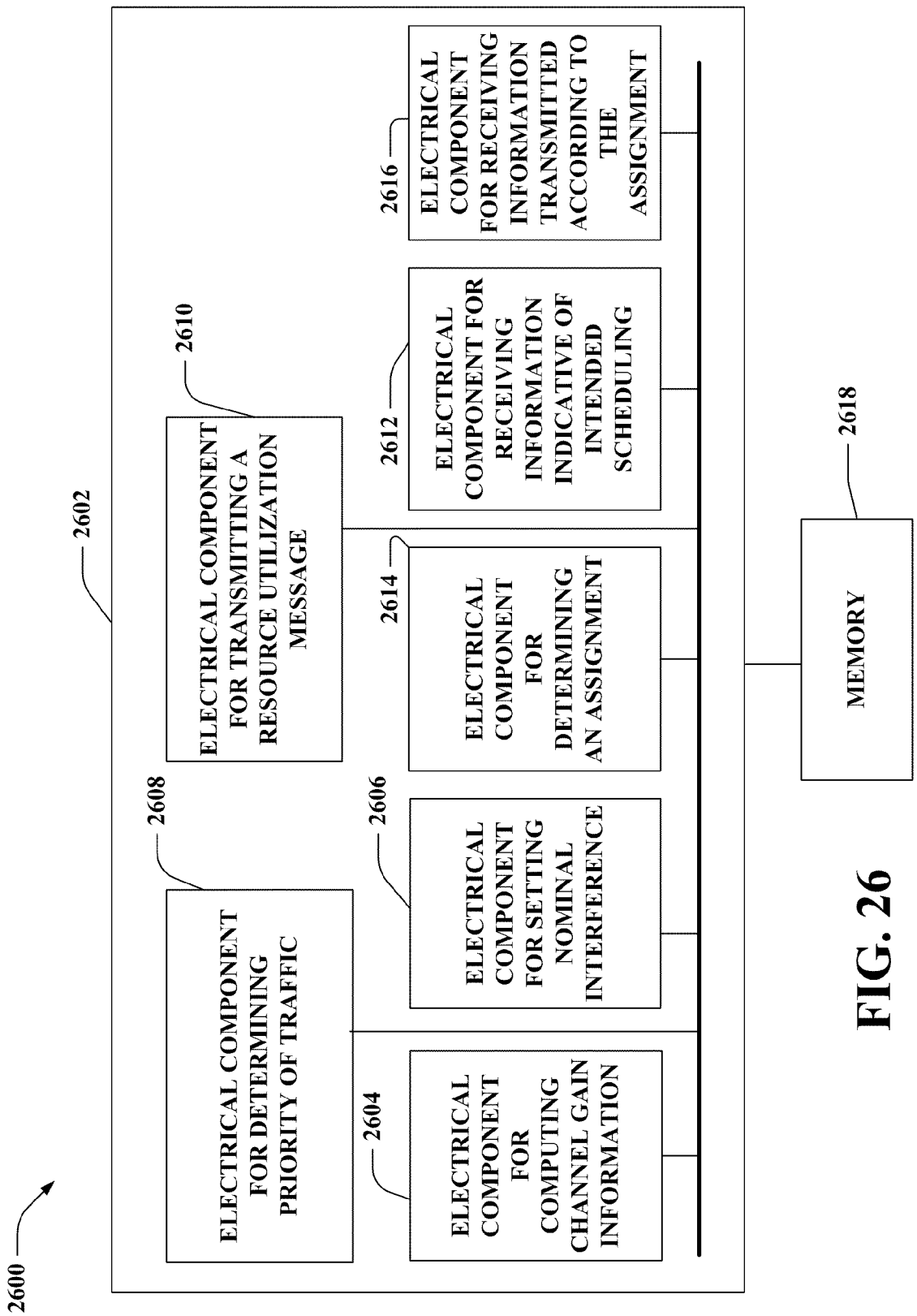

FIG. 26 is an illustration of a block diagram of another example system for facilitating interference management in accordance with various aspects set forth herein. It is to be appreciated that system 2600 is represented as including functional blocks, which can be functional blocks that represent functions implemented by a processor, hardware, software, firmware, or combination thereof. System 2600 can include a logical or physical grouping 2602 of electrical components for facilitating interference management.

The electrical components can act in conjunction. For instance, the logical or physical grouping 2602 can include an electrical component 2604 for computing channel gain information. The channel gain information can be computed by a BS and can be indicative of a channel between the BS and one or more interfering UEs.

In some embodiments, the electrical component 2604 for computing the channel gain information can include an electrical component (not shown) for computing the channel gain based on a measurement report and power information indicative of channel conditions on a downlink over a frequency band that corresponds to a frequency band of the uplink. In some embodiments, the electrical component 2604 for computing the channel gain information can include an electrical component (not shown) for measuring a power level of a sounding reference signal received at the BS from the one or more interfering UEs.

The logical or physical grouping 2602 can also include an electrical component 2606 for setting a nominal interference between the BS and at least one of the one or more interfering UEs. In some embodiments, the electrical component 2606 for setting the nominal interference can include an electrical component (not shown) for assigning a value to the nominal interference such that a selected number of most dominant ones of the one or more interfering UEs backoff.

The logical or physical grouping 2602 can also include an electrical component 2608 for determining a priority of traffic to be received by the BS from one or more user equipment served by the BS.

The logical or physical grouping 2602 can also include an electrical component 2610 for transmitting a RUM to the one or more interfering UEs. The RUM resource utilization message can include the priority of traffic to be received by the BS from one or more user equipment served by the BS, and the nominal interference between the BS and the one or more interfering UEs.

The logical or physical grouping 2602 can also include an electrical component 2612 for receiving information indicative of intended scheduling from the one or more interfering UEs. The information indicative of the intended scheduling can be based on the nominal interference and the priority of the traffic in the resource utilization message.

The logical or physical grouping 2602 can also include an electrical component 2614 for determining an assignment to the user equipment served by the BS. The assignment can be based on the information indicative of the intended scheduling from the one or more interfering UEs.

The logical or physical grouping 2602 can also include an electrical component 2616 for receiving information transmitted according to the assignment. The assignment can include at least one of a data rate or a bandwidth allocation at which the user equipment served by the BS will transmit data on the uplink to the BS.

The logical or physical grouping 2602 can also include an electrical component 2610 for storing. The electrical component 2610 for storing can be configured to store channel gain information, information for determining channel gain information, nominal interference, assignments, RUMs, priority of traffic information and/or information indicative of intended scheduling.

Figure 27:
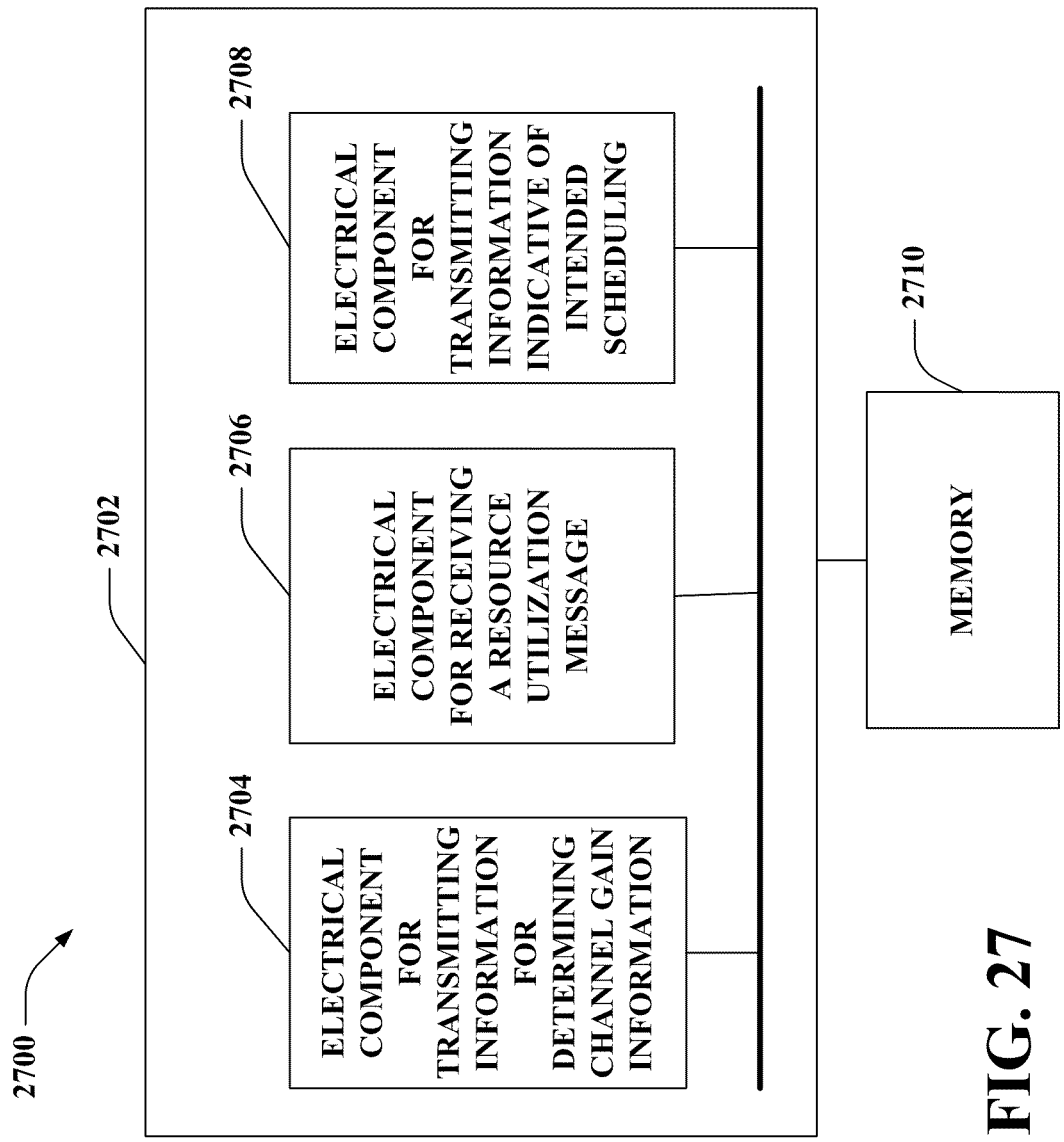

FIG. 27 is an illustration of a block diagram of another example system for facilitating interference management in accordance with various aspects set forth herein. It is to be appreciated that system 2700 is represented as including functional blocks, which can be functional blocks that represent functions implemented by a processor, hardware, software, firmware, or combination thereof. System 2700 can include a logical or physical grouping 2702 of electrical components for facilitating interference management.

The electrical components can act in conjunction. For instance, the logical or physical grouping 2702 can include an electrical component 2704 for transmitting information for determining channel gain information at a BS. A UE can transmit the information for determining channel gain information.

The logical or physical grouping 2702 can also include an electrical component 2706 for receiving a RUM. The RUM can include: a priority of traffic to be received by the BS from user equipment served by the BS; and a value of nominal interference between the BS and the UE. The value of the nominal interference can be based on the channel gain information.

The logical or physical grouping 2702 can also include an electrical component 2708 for transmitting information indicative of intended scheduling. The information indicative of intended scheduling can be based on the value of the nominal interference and the priority of the traffic to be received by the BS from user equipment served by the BS. The information indicative of intended scheduling can be employed to determine an assignment to the user equipment served by the BS.

The logical or physical grouping 2702 can also include an electrical component 2710 for storing. The electrical component 2710 for storing can be configured to store channel gain information, information for determining channel gain information, RUMs and/or information indicative of intended scheduling.

In some embodiments, the channel gain information can be based on at least one of: a measurement report and power information indicative of channel conditions on a downlink over a frequency band that corresponds to a frequency band of the uplink; or a power level of a sounding reference signal received at the BS from the UE.

In some embodiments, the assignment can include at least one of a data rate or a bandwidth allocation at which the UE served by the BS can transmit data on the uplink to the BS.

Figure 28:
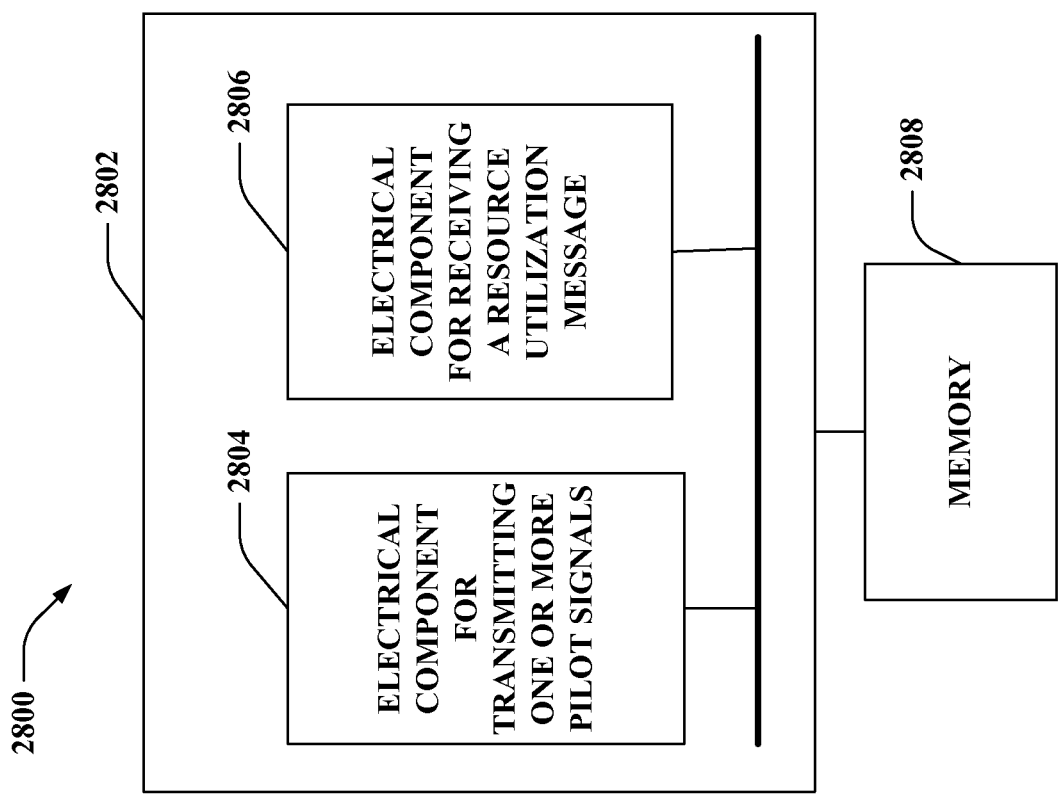

FIG. 28 is an illustration of a block diagram of another example system for facilitating interference management in accordance with various aspects set forth herein. It is to be appreciated that system 2800 is represented as including functional blocks, which can be functional blocks that represent functions implemented by a processor, hardware, software, firmware, or combination thereof. System 2800 can include a logical or physical grouping 2802 of electrical components for facilitating interference management.

The electrical components can act in conjunction. For instance, the logical or physical grouping 2802 can include an electrical component 2804 for transmitting one or more pilot signals. The one or more pilot signals can be transmitted from one or more interfering BSs and a UE can receive the one or more pilot signals. The one or more pilot signals can be measured to compute interference for the one or more interfering BSs.

The logical or physical grouping 2802 can include an electrical component 2806 for receiving a RUM. The electrical component 2804 for transmitting one or more pilot signals can transmits the one or more pilot signals in response to the electrical component 2806 for receiving a RUM receiving the RUM.

In some embodiments, computing the interference for the one or more interfering BSs can include determining a signal strength of the one or more pilot signals.

Further to the descriptions of the apparatus provided with reference to FIGS. 5A and 5B, embodiments of apparatus can be as described below.

A first apparatus according to the aspects described herein can include: means for computing a nominal interference. The apparatus can also include means for transmitting the nominal interference to one or more interfering BSs for at least one of the one or more interfering BSs to compute a loss in transmission rate to an out-of-cell UE if the at least one of the one or more interfering BSs transmits over a same set of resources on which the out-of-cell UE receives information.

In some embodiments, the nominal interference is computed using one or more of: channel gain information for the one or more interfering BSs, average traffic loading for the one or more interfering BSs, instantaneous traffic loading for the one or more interfering BSs, traffic loading or priority in one or more cells, buffer state information indicative of traffic loading or priority in one or more cells.

In some embodiments, computing a nominal interference includes: determining interference from the one or more interfering BSs; computing a transmission rate for the one or more interfering BSs; determining a number of the one or more interfering BSs that maximizes a transmission rate at the out-of-cell UE; and computing a nominal interference corresponding to the number of the one or more interfering BSs that maximizes the transmission rate at the out-of-cell UE.

In one embodiment, an apparatus can include an interference management component configured to: compute a nominal interference. The interference management component can also be configured to transmit the nominal interference to one or more interfering BSs for at least one of the one or more interfering BSs to compute a loss in transmission rate to an out-of-cell UE if the at least one of the one or more interfering BSs transmits over a same set of resources on which the out-of-cell UE receives information.

In some embodiments, the nominal interference is computed using one or more of: channel gain information for the one or more interfering BSs, average traffic loading for the one or more interfering BSs, instantaneous traffic loading for the one or more interfering BSs, traffic loading or priority in one or more cells, buffer state information indicative of traffic loading or priority in one or more cells.

In some embodiments, computing a nominal interference includes: determining interference from the one or more interfering BSs; computing a transmission rate for the one or more interfering BSs; determining a number of the one or more interfering BSs that maximizes a transmission rate at the out-of-cell UE; and computing a nominal interference corresponding to the number of the one or more interfering BSs that maximizes the transmission rate at the out-of-cell UE.

Another apparatus as described herein can include: means for receiving one or more pilot signals, wherein the one or more pilot signals are received from the one or more interfering BSs and a UE receives the one or more pilot signals; means for computing interference for the one or more interfering BSs; and means for transmitting a measurement report, and wherein the measurement report includes the interference, wherein the measurement report is transmitted to a serving BS. The apparatus can also include: means for transmitting a scheduling request to the serving BS to receive an uplink grant; and means for receiving the uplink grant from the serving BS, wherein the transmitting the scheduling request and the receiving the uplink grant is performed prior to the transmitting the measurement report. The apparatus can also include: means for transmitting a resource utilization message to the one or more interfering BSs, wherein the means for receiving the one or more pilot signals receives the one or more pilot signals is in response to the means for transmitting the resource utilization message transmitting the resource utilization message.

The means for computing the interference for the one or more interfering BSs can include means for determining a signal strength of the one or more pilot signals.

In one embodiment, the apparatus includes: a transceiver configured to receive one or more pilot signals, wherein the one or more pilot signals are received from the one or more interfering BSs and a UE receives the one or more pilot signals; and an interference management module configured to compute interference for the one or more interfering BSs, wherein the transceiver is further configured to transmit a measurement report to a serving BS, and wherein the measurement report includes the interference.

The transceiver is further configured to: transmit a scheduling request to the serving BS to receive an uplink grant; and receive the uplink grant from the serving BS, wherein transmitting the scheduling request and receiving the uplink grant is performed prior to transmitting the measurement report. The transceiver is further configured to transmit a resource utilization message to the one or more interfering BSs, wherein receiving the one or more pilot signals is in response to transmitting the resource utilization message.

Computing the interference for the one or more interfering BSs includes determining a signal strength of the one or more pilot signals.

Another apparatus as described herein can include: means for receiving information indicative of buffer state associated with a UE, wherein the information is received at a UE; means for receiving interference information from one or more interfering BSs; means for setting a nominal interference, wherein the nominal interference is based on the interference information; means for transmitting the nominal interference and priority information for traffic associated with the UE, wherein the nominal interference and the priority information is transmitted to the one or more interfering BSs; means for receiving scheduling information from the one or more interfering BSs, wherein the scheduling information is received in response to the transmitting the nominal interference and priority information for traffic associated with the UE; and means for receiving scheduling information from a serving BS, wherein the scheduling information is based on the scheduling information from the one or more interfering BSs.

The apparatus can also include: means for computing a channel quality indicator or a signal-to-interference and noise ratio based on the scheduling information from the one or more interfering BSs; and means for transmitting the channel quality indicator or the signal-to-interference and noise ratio to the serving BS, wherein receiving scheduling information from the serving BS is performed in response to computing the channel quality indicator or the signal-to-interference and noise ratio and the transmitting the channel quality indicator or the signal-to-interference and noise ratio.

The information indicative of the buffer state can include a priority of traffic that the UE will be served by the serving BS. The scheduling information from the one or more interfering BSs can be indicative of at least one of the one or more interfering BSs scheduling a backoff.

In one embodiment, the apparatus includes: a transceiver configured to: receive information indicative of buffer state associated with a UE, wherein the information is received at a UE; and receive interference information from one or more interfering BSs. The apparatus also includes an interference management module configured to set a nominal interference, wherein the nominal interference is based on the interference information. And wherein the transceiver is further configured to: transmit the nominal interference and priority information for traffic associated with the UE, wherein the nominal interference and the priority information is transmitted to the one or more interfering BSs; receive scheduling information from the one or more interfering BSs, wherein the scheduling information is received in response to the transmitting the nominal interference and priority information for traffic associated with the UE; and receive scheduling information from a serving BS, wherein the scheduling information is based on the scheduling information from the one or more interfering BSs.

In some embodiments, the interference management module is further configured to compute a channel quality indicator or a signal-to-interference and noise ratio based on the scheduling information from the one or more interfering BSs, and wherein the transceiver is further configured to transmit the channel quality indicator or the signal-to-interference and noise ratio to the serving BS, wherein receiving scheduling information from the serving BS is performed in response to computing the channel quality indicator or the signal-to-interference and noise ratio and the transmitting the channel quality indicator or the signal-to-interference and noise ratio.

In some embodiments, the information indicative of the buffer state includes a priority of traffic that the UE will be served by the serving BS. In some embodiments, the scheduling information from the one or more interfering BSs is indicative of at least one of the one or more interfering BSs scheduling a backoff.

Another apparatus as described herein can include: means for transmitting one or more pilot signals, wherein the one or more pilot signals are transmitted from one or more interfering BSs and a UE receives the one or more pilot signals, and wherein the one or more pilot signals are measured to compute interference for the one or more interfering BSs.

In some embodiments, the apparatus can also include means for receiving a resource utilization message, and wherein the means for transmitting the one or more pilot signals transmits the one or more pilot signals in response to the means for receiving the RUM receiving the RUM.

Computing the interference for the one or more interfering BSs can include determining a signal strength of the one or more pilot signals.

In one embodiment, the apparatus includes a transceiver configured to: transmit one or more pilot signals, wherein the one or more pilot signals are transmitted from one or more interfering BSs and a UE receives the one or more pilot signals, and wherein the one or more pilot signals are measured to compute interference for the one or more interfering BSs. The transceiver is further configured to receive a resource utilization message, and wherein transmitting the one or more pilot signals is performed in response to receiving the resource utilization message.

Computing the interference for the one or more interfering BSs includes determining a signal strength of the one or more pilot signals.

Another apparatus as described herein can include: means for receiving interference information for one or more interfering BSs, wherein the interference information for the one or more interfering BSs is received from a UE; means for receiving a nominal interference and priority information for traffic associated with the UE, the priority information for traffic associated with the UE corresponding to information indicative of buffer state associated with the UE; and means for transmitting scheduling information to the UE, wherein the scheduling information is transmitted in response to the receiving the nominal interference and the priority information for traffic associated with the UE, and wherein the scheduling information to the UE is employed to generate scheduling information for the UE from a serving BS.

The scheduling information to the UE can include a channel quality indicator or a signal-to-interference and noise ratio computed based on the scheduling information transmitted from the one or more interfering BSs. The scheduling information from the one or more interfering BSs can be indicative of at least one of the one or more interfering BSs scheduling a backoff. The information indicative of the buffer state can include a priority of traffic that the UE will be served by the serving BS.

In one embodiment, the apparatus includes: a transceiver configured to: receive interference information for one or more interfering BSs, wherein the interference information for the one or more interfering BSs is received from a UE; receive a nominal interference and priority information for traffic associated with the UE, the priority information for traffic associated with the UE corresponding to information indicative of buffer state associated with the UE; and transmit scheduling information to the UE, wherein the scheduling information is transmitted in response to the receiving the nominal interference and priority information for traffic associated with the UE, and wherein the scheduling information to the UE is employed to generate scheduling information for the UE from a serving BS.

The scheduling information to the UE includes a channel quality indicator or a signal-to-interference and noise ratio computed based on the scheduling information transmitted from the one or more interfering BSs. The scheduling information from the one or more interfering BSs is indicative of at least one of the one or more interfering BSs scheduling a backoff. The information indicative of the buffer state includes a priority of traffic that the UE will be served by the serving BS.

Another apparatus as described herein can include: means for determining channel gain information measured on a downlink; means for determining interference from one or more interfering UEs based on the channel gain information for the uplink; and means for calculating a nominal interference based on the interference from the one or more interfering UEs. In some embodiments, the apparatus can also include means for assigning the channel gain information measured on the downlink to channel gain information for the uplink.

The downlink and the uplink channels can be in a wireless communication system, wherein the wireless communication system is a time division duplex system. The apparatus can be a BS. The BS can be a BS in a first cell, and the one or more interfering UEs can be UE in a second cell. The first cell can be different from the second cell. The interference can be indicative of a transmit power level at which the one or more interfering UEs transmit.

In one embodiment, the apparatus includes: an interference management module configured to: determine channel gain information measured on a downlink; determine interference from one or more interfering UEs based on the channel gain information for the uplink; and calculate a nominal interference based on the interference from the one or more interfering UEs. In some embodiments, the interference management module is also configured to assign the channel gain information measured on the downlink to channel gain information for the uplink.

The downlink and the uplink channels are in a wireless communication system, wherein the wireless communication system is a time division duplex system. The apparatus is a BS, the BS being a BS in a first cell, and the one or more interfering UEs are UE in a second cell. The first cell is different from the second cell. The interference is indicative of a transmit power level at which the one or more interfering UEs transmit.

Another apparatus as described herein can include: means for receiving information on the uplink, wherein the information on the uplink is received from a UE; means for receiving one or more parameters for decoding the information on the uplink; means for decoding the information on the uplink; means for evaluating interference from the UE; and means for calculating a nominal interference for the UE.

The information can be at least one of a sounding reference signal or an uplink resource utilization message. Evaluating the interference can include determining a signal strength of the information on the uplink. The information can be the sounding reference signal, and the one or more parameters for decoding the information on the uplink can be received over a backhaul of the communication system.

In one embodiment, the apparatus includes: a transceiver configured to: receive information on the uplink, wherein the information on the uplink is received from a UE; receive one or more parameters for decoding the information on the uplink; a decoder configured to decode the information on the uplink. The apparatus also includes: an interference management module configured to: evaluate interference from the UE; and calculate a nominal interference for the UE.

The information is at least one of a sounding reference signal or an uplink resource utilization message. Evaluating the interference includes determining a signal strength of the information on the uplink. The information is the sounding reference signal, and the one or more parameters for decoding the information on the uplink is received over a backhaul of the communication system.

Another apparatus as described herein can include: means for receiving one or more uplink resource utilization messages, wherein the one or more uplink utilization messages are received by a BS in a first cell from one or more UEs in one or more cells other than the first cell; means for measuring a power of the uplink resource utilization messages; means for determining whether an identity of a UE of the one or more UEs in the one or more cells other than the first cell is known; and means for determining interference from the UE of the one or more UEs in the one or more cells other than the first cell in response to determining that the identity of the UE of the one or more UEs in the one or more cells other than the first cell is known, wherein the interference corresponds to the power of an uplink resource utilization message from the UE of the one or more UEs in the one or more cells other than the first cell.

The apparatus can also include: means for receiving the uplink resource utilization messages periodically; means for recording measurements of power of the uplink resource utilization messages; means for measuring a total interference for a selected time period; means for assigning the total interference to selected ones of the one or more UEs; means for assigning a ratio of the total interference to the selected ones of the one or more UEs; and means for calculating nominal interference for the selected ones of the one or more UEs.

Receiving the uplink resource utilization messages periodically, recording measurements of power of the uplink resource utilization messages, measuring a total interference for a selected time period, assigning the total interference to selected ones of the one or more UEs, and assigning a ratio of the total interference to the selected ones of the one or more UEs can be performed in response to determining that the identity of the UE of the one or more UEs in the one or more cells other than the first cell is not known.

In one embodiment, the apparatus includes: a transceiver configured to: receive one or more uplink resource utilization messages, wherein the one or more uplink utilization messages are received by a BS in a first cell from one or more UEs in one or more cells other than the first cell. The apparatus also includes: an interference management module configured to: measure a power of the uplink resource utilization messages; determine whether an identity of a UE of the one or more UEs in the one or more cells other than the first cell is known; and determine interference from the UE of the one or more UEs in the one or more cells other than the first cell in response to determining that the identity of the UE of the one or more UEs in the one or more cells other than the first cell is known, wherein the interference corresponds to the power of an uplink resource utilization message from the UE of the one or more UEs in the one or more cells other than the first cell.

The transceiver is further configured to receive the uplink resource utilization messages periodically; and the interference management module is further configured to: record measurements of power of the uplink resource utilization messages; measure a total interference for a selected time period; assign the total interference to selected ones of the one or more UEs; assign a ratio of the total interference to the selected ones of the one or more UEs; and calculate nominal interference for the selected ones of the one or more UEs.

Receiving the uplink resource utilization messages periodically, recording measurements of power of the uplink resource utilization messages, measuring a total interference for a selected time period, assigning the total interference to selected ones of the one or more UEs, and assigning a ratio of the total interference to the selected ones of the one or more UEs is performed by the interference management module in response to determining that the identity of the UE of the one or more UEs in the one or more cells other than the first cell is not known.

Another apparatus as described herein can include: means for computing channel gain information, wherein the channel gain information is computed by a BS and is indicative of a channel between the BS and one or more interfering UEs; means for setting a nominal interference between the BS and at least one of the one or more interfering UEs; means for determining a priority of traffic to be received by the BS from one or more UE served by the BS; and means for transmitting a resource utilization message to the one or more interfering UEs, wherein the resource utilization message comprises the priority of traffic to be received by the BS from one or more UE served by the BS, and the nominal interference between the BS and the one or more interfering UEs.

The means for setting the nominal interference can include means for assigning a value to the nominal interference such that a selected number of most dominant ones of the one or more interfering UEs backoff.

The apparatus can also include: means for receiving information indicative of intended scheduling from the one or more interfering UEs, wherein the information indicative of the intended scheduling is based on the nominal interference and the priority of the traffic in the resource utilization message; means for determining an assignment to the UE served by the BS, the assignment being based on the information indicative of the intended scheduling from the one or more interfering UEs; and means for receiving information transmitted according to the assignment.

The apparatus can also include: means for computing the channel gain information includes at least one of: means for computing the channel gain information based on a measurement report and power information indicative of channel conditions on a downlink over a frequency band that corresponds to a frequency band of the uplink; or means for measuring a power level of a sounding reference signal received at the BS from the one or more interfering UEs.

The assignment can include at least one of a data rate or a bandwidth allocation at which the UE served by the BS will transmit data on the uplink to the BS.

In one embodiment, the apparatus can include: an interference management module configured to: compute channel gain information, wherein the channel gain information is computed by a BS and is indicative of a channel between the BS and one or more interfering UEs; set a nominal interference between the BS and at least one of the one or more interfering UEs; determine a priority of traffic to be received by the BS from one or more UE served by the BS; and transmit a resource utilization message to the one or more interfering UEs, wherein the resource utilization message comprises the priority of traffic to be received by the BS from one or more UE served by the BS, and the nominal interference between the BS and the one or more interfering UEs.

The apparatus can include a transceiver configured to receive information indicative of intended scheduling from the one or more interfering UEs, wherein the information indicative of the intended scheduling is based on the nominal interference and the priority of the traffic in the resource utilization message. The interference management module is further configured to determine an assignment to the UE served by the BS, the assignment being based on the information indicative of the intended scheduling from the one or more interfering UEs, and wherein transceiver is further configured to receive information transmitted according to the assignment.

Computing channel gain information includes at least one of: computing the channel gain information based on a measurement report and power information indicative of channel conditions on a downlink over a frequency band that corresponds to a frequency band of the uplink; or measuring a power level of a sounding reference signal received at the BS from the one or more interfering UEs.

The assignment includes at least one of a data rate or a bandwidth allocation at which the UE served by the BS will transmit data on the uplink to the BS. Setting the nominal interference includes assigning a value to the nominal interference such that a selected number of most dominant ones of the one or more interfering UEs backoff.

Another apparatus as described herein can include: means for transmitting information for determining channel gain information at a BS, wherein the transmitting information for determining channel gain information at a BS is performed by a UE; means for receiving a RUM. The RUM can include: a priority of traffic to be received by the BS from UE served by the BS; and a value of nominal interference between the BS and the UE, wherein the value of the nominal interference is based on the channel gain information.

The apparatus can also include: means for transmitting information indicative of intended scheduling, wherein the information indicative of intended scheduling is based on the value of the nominal interference and the priority of the traffic to be received by the BS from UE served by the BS, and wherein the information indicative of intended scheduling is employed to determine an assignment to the UE served by the BS.

The channel gain information can be based on at least one of: a measurement report and power information indicative of channel conditions on a downlink over a frequency band that corresponds to a frequency band of the uplink; or a power level of a sounding reference signal received at the BS from the UE. The assignment can include at least one of a data rate or a bandwidth allocation at which the UE served by the BS can transmit data on the uplink to the BS.

In one embodiment, the apparatus includes: a transceiver configured to: transmit information for determining channel gain information at a BS, wherein the transmitting information for determining channel gain information at a BS is performed by a UE; receive a RUM. The RUM includes: a priority of traffic to be received by the BS from UE served by the BS; and a value of nominal interference between the BS and the UE, wherein the value of the nominal interference is based on the channel gain information.

The transceiver is also configured to transmit information indicative of intended scheduling, wherein the information indicative of intended scheduling is based on the value of the nominal interference and the priority of the traffic to be received by the BS from UE served by the BS, and wherein the information indicative of intended scheduling is employed to determine an assignment to the UE served by the BS.

The channel gain information is based on at least one of: a measurement report and power information indicative of channel conditions on a downlink over a frequency band that corresponds to a frequency band of the uplink; or a power level of a sounding reference signal received at the BS from the UE. The assignment includes at least one of a data rate or a bandwidth allocation at which the UE served by the BS can transmit data on the uplink to the BS.

Another apparatus as described herein can include: means for receiving interference information for one or more interfering BSs, wherein the interference information for one or more interfering BSs is received from a UE; means for receiving a nominal interference and priority information for traffic associated with the UE, the priority information for traffic associated with the UE corresponding to information indicative of buffer state associated with the UE; and means for transmitting scheduling information to the UE, wherein the scheduling information to the UE is transmitted in response to the receiving the nominal interference and the priority information for traffic associated with the UE, and wherein the scheduling information to the UE is employed to generate scheduling information for the UE from a serving BS.

Scheduling information to the UE can include a channel quality indicator or a signal-to-interference and noise ratio computed based on the scheduling information transmitted from the one or more interfering BSs.

The information indicative of the buffer state can include a priority of traffic that the UE will be served by the serving BS.

The scheduling information from the one or more interfering BSs can be indicative of at least one of the one or more interfering BSs scheduling a backoff.

In one embodiment, the apparatus can include: a transceiver configured to: receive interference information for one or more interfering BSs, wherein the interference information for one or more interfering BSs is received from a UE; receive a nominal interference and priority information for traffic associated with the UE, the priority information for traffic associated with the UE corresponding to information indicative of buffer state associated with the UE; and transmit scheduling information to the UE, wherein the scheduling information is transmitted in response to the receiving the nominal interference and the priority information for traffic associated with the UE, and wherein the scheduling information to the UE is employed to generate scheduling information for the UE from a serving BS.

The scheduling information to the UE can include a channel quality indicator or a signal-to-interference and noise ratio computed based on the scheduling information transmitted from the one or more interfering BSs.

The information indicative of the buffer state can include a priority of traffic that the UE will be served by the serving BS.

The scheduling information from the one or more interfering BSs can be indicative of at least one of the one or more interfering BSs scheduling a backoff.

Another apparatus as described herein can include: an apparatus including: means for transmitting information for determining channel gain information at a BS, wherein the transmitting information for determining channel gain information at a BS is performed by a UE; means for receiving a resource utilization message, wherein the resource utilization message comprises: a priority of traffic to be received by the BS from UE served by the BS; and a value of nominal interference between the BS and the UE, wherein the value of the nominal interference is based on the channel gain information; and means for transmitting information indicative of intended scheduling, wherein the information indicative of intended scheduling is based on the value of the nominal interference for UE served by the BS, the priority of the traffic to be received on serving links, the channel gain information on the serving links, the nominal interference for UE not served by the BS, the priority of the traffic to be received on interfering links and the channel gain information on the interfering links, and wherein the information indicative of intended scheduling is employed to determine an assignment to the UE served by the BS.

In some embodiments, the channel gain information is based on at least one of: a measurement report and power information indicative of channel conditions on a downlink over a frequency band that corresponds to a frequency band of an uplink; or a power level of a sounding reference signal received at the BS from the UE.

In some embodiments, the assignment includes at least one of a data rate or a bandwidth allocation at which the user equipment served by the BS can transmit data on an uplink to the BS.

In one embodiment, the apparatus can include: a transceiver configured to: transmit information for determining channel gain information at a BS, wherein the transmitting information for determining channel gain information at a BS is performed by a UE; receive a resource utilization message, wherein the resource utilization message comprises: a priority of traffic to be received by the BS from UE served by the BS; and a value of nominal interference between the BS and the UE, wherein the value of the nominal interference is based on the channel gain information; and transmit information indicative of intended scheduling, wherein the information indicative of intended scheduling is based on the value of the nominal interference for UE served by the BS, the priority of the traffic to be received on serving links, the channel gain information on the serving links, the nominal interference for UE not served by the BS, the priority of the traffic to be received on interfering links or the channel gain information on the interfering links, and wherein the information indicative of intended scheduling is employed to determine an assignment to the UE served by the BS.

In some embodiments, the channel gain information is based on at least one of: a measurement report and power information indicative of channel conditions on a downlink over a frequency band that corresponds to a frequency band of an uplink; or a power level of a sounding reference signal received at the BS from the UE.

In some embodiments, the assignment includes at least one of a data rate or a bandwidth allocation at which the UE served by the BS can transmit data on an uplink to the BS.

Another apparatus as described herein can include: means for transmitting one or more pilot signals, wherein the one or more pilot signals are transmitted from one or more interfering BSs and a UE receives the one or more pilot signals, and wherein the one or more pilot signals are measured to compute interference for the one or more interfering BSs. In some embodiments, the apparatus can also include means for receiving a resource utilization message, and wherein the means for transmitting one or more pilot signals transmits the one or more pilot signals in response to the means for receiving the resource utilization message receiving the resource utilization message.

In some embodiments, computing the interference for the one or more interfering BSs can include determining a signal strength of the one or more pilot signals. In some embodiments, In one embodiment, the apparatus can include a transceiver configured to: transmit one or more pilot signals, wherein the one or more pilot signals are transmitted from one or more interfering BSs and a UE receives the one or more pilot signals, and wherein the one or more pilot signals are measured to compute interference for the one or more interfering BSs. In some embodiments, the transceiver can be further configured to receive a resource utilization message, and wherein transmitting the one or more pilot signals is performed in response to receiving the resource utilization message.

In some embodiments, computing the interference for the one or more interfering BSs can include determining a signal strength of the one or more pilot signals.

One computer program product can include a computer-readable medium. The computer program product can include a first set of codes for causing a computer to compute a nominal interference; and a second set of codes for causing the computer to transmit the nominal interference to one or more interfering BSs for at least one of the one or more interfering BSs to compute a loss in transmission rate to an out-of-cell UE if the at least one of the one or more interfering BSs transmits over a same set of resources on which the out-of-cell UE receives information.

In some embodiments, the nominal interference is computed using one or more of: channel gain information for the one or more interfering BSs, average traffic loading for the one or more interfering BSs, instantaneous traffic loading for the one or more interfering BSs, traffic loading or priority in one or more cells, buffer state information indicative of traffic loading or priority in one or more cells.

In some embodiments, computing a nominal interference includes: determining interference from the one or more interfering BSs; computing a transmission rate for the one or more interfering BSs; determining a number of the one or more interfering BSs that maximizes a transmission rate at the out-of-cell UE; and computing a nominal interference corresponding to the number of the one or more interfering BSs that maximizes the transmission rate at the out-of-cell UE.

Other aspects described herein can be performed via a computer program product. The computer program product can include a computer-readable medium. The computer-readable medium can include: a first set of codes for causing a computer to receive one or more pilot signals, wherein the one or more pilot signals are received from the one or more interfering BSs and a UE receives the one or more pilot signals; a second set of codes for causing the computer to compute interference for the one or more interfering BSs; and a third set of codes for causing the computer to transmit a measurement report, wherein the measurement report includes the interference, and wherein the measurement report is transmitted to a serving BS.

In some embodiments, the computer-readable medium also includes: a fifth set of codes for causing the computer to transmit a scheduling request to the serving BS to receive an uplink grant; and a sixth set of codes for causing the computer to receive the uplink grant from the serving BS. Transmitting the scheduling request and the receiving the uplink grant can be performed prior to the transmitting the measurement report. In some embodiments, computing the interference for the one or more interfering BSs can include determining a signal strength of the one or more pilot signals.

In some embodiments, the computer-readable medium also includes: a seventh set of codes for causing the computer to transmit a RUM to the one or more interfering BSs. Receiving the one or more pilot signals can be in response to transmitting the RUM.

Other aspects described herein can be performed via a computer program product. The computer program product can include a computer-readable medium. The computer-readable medium can include: a first set of codes for causing a computer to receive information indicative of buffer state associated with a UE, wherein the information is received at a UE; a second set of codes for causing the computer to receive interference information from one or more interfering BSs; a third set of codes for causing the computer to set a nominal interference, wherein the nominal interference is based on the interference information; a fourth set of codes for causing the computer to transmit the nominal interference and priority information for traffic associated with the UE, wherein the nominal interference and the priority information is transmitted to the one or more interfering BSs; a fifth set of codes for causing the computer to receive scheduling information from the one or more interfering BSs, wherein the scheduling information is received in response to the transmitting the nominal interference and priority information for traffic associated with the UE; and a sixth set of codes for causing the computer to receive scheduling information from a serving BS, wherein the scheduling information is based on the scheduling information from the one or more interfering BSs.

In some embodiments, the computer-readable medium can also include: a seventh set of codes for causing the computer to compute a channel quality indicator or a signal-to-interference and noise ratio based on the scheduling information from the one or more interfering BSs; and an eight set of codes for causing the computer to transmit the channel quality indicator or the signal-to-interference and noise ratio to the serving BS. Receiving scheduling information from the serving BS can be performed in response to computing the channel quality indicator or the signal-to-interference and noise ratio and transmitting the channel quality indicator or the signal-to-interference and noise ratio.

In some embodiments, the information indicative of the buffer state can include a priority of traffic that the UE will be served by the serving BS. The scheduling information from the one or more interfering BSs can be indicative of at least one of the one or more interfering BSs scheduling a backoff.

Other aspects described herein can be performed via a computer program product. The computer program product can include a computer-readable medium. The computer-readable medium can include: a first set of codes for causing a computer to transmit one or more pilot signals, wherein one or more pilot signals are transmitted from one or more interfering BSs and a UE receives the one or more pilot signals, and wherein the one or more pilot signals are measured to compute interference for the one or more interfering BSs.

Computing the interference for the one or more interfering BSs can include determining a signal strength of the one or more pilot signals.

The computer-readable medium can include a second set of codes for causing the computer to receive a resource utilization message, and wherein transmitting the one or more pilot signals is in response to receiving the resource utilization message.

Other aspects described herein can be performed via a computer program product. The computer program product can include a computer-readable medium. The computer-readable medium can include: a first set of codes for causing a computer to receive interference information for one or more interfering BSs, wherein the interference information is received from a UE; a second set of codes for causing the computer to receive a nominal interference and priority information for traffic associated with the UE, the priority information for traffic associated with the UE corresponding to information indicative of buffer state associated with the UE; and a third set of codes for causing a computer to transmit scheduling information to the UE, wherein the scheduling information is transmitted in response to receiving the nominal interference and the priority information for traffic associated with the UE, and wherein the scheduling information to the UE is employed to generate scheduling information for the UE from a serving BS.

The scheduling information to the UE can include a channel quality indicator or a signal-to-interference and noise ratio computed based on the scheduling information transmitted from the one or more interfering BSs. The information indicative of the buffer state can include a priority of traffic that the UE will be served by the serving BS. The scheduling information from the one or more interfering BSs can be indicative of at least one of the one or more interfering BSs scheduling a backoff.

Other aspects described herein can be performed via a computer program product. The computer program product can include a computer-readable medium. The computer-readable medium can include: a first set of codes for causing a computer to determine channel gain information measured on a downlink, wherein the determining is performed by a BS; a second set of codes for causing the computer to assign the channel gain information measured on the downlink to channel gain information for the uplink; a third set of codes for causing the computer to determine interference from one or more interfering UEs based on the channel gain information for the uplink; and a fourth set of codes for causing the computer to calculate a nominal interference based on the interference from the one or more interfering UEs.

The downlink and the uplink channels in a wireless communication system, wherein the wireless communication system can be a time division duplex system. The BS can be a BS in a first cell, and the one or more interfering UEs can be UE in a second cell. The first cell can be different from the second cell. The interference can be indicative of a transmit power level at which the one or more interfering UEs transmit.

Other aspects described herein can be performed via a computer program product. The computer program product can include a computer-readable medium. The computer-readable medium can include: a first set of codes for causing a computer to receive information on the uplink, wherein the information on the uplink is received from a UE; a second set of codes for causing the computer to receive one or more parameters for decoding the information on the uplink; a third set of codes for causing the computer to decode the information on the uplink; a fourth set of codes for causing the computer to evaluate interference from the UE; and a fifth set of codes for causing the computer to calculate a nominal interference for the UE. Evaluating the interference can include determining a signal strength of the information on the uplink.

In some embodiments, the information can be at least one of a sounding reference signal or an uplink resource utilization message. In some embodiments, the information is the sounding reference signal, and the one or more parameters for decoding the information on the uplink is received over a backhaul of the communication system.

Other aspects described herein can be performed via a computer program product. The computer program product can include a computer-readable medium. The computer-readable medium can include: a first set of codes for causing a computer to receive one or more uplink resource utilization messages, wherein the one or more uplink utilization messages are received by a BS in a first cell from one or more UEs in one or more cells other than the first cell; a second set of codes for causing the computer to measure a power of the uplink resource utilization messages; a third set of codes for causing the computer to determine whether an identity of a UE of the one or more UEs in the one or more cells other than the first cell is known; and a fourth set of codes for causing the computer to determine interference from the UE of the one or more UEs in the one or more cells other than the first cell in response to determining that the identity of the UE of the one or more UEs in the one or more cells other than the first cell is known, wherein the interference corresponds to the power of an uplink resource utilization message from the UE of the one or more UEs in the one or more cells other than the first cell.

In some embodiments, the computer-readable medium can also include: a fifth set of codes for causing the computer to receive the uplink resource utilization messages periodically; a sixth set of codes for causing the computer to record measurements of power of the uplink resource utilization messages; a seventh set of codes for causing the computer to measuring a total interference for a selected time period; an eighth set of codes for causing the computer to assign the total interference to selected ones of the one or more UEs; a ninth set of codes for causing the computer to assign a ratio of the total interference to the selected ones of the one or more UEs; and a tenth set of codes for causing the computer to calculate nominal interference for the selected ones of the one or more UEs. Receiving the uplink resource utilization messages periodically, recording measurements of power of the uplink resource utilization messages, measuring a total interference for a selected time period, assigning the total interference to selected ones of the one or more UEs, and/or assigning a ratio of the total interference to the selected ones of the one or more UEs is in response to determining that the identity of the UE of the one or more UEs in the one or more cells other than the first cell is not known.

Other aspects described herein can be performed via a computer program product. The computer program product can include a computer-readable medium. The computer-readable medium can include: a first set of codes for causing a computer to compute channel gain information, wherein the channel gain information is computed by a BS and is indicative of a channel between the BS and one or more interfering UEs; a second set of codes for causing the computer to set a nominal interference between the BS and at least one of the one or more interfering UEs; a third set of codes for causing the computer to determine a priority of traffic to be received by the BS from one or more UE served by the BS; and a fourth set of codes for causing the computer to transmit a resource utilization message to the one or more interfering UEs, wherein the resource utilization message comprises the priority of traffic to be received by the BS from one or more UE served by the BS, and the nominal interference between the BS and the one or more interfering UEs.

In some embodiments, the computer-readable medium can also include: a fifth set of codes for causing the computer to receive information indicative of intended scheduling from the one or more interfering UEs, wherein the information indicative of the intended scheduling is based on the nominal interference and the priority of the traffic in the resource utilization message; a sixth set of codes for causing the computer to determine an assignment to the UE served by the BS, the assignment being based on the information indicative of the intended scheduling from the one or more interfering UEs; and a seventh set of codes for causing the computer to receive information transmitted according to the assignment.

Computing the channel gain information can include at least one of: computing the channel gain information based on a measurement report and power information indicative of channel conditions on a downlink over a frequency band that corresponds to a frequency band of the uplink; or measuring a power level of a sounding reference signal received at the BS from the one or more interfering UEs.

The assignment can include at least one of a data rate or a bandwidth allocation at which the UE served by the BS will transmit data on the uplink to the BS.

Setting the nominal interference can include assigning a value to the nominal interference such that a selected number of most dominant ones of the one or more interfering UEs backoff.

Other aspects described herein can be performed via a computer program product. The computer program product can include a computer-readable medium. The computer-readable medium can include: a first set of codes for causing a computer to transmit information for determining channel gain information at a BS, wherein the transmitting information for determining channel gain information at a BS is performed by a UE; a second set of codes for causing the computer to receive a resource utilization message, wherein the resource utilization message comprises: a priority of traffic to be received by the BS from UE served by the BS; and a value of nominal interference between the BS and the UE, wherein the value of the nominal interference is based on the channel gain information; and a third set of codes for causing the computer to transmit information indicative of intended scheduling, wherein the information indicative of intended scheduling is based on the value of the nominal interference and the priority of the traffic to be received by the BS from UE served by the BS, and wherein the information indicative of intended scheduling is employed to determine an assignment to the UE served by the BS.

The channel gain information can be based on at least one of: a measurement report and power information indicative of channel conditions on a downlink over a frequency band that corresponds to a frequency band of the uplink; or a power level of a sounding reference signal received at the BS from the UE.

The assignment can include at least one of a data rate or a bandwidth allocation at which the UE served by the BS can transmit data on the uplink to the BS.

Other aspects described herein can be performed via a computer program product. The computer program product can include a computer-readable medium. The computer-readable medium can include: a first set of codes for causing a computer to receive interference information for one or more interfering BSs, wherein the interference information for one or more interfering BSs is received from a UE; a second set of codes for causing the computer to receive a nominal interference and priority information for traffic associated with the UE, the priority information for traffic associated with the UE corresponding to information indicative of buffer state associated with the UE; and a third set of codes for causing a computer to transmit scheduling information to the UE, wherein the scheduling information is transmitted in response to receiving the nominal interference and the priority information for traffic associated with the UE, and wherein the scheduling information to the UE is employed to generate scheduling information for the UE from a serving BS, wherein at least one of the one or more interfering BSs comprise the computer.

In some embodiments, the scheduling information to the UE comprises a channel quality indicator or a signal-to-interference and noise ratio computed based on the scheduling information transmitted from the one or more interfering BSs.

In some embodiments, the information indicative of the buffer state comprises a priority of traffic that the UE will be served by the serving BS.

In some embodiments, the scheduling information from the one or more interfering BSs is indicative of at least one of the one or more interfering BSs scheduling a backoff.

Other aspects described herein can be performed via a computer program product. The computer program product can include a computer-readable medium. The computer-readable medium can include: a first set of codes for causing a computer to transmit information for determining channel gain information at a BS, wherein the transmitting information for determining channel gain information at a BS is performed by a UE; a second set of codes for causing the computer to receive a resource utilization message, wherein the resource utilization message comprises: a priority of traffic to be received by the BS from UE served by the BS; and a value of nominal interference between the BS and the UE, wherein the value of the nominal interference is based on the channel gain information; and a third set of codes for causing the computer to transmit information indicative of intended scheduling, wherein the information indicative of intended scheduling is based on the value of the nominal interference for UE served by the BS, the priority of the traffic to be received on serving links, the channel gain information on the serving links, the nominal interference for UE not served by the BS, the priority of the traffic to be received on interfering links and the channel gain information on the interfering links, and wherein the information indicative of intended scheduling is employed to determine an assignment to the UE served by the BS.

In some embodiments, the channel gain information is based on at least one of: a measurement report and power information indicative of channel conditions on a downlink over a frequency band that corresponds to a frequency band of an uplink; or a power level of a sounding reference signal received at the BS from the UE.

In some embodiments, the assignment includes at least one of a data rate or a bandwidth allocation at which the UE served by the BS can transmit data on an uplink to the BS.

Other aspects described herein can be performed via a computer program product. The computer program product can include a computer-readable medium. The computer-readable medium can include: a first set of codes for causing a computer to transmit one or more pilot signals, wherein the one or more pilot signals are transmitted from one or more interfering BSs and a UE receives the one or more pilot signals, and wherein the one or more pilot signals are measured to compute interference for the one or more interfering BSs, and wherein at least one of the one or more interfering BSs comprises the computer. In some embodiments, the computer program product can also include a second set of codes for causing the computer to receive a resource utilization message, and wherein transmitting the one or more pilot signals is in response to receiving the resource utilization message.

In some embodiments, computing the interference for the one or more interfering BSs comprises determining a signal strength of the one or more pilot signals.

Figure 29:
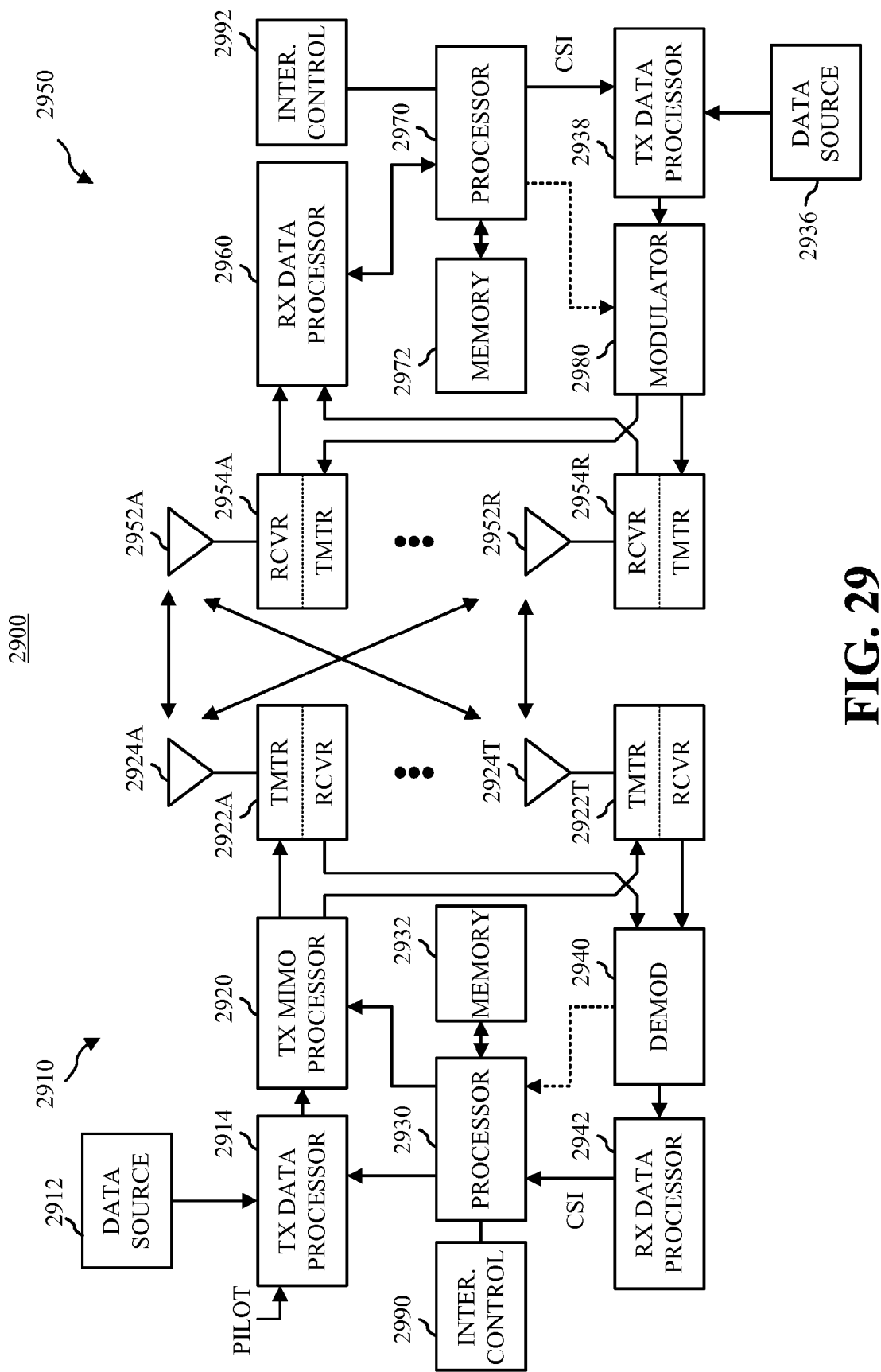
FIG. 29 is an illustration of an example wireless communication system in which interference management can be provided.

FIG. 29 an example wireless communication system 2900 in which interference management can be provided. The teachings herein may be incorporated into a node (e.g., a device) employing various components for communicating with at least one other node. FIG. 29 depicts several sample components that may be employed to facilitate communication between nodes. Specifically, FIG. 29 illustrates a wireless device 2910 (e.g., a BS) and a wireless device 2950 (e.g., a UE) of a MIMO system. At the device 2910, traffic data for a number of data streams is provided from a data source 2912 to a transmit (TX) data processor 2914.

In some aspects, each data stream is transmitted over a respective transmit antenna. The TX data processor 2914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiving node system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2930. A data memory 2932 may store program code, data, and other information used by the processor 2930 or other components of the device 2910.

The modulation symbols for all data streams are then provided to a TX MIMO processor 2920, which may further process the modulation symbols (e.g., for OFDM). The TX MIMO processor 2920 then provides $N_T$ modulation symbol streams to $N_T$ transceivers (XCVR) 2922A through 2922T. In some aspects, the TX MIMO processor 2920 applies beamforming weights to the symbols of the data streams and to the antenna from which the symbol is being transmitted.

Each transceiver 2922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2922A through 2922T are then transmitted from $N_T$ antennas 2924A through 2924T, respectively.

At the device 2950, the transmitted modulated signals are received by $N_R$ antennas 2952A through 2952R and the received signal from each antenna 2952 is provided to a respective transceiver (XCVR) 2954A through 2954R. Each transceiver 2954 conditions (e.g., filters, amplifies, and downconverts) a respective received signal, digitizes the conditioned signal to provide samples, and further processes the samples to provide a corresponding "received" symbol stream.

A receive (RX) data processor 2960 then receives and processes the $N_R$ received symbol streams from $N_R$ transceivers 2954 based on a particular receiving node processing technique to provide $N_T$ "detected" symbol streams. The RX data processor 2960 then demodulates, deinterleaves, and decodes each detected symbol stream to recover the traffic data for the data stream. The processing by the RX data processor 2960 is complementary to that performed by the TX MIMO processor 2920 and the TX data processor 2914 at the device 2910.

A processor 2970 periodically determines which pre-coding matrix to use (discussed below). The processor 2970 formulates a reverse link message comprising a matrix index portion and a rank value portion. A data memory 2972 may store program code, data, and other information used by the processor 2970 or other components of the device 2950.

The reverse link message may comprise various types of information regarding the communication link and/or the received data stream. The reverse link message is then processed by a TX data processor 2938, which also receives traffic data for a number of data streams from a data source 2936, modulated by a modulator 2980, conditioned by the transceivers 2954A through 2954R, and transmitted back to the device 2910.

At the device 2910, the modulated signals from the device 2950 are received by the antennas 2924, conditioned by the transceivers 2922, demodulated by a demodulator (DEMOD) 2940, and processed by a RX data processor 2942 to extract the reverse link message transmitted by the device 2950. The processor 2930 then determines which pre-coding matrix to use for determining the beam-forming weights then processes the extracted message.

FIG. 29 also illustrates that the communication components may include one or more components that perform interference control operations as taught herein. For example, an interference (INTER.) control component 2990 may cooperate with the processor 2930 and/or other components of the device 2910 to send/receive signals to/from another device (e.g., device 2950) as taught herein. Similarly, an interference control component 2992 may cooperate with the processor 2970 and/or other components of the device 2950 to send/receive signals to/from another device (e.g., device 2910). It should be appreciated that for each device 2910 and 2950 the functionality of two or more of the described components may be provided by a single component. For example, a single processing component may provide the functionality of the interference control component 2990 and the processor 2930 and a single processing component may provide the functionality of the interference control component 2992 and the processor 2970.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating interference management in a system with one or more interfering base stations, the method comprising:
   receiving one or more pilot signals, wherein one or more pilot signals are received from the one or more interfering base stations at a user equipment;
   computing interference for the one or more interfering base stations, wherein the computing is performed at the user equipment;
   transmitting a measurement report, wherein the measurement report includes interference for the one or more interfering base stations, wherein the measurement report is transmitted to a serving base station from the user equipment; and
   transmitting a resource utilization message to the one or more interfering base stations, wherein the receiving one or more pilot signals is in response to the transmitting the resource utilization message and wherein the transmitting the resource utilization message is performed by the user equipment.

2. The method of claim 1, further comprising:
   transmitting a scheduling request to the serving base station to receive an uplink grant; and
   receiving the uplink grant from the serving base station, wherein the transmitting the scheduling request and the receiving the uplink grant is performed by the user equipment prior to the transmitting the measurement report.

3. The method of claim 1, wherein the computing interference for the one or more interfering base stations comprises determining a signal strength of the one or more pilot signals.

4. A computer program product, comprising: a non-transitory computer-readable medium, comprising:
   a first set of codes for causing a computer to receive one or more pilot signals, wherein the one or more pilot signals are received from one or more interfering base stations;
   a second set of codes for causing the computer to compute interference for one or more interfering base stations;
   a third set of codes for causing the computer to transmit a measurement report, wherein the measurement report includes the interference, and wherein user equipment comprises the computer; and
   a fourth set of codes for causing the computer to transmit a resource utilization message to the one or more interfering base stations, wherein receiving one or more pilot signals is in response to the transmitting the resource utilization message.

5. The computer program product of claim 4, further comprising:
   a fifth set of codes for causing the computer to transmit a scheduling request to a serving base station to receive an uplink grant; and
   a sixth set of codes for causing the computer to receive the uplink grant from the serving base station, wherein the transmitting the scheduling request and the receiving the uplink grant is performed prior to the transmitting the measurement report.

6. The computer program product of claim 4, wherein the computing the interference for the one or more interfering base stations comprises determining a signal strength of the one or more pilot signals.

7. An apparatus, comprising:
   means for receiving one or more pilot signals, wherein one or more pilot signals are received from one or more interfering base stations and a user equipment receives the one or more pilot signals;
   means for computing interference for the one or more interfering base stations;
   means for transmitting a measurement report, and wherein the measurement report includes interference, wherein the measurement report is transmitted to a serving base station from the user equipment; and
   means for transmitting a resource utilization message to the one or more interfering base stations, wherein the means for receiving the one or more pilot signals receives the one or more pilot signals is in response to the means for transmitting the resource utilization message transmitting the resource utilization message.

8. The apparatus of claim 7, further comprising:
   means for transmitting a scheduling request to the serving base station to receive an uplink grant; and
   means for receiving the uplink grant from the serving base station, wherein the transmitting the scheduling request and the receiving the uplink grant is performed prior to the transmitting the measurement report.

9. The apparatus of claim 7, wherein the means for computing interference for the one or more interfering base stations comprises means for determining a signal strength of the one or more pilot signals.

10. An apparatus, comprising:
   a transceiver configured to receive one or more pilot signals, wherein the one or more pilot signals are received from one or more interfering base stations and a user equipment receives the one or more pilot signals;

an interference management module configured to compute interference for the one or more interfering base stations, wherein the transceiver is further configured to transmit a measurement report to a serving base station from the user equipment, and wherein the measurement report includes the interference; and transmit a resource utilization message to the one or more interfering base stations, wherein receiving the one or more pilot signals is in response to transmitting the resource utilization message.

11. The apparatus of claim 10, wherein the transceiver is further configured to:

transmit a scheduling request to the serving base station to receive an uplink grant; and receive the uplink grant from the serving base station, wherein transmitting the scheduling request and receiving the uplink grant is performed prior to transmitting the measurement report.

12. The apparatus of claim 10, wherein computing the interference for the one or more interfering base stations comprises determining a signal strength of the one or more pilot signals.

13. A method for facilitating interference management on a downlink, the method comprising:

receiving information indicative of buffer state associated with a user equipment, wherein the information is received at a user equipment;

receiving interference information from one or more interfering base stations;

setting a nominal interference, wherein the nominal interference is based on interference information from one or more interfering base stations;

transmitting the nominal interference and priority information for traffic associated with the user equipment, wherein the nominal interference and the priority information is transmitted to the one or more interfering base stations;

receiving scheduling information from the one or more interfering base stations, wherein the scheduling information from the one or more interfering base stations is received in response to the transmitting the nominal interference and priority information for traffic associated with the user equipment; and receiving scheduling information from a serving base station, wherein the scheduling information from the serving base station is based on the scheduling information from the one or more interfering base stations, and wherein the receiving information indicative of buffer state associated with the user equipment, the receiving interference information from one or more interfering base stations, the setting, the transmitting, the receiving scheduling information from the one or more interfering base stations and the receiving scheduling information from a serving base station are performed by the user equipment.

14. The method of claim 13, further comprising:

computing a channel quality indicator or a signal-to-interference and noise ratio based on the scheduling information from the one or more interfering base stations; and transmitting the channel quality indicator or the signal-to-interference and noise ratio to the serving base station, wherein the receiving scheduling information from the serving base station is performed in response to the computing the channel quality indicator or the signal-to-interference and noise ratio and the transmitting the channel quality indicator or the signal-to-interference and noise ratio.

15. The method of claim 13, wherein the information indicative of buffer state comprises a priority of traffic that the user equipment will be served by the serving base station.

16. The method of claim 13, wherein the scheduling information from the one or more interfering base stations is indicative of at least one of the one or more interfering base stations scheduling a backoff.

17. A computer program product, comprising:

a non-transitory computer-readable medium, comprising:

a first set of codes for causing a computer to receive information indicative of buffer state associated with a user equipment;

a second set of codes for causing the computer to receive interference information from one or more interfering base stations;

a third set of codes for causing the computer to set a nominal interference, wherein the nominal interference is based on the interference information from one or more interfering base stations;

a fourth set of codes for causing the computer to transmit the nominal interference and priority information for traffic associated with the user equipment, wherein the nominal interference and the priority information is transmitted to the one or more interfering base stations;

a fifth set of codes for causing the computer to receive scheduling information from the one or more interfering base stations, wherein the scheduling information is received in response to the transmitting the nominal interference and priority information for traffic associated with the user equipment; and a sixth set of codes for causing the computer to receive scheduling information from a serving base station, wherein the scheduling information from the serving base station is based on the scheduling information from the one or more interfering base stations, wherein the user equipment comprises the computer.

18. The computer program product of claim 17, further comprising:

a seventh set of codes for causing the computer to compute a channel quality indicator or a signal-to-interference and noise ratio based on the scheduling information from the one or more interfering base stations; and an eight set of codes for causing the computer to transmit the channel quality indicator or the signal-to-interference and noise ratio to the serving base station, wherein receiving scheduling information from the serving base station is performed in response to computing the channel quality indicator or the signal-to-interference and noise ratio and transmitting the channel quality indicator or the signal-to-interference and noise ratio.

19. The computer program product of claim 17, wherein the information indicative of buffer state comprises a priority of traffic that the user equipment will be served by the serving base station.

20. The computer program product of claim 17, wherein the scheduling information from the one or more interfering base stations is indicative of at least one of the one or more interfering base stations scheduling a backoff.

21. An apparatus, comprising:

means for receiving information indicative of buffer state associated with a user equipment, wherein the information is received at a user equipment;

means for receiving interference information from one or more interfering base stations;

means for setting a nominal interference, wherein the nominal interference is based on the interference information from one or more interfering base stations;

means for transmitting the nominal interference and priority information for traffic associated with the user equipment, wherein the nominal interference and the priority information is transmitted to the one or more interfering base stations;

means for receiving scheduling information from the one or more interfering base stations, wherein the scheduling information from the one or more interfering base stations is received in response to the transmitting the nominal interference and priority information for traffic associated with the user equipment; and means for receiving scheduling information from a serving base station, wherein the scheduling information from the serving base station is based on the scheduling information from the one or more interfering base stations.

22. The apparatus of claim 21, further comprising:

means for computing a channel quality indicator or a signal-to-interference and noise ratio based on the scheduling information from the one or more interfering base stations; and means for transmitting the channel quality indicator or the signal-to-interference and noise ratio to the serving base station, wherein receiving scheduling information from the serving base station is performed in response to computing the channel quality indicator or the signal-to-interference and noise ratio and the transmitting the channel quality indicator or the signal-to-interference and noise ratio.

23. The apparatus of claim 21, wherein the information indicative of buffer state comprises a priority of traffic that the user equipment will be served by the serving base station.

24. The apparatus of claim 21, wherein the scheduling information from the one or more interfering base stations is indicative of at least one of the one or more interfering base stations scheduling a backoff.

25. An apparatus, comprising:

a transceiver configured to:
receive information indicative of buffer state associated with a user equipment, wherein the information is received at a user equipment;
receive interference information from one or more interfering base stations; and an interference management module configured to set a nominal interference, wherein the nominal interference is based on the interference information from one or more interfering base stations, wherein the transceiver is further configured to:
transmit the nominal interference and priority information for traffic associated with the user equipment, wherein the nominal interference and the priority information is transmitted to the one or more interfering base stations;
receive scheduling information from the one or more interfering base stations, wherein the scheduling information from the one or more interfering base stations is received in response to the transmitting the nominal interference and priority information for traffic associated with the user equipment; and
receive scheduling information from a serving base station, wherein the scheduling information from the serving base station is based on the scheduling information from the one or more interfering base stations.

26. The apparatus of claim 25, wherein the interference management module is further configured to compute a channel quality indicator or a signal-to-interference and noise ratio based on the scheduling information from the one or more interfering base stations, and wherein the transceiver is further configured to transmit the channel quality indicator or the signal-to-interference and noise ratio to the serving base station, wherein receiving scheduling information from the serving base station is performed in response to computing the channel quality indicator or the signal-to-interference and noise ratio and the transmitting the channel quality indicator or the signal-to-interference and noise ratio.

27. The apparatus of claim 25, wherein the information indicative of buffer state comprises a priority of traffic that the user equipment will be served by the serving base station.

28. The apparatus of claim 25, wherein the scheduling information from the one or more interfering base stations is indicative of at least one of the one or more interfering base stations scheduling a backoff.

29. A method for facilitating interference management on a downlink, the method comprising:

receiving interference information for one or more interfering base stations, wherein the receiving interference information for the one or more interfering base stations is received from a user equipment;

receiving a nominal interference and priority information for traffic associated with the user equipment, the priority information for traffic associated with the user equipment corresponding to information indicative of buffer state associated with the user equipment; and transmitting scheduling information to the user equipment, wherein the scheduling information is transmitted in response to the receiving the nominal interference and the priority information for traffic associated with the user equipment, and wherein the scheduling information to the user equipment is employed to generate scheduling information for the user equipment from a serving base station, and wherein the receiving interference information, the receiving a nominal interference and priority information for traffic associated with the user equipment and the transmitting are performed by a serving base station for the user equipment.

30. The method of claim 29, wherein the scheduling information to the user equipment comprises a channel quality indicator or a signal-to-interference and noise ratio computed based on the scheduling information transmitted from the one or more interfering base stations.

31. The method of claim 29, wherein the information indicative of the buffer state comprises a priority of traffic that the user equipment will be served by the serving base station.

32. The method of claim 29, wherein the scheduling information from the one or more interfering base stations is indicative of at least one of the one or more interfering base stations scheduling a backoff.

33. A computer program product, comprising:

a non-transitory computer-readable medium, comprising:
a first set of codes for causing a computer to receive interference information for one or more interfering base stations, wherein the interference information for one or more interfering base stations is received from a user equipment;
a second set of codes for causing the computer to receive a nominal interference and priority information for traffic associated with the user equipment, the priority information for traffic associated with the user equipment corresponding to information indicative of buffer state associated with the user equipment; and a third set of codes for causing a computer to transmit scheduling information to the user equipment, wherein the scheduling information is transmitted in response to receiving the nominal interference and the priority information for traffic associated with the user equipment, and wherein the scheduling information to the user equipment is employed to generate scheduling information for the user equipment from a serving base station, wherein at least one of the one or more interfering base stations comprise the computer.

34. The computer program product of claim 33, wherein the scheduling information to the user equipment comprises a channel quality indicator or a signal-to-interference and noise ratio computed based on the scheduling information transmitted from the one or more interfering base stations.

35. The computer program product of claim 33, wherein the information indicative of the buffer state comprises a priority of traffic that the user equipment will be served by the serving base station.

36. The computer program product of claim 33, wherein the scheduling information from the one or more interfering base stations is indicative of at least one of the one or more interfering base stations scheduling a backoff.

37. An apparatus, comprising:

means for receiving interference information for one or more interfering base stations, wherein the interference information for one or more interfering base stations is received from a user equipment;

means for receiving a nominal interference and priority information for traffic associated with the user equipment, the priority information for traffic associated with the user equipment corresponding to information indicative of buffer state associated with the user equipment; and means for transmitting scheduling information to the user equipment, wherein the scheduling information to the user equipment is transmitted in response to the receiving the nominal interference and the priority information for traffic associated with the user equipment, and wherein the scheduling information to the user equipment is employed to generate scheduling information for the user equipment from a serving base station.

38. The apparatus of claim 37, wherein the scheduling information to the user equipment comprises a channel quality indicator or a signal-to-interference and noise ratio computed based on the scheduling information transmitted from the one or more interfering base stations.

39. The apparatus of claim 37, wherein the information indicative of the buffer state comprises a priority of traffic that the user equipment will be served by the serving base station.

40. The apparatus of claim 37, wherein the scheduling information from the one or more interfering base stations is indicative of at least one of the one or more interfering base stations scheduling a backoff.

41. An apparatus, comprising:

a transceiver configured to:

receive interference information for one or more interfering base stations, wherein the interference information for one or more interfering base stations is received from a user equipment;

receive a nominal interference and priority information for traffic associated with the user equipment, the priority information for traffic associated with the user equipment corresponding to information indicative of buffer state associated with the user equipment; and transmit scheduling information to the user equipment, wherein the scheduling information is transmitted in response to the receiving the nominal interference and the priority information for traffic associated with the user equipment, and wherein the scheduling information to the user equipment is employed to generate scheduling information for the user equipment from a serving base station.

42. The apparatus of claim 41, wherein the scheduling information to the user equipment comprises a channel quality indicator or a signal-to-interference and noise ratio computed based on the scheduling information transmitted from the one or more interfering base stations.

43. The apparatus of claim 41, wherein the information indicative of the buffer state comprises a priority of traffic that the user equipment will be served by the serving base station.

44. The apparatus of claim 41, wherein the scheduling information from the one or more interfering base stations is indicative of at least one of the one or more interfering base stations scheduling a backoff.

* * * * *